(12) United States Patent
Ohnishi et al.

(10) Patent No.: US 7,855,526 B2
(45) Date of Patent: Dec. 21, 2010

(54) POWER CONVERSION CONTROL DEVICE, POWER CONVERSION CONTROL METHOD, AND POWER CONVERSION CONTROL PROGRAM

(75) Inventors: Tokuo Ohnishi, Tokushima (JP); Kenji Yamanaka, Tokushima (JP); Eiji Gohda, Tokushima (JP)

(73) Assignee: The University of Tokushima, Tokushima-shi (JP)

( * ) Notice: Subject to any disclaimer, the term of this patent is extended or adjusted under 35 U.S.C. 154(b) by 557 days.

(21) Appl. No.: 11/993,278

(22) PCT Filed: Jun. 27, 2006

(86) PCT No.: PCT/JP2006/312833

§ 371 (c)(1),
(2), (4) Date: Dec. 20, 2007

(87) PCT Pub. No.: WO2007/001007

PCT Pub. Date: Jan. 4, 2007

(65) Prior Publication Data

US 2010/0226157 A1    Sep. 9, 2010

(30) Foreign Application Priority Data

| | | |
|---|---|---|
| Jun. 27, 2005 | (JP) | 2005-187471 |
| Nov. 4, 2005 | (JP) | 2005-321622 |
| Apr. 8, 2006 | (JP) | 2006-107013 |

(51) Int. Cl.
*H02P 27/04* (2006.01)

(52) U.S. Cl. .............. 318/800; 318/700; 318/768; 318/807; 68/12.02; 68/12.04; 363/71

(58) Field of Classification Search ............ 318/605, 318/700, 768, 800, 807, 400.02; 68/12.16, 68/12.02, 12.04; 363/71
See application file for complete search history.

(56) References Cited

U.S. PATENT DOCUMENTS

| | | | | |
|---|---|---|---|---|
| 5,390,102 | A * | 2/1995 | Araki | 363/71 |
| 5,796,228 | A * | 8/1998 | Kojima et al. | 318/605 |
| 7,017,377 | B2 * | 3/2006 | Hosoito et al. | 68/12.16 |
| 7,478,547 | B2 * | 1/2009 | Okazaki et al. | 68/12.04 |
| 7,482,777 | B2 * | 1/2009 | Tomigashi | 318/807 |
| 7,579,798 | B2 * | 8/2009 | Hosoito et al. | 318/400.02 |

(Continued)

FOREIGN PATENT DOCUMENTS

JP     5 236789     9/1993

(Continued)

*Primary Examiner*—Paul Ip
(74) *Attorney, Agent, or Firm*—Oblon, Spivak, McClelland, Maier & Neustadt, L.L.P.

(57) ABSTRACT

In the present invention, when configuring a control system of an inverter performing power conversion between AC and DC, a frequency computation is performed based on biaxial voltage amounts obtained through two current regulators in such a way that each of biaxial component currents obtained by detecting an AC circuit current and performing a rotational coordinate transformation matches each respective command value and phase information in synchronization with an electromotive force power supply of the AC circuit is obtained by integrating the frequency to perform the rotational coordinate transformation of the AC current and also the inverter is caused to operate by generating a PWM switching signal from the biaxial voltage amounts to perform necessary power conversion control.

21 Claims, 50 Drawing Sheets

U.S. PATENT DOCUMENTS

| | | | |
|---|---|---|---|
| 7,728,537 B2* | 6/2010 | Tomigashi | 318/400.02 |
| 7,768,803 B2* | 8/2010 | Furutani et al. | 363/40 |
| 2002/0189301 A1* | 12/2002 | Hosoito et al. | 68/12.02 |
| 2003/0102839 A1* | 6/2003 | Kinpara et al. | 318/700 |
| 2005/0024009 A1* | 2/2005 | Kinpara et al. | 318/700 |
| 2005/0160771 A1* | 7/2005 | Hosoito et al. | 68/12.16 |
| 2006/0207299 A1* | 9/2006 | Okazaki et al. | 68/12.02 |
| 2008/0061727 A1* | 3/2008 | Tomigashi | 318/768 |
| 2008/0061728 A1* | 3/2008 | Tomigashi | 318/768 |
| 2008/0197799 A1* | 8/2008 | Tomigashi | 318/768 |

FOREIGN PATENT DOCUMENTS

| | | |
|---|---|---|
| JP | 2000 232800 | 8/2000 |
| JP | 2000 236694 | 8/2000 |
| JP | 2001 251889 | 9/2001 |
| JP | 2003 204694 | 7/2003 |
| WO | 02 091558 | 11/2002 |

\* cited by examiner

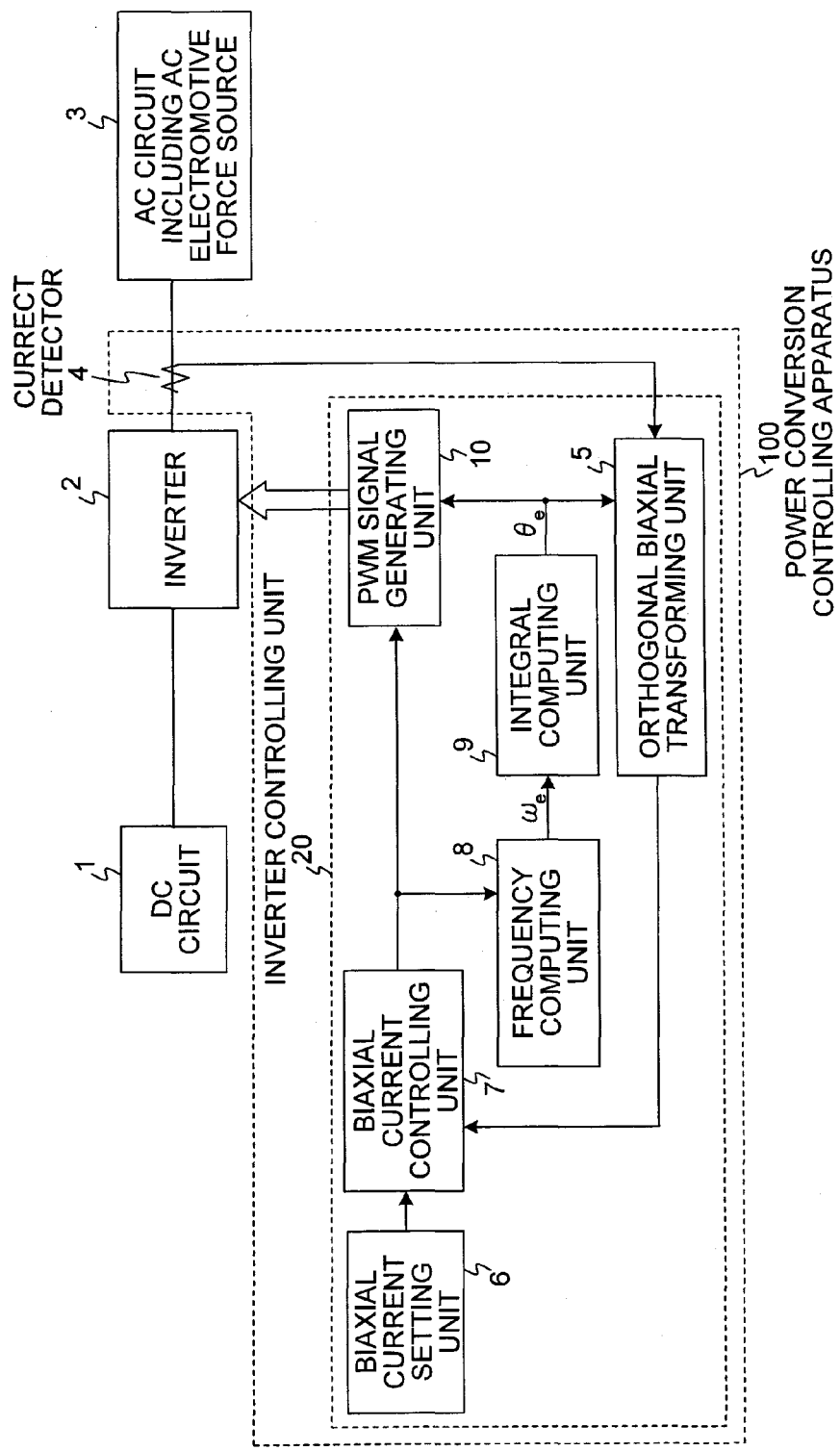

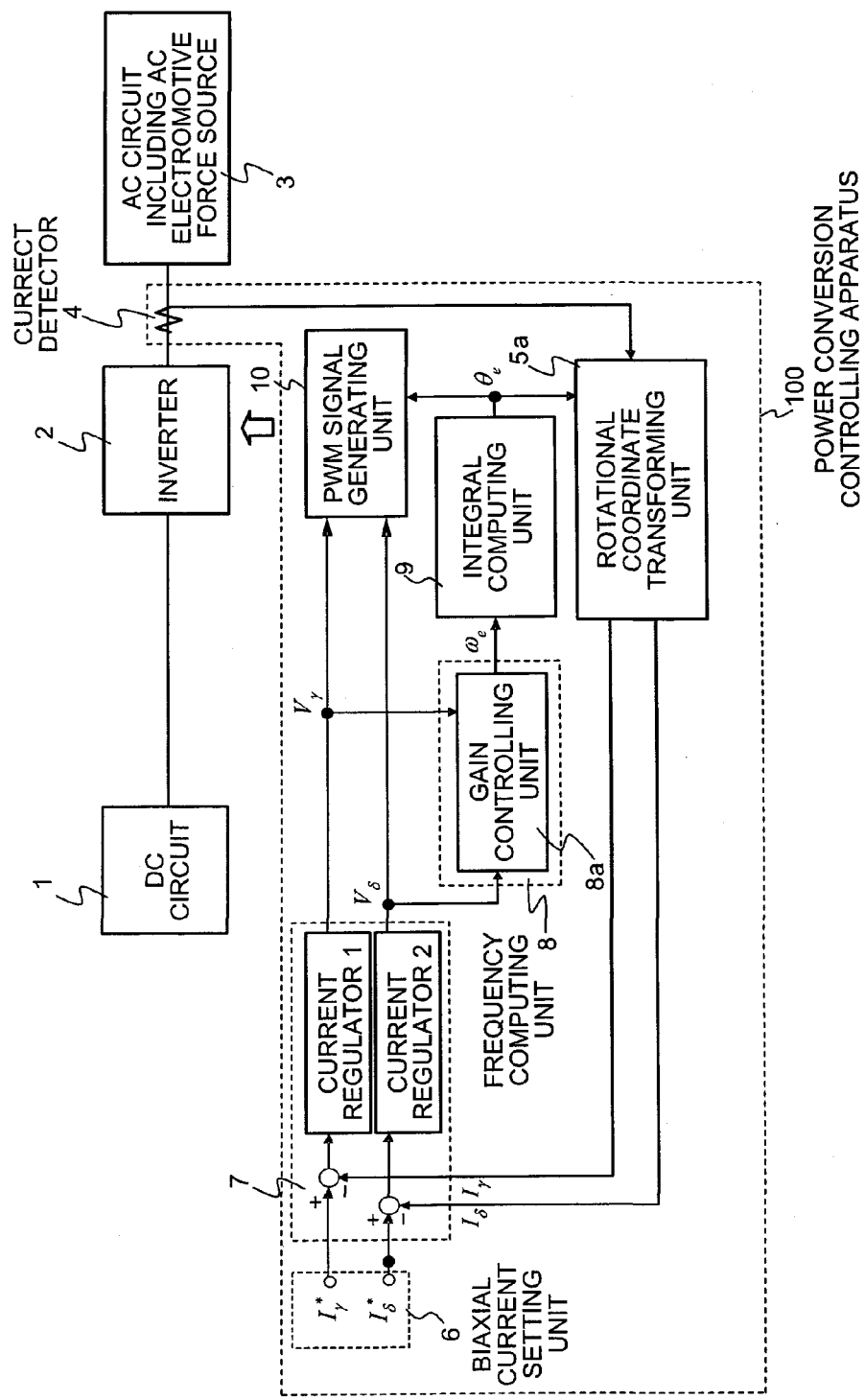

POWER CONVERSION CONTROL DEVICE, POWER CONVERSION CONTROL METHOD, AND POWER CONVERSION CONTROL PROGRAM

TECHNICAL FIELD

The present invention relates to a power conversion controlling apparatus, a power conversion controlling method, and a power conversion controlling program, and more particularly, relates to a power conversion controlling apparatus, a power conversion controlling method, and a power conversion controlling program that control a power converting unit connected between a DC circuit and an AC circuit including an AC electromotive force source to exchange power between DC and AC with a switching device based on a detection signal of a current flowing through the AC circuit.

BACKGROUND ART

A power conversion controlling apparatus using an inverter is used very widely including application to AC motor generators from the motor control field to the generator control field, application to rectifier circuits and system interconnection inverters that exchange power between an AC power supply and a DC power supply, and the like. These usually have an electromotive force source in an AC circuit and the inverter must be controlled in synchronization with such an electromotive force source.

Thus, to make the inverter work, a switching control signal is generated based on phase information of an AC electromotive force source acquired by means of some sensor or phase information estimated based on the output voltage/current of the inverter and circuit constants of an AC circuit.

A typical electromotive load on the AC circuit side is a synchronous motor and a Hall device, an encoder, a resolver or the like is used as a magnetic pole position sensor to acquire the phase information of the electromotive force in inverter drive particularly of a permanent-magnet synchronous motor or a DC brushless motor. Control modes for detecting such magnetic pole position information can easily deal with high-efficiency operation and high-speed response control, but since a magnetic pole position sensor is needed, problems arise regarding reliability, workability, prices and the like.

On the other hand, various techniques have been proposed to indirectly control the position of rotor from information of the voltage and current of a motor by computation without using such a magnetic pole position sensor. For example, techniques based on detection of induced electromotive force of a motor by rectangular current drive, that based on detection of the voltage when a zero cross point of current in sinusoidal current drive is detected (for example, see Patent Document 1), that based on V/f constant control (for example, see Patent Document 2), and that with a vibration suppression function added to the V/f constant control (for example, see Patent Documents 3 and 4) have been proposed or practically used. However, though the position sensor can be eliminated, conventional control modes have problems that circuit constants of a motor must be incorporated into a control system, such conventional control modes are susceptible to transient changes, the control system will become more complicated, and the like.

Though an induction motor is also considered to be a load having the electromotive force, in comparison with the synchronous motor, the induction motor can be operated without detecting the phase information of the electromotive force and thus, speed control can be performed relatively easily by the V/f constant control and the like. However, the V/f constant control is not E/f constant control and thus, there are problems of lower torque and substantially of responsiveness during low-speed operation. Slip frequency control type vector control or the like is used to ensure fast responsiveness, but with the control system configured by incorporating circuit constants and integrating the induction motor and control device, there are problems that the system configuration will become more complicated and its response characteristics are affected by the circuit constants.

If, on the other hand, an AC generator or a commercial power supply is connected to the AC circuit side and an inverter is used to perform a rectification operation or an interconnected operation from a DC power supply to an AC system, a phase detector of a power supply voltage for generating a control signal in synchronization with the power supply voltage is generally needed. This leads, however, to lower reliability due to a more complicated control system caused by an additional need for an AC power supply voltage detector.

Though a control technique to make a rectification operation or an inversion operation perform by computation with the detected voltage and current of the inverter without using any phase detector of the power supply voltage is known, complicated computation processing is required due to the use of circuit constants (such as the impedance and magnetic flux density of a motor). Also, there is a problem that, for example, it is difficult to deal with wide variations in power supply frequency.

Patent Document 1: Japanese Patent Application Laid-Open No. H5-236789
Patent Document 2: Japanese Patent Application Laid-Open No. 2000-232800
Patent Document 3: Japanese Patent Application Laid-Open No. 2000-236694
Patent Document 4: Japanese Patent Application Laid-Open No. 2000-204694

DISCLOSURE OF INVENTION

Problem to be Solved by the Invention

The present invention has been devised in view of the above problems and an object of the present invention is to provide a power conversion controlling apparatus, a power conversion controlling method, and a power conversion controlling program that can perform control of a power converting unit such as an inverter easily with high precision and can be used in a wide range of fields.

Means for Solving Problem

To solve the above problems and to achieve the above objects, a power conversion controlling apparatus according to one aspect of the present invention, controls a power converting unit connected between a DC circuit and an AC circuit including an AC electromotive force source to exchange power between DC and AC with a switching device based on a detection signal detected by a current detector of a current flowing through the AC circuit. The power conversion controlling apparatus includes a frequency computing unit that determines an operating frequency of the power converting unit to output an operating frequency signal, an integral computing unit that computes a phase angle signal by integration from the output of the frequency computing unit to output the phase angle signal, an orthogonal biaxial transforming unit that computes a biaxial current of an active component and a reactive component by orthogonal biaxial transformation based on the detection signal of the current detector and the phase angle signal of the integral computing unit to output the biaxial current, a biaxial current setting unit that determines a command value of the biaxial current to output the command value, a biaxial current controlling unit that computes an amount of error from a difference between the output of the orthogonal biaxial transforming unit and that of the biaxial current setting unit to output an amplitude command value according to the amount of error for each biaxial component, and a PWM signal generating unit that generates a PWM signal controlling the power converting unit based on the output of the biaxial current controlling unit and the phase angle signal of the integral computing unit, wherein the frequency computing unit determines the operating frequency of the power converting unit so as to lead the amplitude command value corresponding to a reactive component of current among the amplitude command values output by the biaxial current controlling unit to zero.

According to another aspect of the present invention, in the power conversion controlling apparatus, the frequency computing unit selects, among the amplitude command values output by the biaxial current controlling unit, a value obtained by multiplying the amplitude command value corresponding to the active component of current by a gain, a value obtained by multiplying a time variation reduced value of the amplitude command value corresponding to the active component of current by the gain, or a time variation reduced value of the gain multiplied value, as the operating frequency of the power converting unit.

According to still another aspect of the present invention, in the power conversion controlling apparatus, the frequency computing unit includes an impedance compensating unit that outputs a compensation value for compensating for a stationary or transient voltage drop in a line impedance portion when the amplitude command value corresponding to the active component of current among the amplitude command values output by the biaxial current controlling unit changes, wherein a value obtained by multiplying an added value of the amplitude command value corresponding to the active component of current or a time variation reduced value of the amplitude command value and an output of the impedance compensating unit by a gain, or a time variation reduced value of the gain multiplied value is selected as the operating frequency of the power converting unit.

According to still another aspect of the present invention, in the power conversion controlling apparatus, the impedance compensating unit computes the compensation value based on the active component of current or a command value of the active component of current.

According to still another aspect of the present invention, in the power conversion controlling apparatus, the impedance compensating unit computes the compensation value by reducing time variations of the active component of current or the command value of the active component of current.

According to still another aspect of the present invention, in the power conversion controlling apparatus, the impedance compensating unit computes the compensation value using, among the amplitude command values output by the biaxial current controlling unit, the amplitude command value corresponding to the reactive component of current.

According to still another aspect of the present invention, in the power conversion controlling apparatus, the frequency computing unit selects a value obtained by multiplying a constant by a gain as the operating frequency of the power converting unit.

According to still another aspect of the present invention, the power conversion controlling apparatus includes an output voltage orthogonal biaxial transforming unit that computes a biaxial voltage by orthogonal biaxial transformation from an output voltage of the power converting unit and the phase angle signal of the integral computing unit to output a signal corresponding to the amplitude command value output by the biaxial current controlling unit for each biaxial component, wherein the frequency computing unit substitutes the amplitude command value with the signal value of the output voltage orthogonal biaxial transforming unit for each biaxial component.

According to still another aspect of the present invention, in the power conversion controlling apparatus, the biaxial current setting unit computes the command value of the active component of current using the operating frequency of the power converting unit output by the frequency computing unit.

According to still another aspect of the present invention, in the power conversion controlling apparatus, the biaxial current setting unit computes the command value of the active component of current using a DC side voltage value of the power converting unit.

According to still another aspect of the present invention, in the power conversion controlling apparatus, a power factor is arbitrarily set by adjusting the command value of the reactive component of current of the biaxial current setting unit.

According to still another aspect of the present invention, in the power conversion controlling apparatus, the biaxial current setting unit determines the command value of the reactive component of current as a value such that the power factor at an output end of the power converting unit becomes 1.

According to still another aspect of the present invention, in the power conversion controlling apparatus, the biaxial current setting unit determines the command value of the reactive component of current as a value such that the power factor at an AC electromotive force source end of the AC circuit becomes 1.

According to still another aspect of the present invention, in the power conversion controlling apparatus, the AC circuit is a circuit including one or a plurality of AC machines.

According to still another aspect of the present invention, in the power conversion controlling apparatus, the AC machine is a synchronous machine, a reluctance machine, an induction machine, or an induction synchronous machine.

According to still another aspect of the present invention, in the power conversion controlling apparatus, magnetization or demagnetization of a magnetic field is caused by adjusting the command value of the biaxial current of the biaxial current setting unit.

According to still another aspect of the present invention, in the power conversion controlling apparatus, a commercial power supply, an AC side output of other power converting unit, or an AC load including a capacitor is connected as an AC electromotive force source of the AC circuit.

According to still another aspect of the present invention, in the power conversion controlling apparatus, the DC circuit is a circuit including a capacitor, a DC power supply, or a DC load.

According to still another aspect of the present invention, in the power conversion controlling apparatus, the power converting unit is an inverter that converts DC power into AC power or an AC-DC converter that converts AC power into DC power.

According to still another aspect of the present invention, a computer program product having a computer readable medium including programmed instructions for controlling a power converting unit connected between a DC circuit and an AC circuit including an AC electromotive force source to exchange power between DC and AC with a switching device based on a detection signal detected by a current detector of a current flowing through the AC circuit, wherein the instructions, when executed by a computer, cause the computer to function as a frequency computing unit that determines an operating frequency of the power converting unit so as to lead a amplitude command value corresponding to a reactive component of current among the amplitude command values to zero, an integral computing unit that computes a phase angle signal by integration from the output of the frequency computing unit to output the phase angle signal, an orthogonal biaxial transforming unit that computes a biaxial current of an active component and a reactive component by orthogonal biaxial transformation based on the detection signal of the current detector and the phase angle signal of the integral computing unit to output the biaxial current, a biaxial current setting unit that determines a command value of the biaxial current to output the command value, a biaxial current controlling unit that computes an amount of error from a difference between the output of the orthogonal biaxial transforming unit and that of the biaxial current setting unit to output the amplitude command value according to the amount of error for each biaxial component, and a PWM signal generating unit that generates a PWM signal controlling the power converting unit based on the output of the biaxial current controlling unit and the phase angle signal of the integral computing unit.

According to still another aspect of the present invention, a power conversion controlling method controls a power converting unit connected between a DC circuit and an AC circuit including an AC electromotive force source to exchange power between DC and AC with a switching device based on a detection signal detected by a current detector of a current flowing through the AC circuit. The power conversion controlling method includes a frequency computing step of determining an operating frequency of the power converting unit so as to lead a amplitude command value corresponding to a reactive component of current among the amplitude command values to zero, an integral computing step of computing a phase angle signal by integration from the output at the frequency computing step to output the phase angle signal, an orthogonal biaxial transforming step of computing a biaxial current of an active component and a reactive component by orthogonal biaxial transformation based on the detection signal of the current detector and the phase angle signal at the integral computing step to output the biaxial current, a biaxial current setting step of determining a command value of the biaxial current to output the command value, a biaxial current controlling step of computing an amount of error from a difference between the output at the orthogonal biaxial transforming step and that at the biaxial current setting step to output the amplitude command value according to the amount of error for each biaxial component, and a PWM signal generating step of generating a PWM signal controlling the power converting unit based on the output at the biaxial current controlling step and the phase angle signal at the integral computing step.

Effect of the Invention

According to the present invention, a power conversion controlling apparatus that controls a power converting unit connected between a DC circuit and an AC circuit including an AC electromotive force source to exchange power between DC and AC with a switching device based on a detection signal detected by a current detector of a current flowing through the AC circuit. The power conversion controlling apparatus includes a frequency computing unit that determines an operating frequency of the power converting unit to output an operating frequency signal, an integral computing unit that determines a phase angle signal by integration from the output of the frequency computing unit to output the phase angle signal, an orthogonal biaxial transforming unit that computes a biaxial current of an active component and a reactive component by orthogonal biaxial transformation based on the detection signal of the current detector and the phase angle signal of the integral computing unit to output the biaxial current, a biaxial current setting unit that determines a command value of the biaxial current to output the command value, a biaxial current controlling unit that computes an amount of error from a difference between the output of the orthogonal biaxial transforming unit and that of the biaxial current setting unit to output an amplitude command value according to the amount of error for each biaxial component, and a PWM signal generating unit that generates a PWM signal for controlling the power converting unit based on the output of the biaxial current controlling unit and the phase angle signal of the integral computing unit, wherein the frequency computing unit determines the operating frequency of the power converting unit so as to lead the amplitude command value corresponding to a reactive component of current among the amplitude command values output by the biaxial current controlling unit to zero. Therefore, it makes effects of being able to provide a power conversion controlling apparatus that can detect an AC current without directly detecting the phase of an electromotive force source of an AC circuit by means of a sensor or the like, control the power converting unit without using the circuit constants, control the power converting unit such as an inverter easily with high precision, and be used in a wide range of fields.

BRIEF DESCRIPTION OF DRAWINGS

FIG. 1 is a basic block diagram of a power conversion controlling apparatus of the present invention;

FIG. 2-1 is a block diagram in biaxial representation of the power conversion controlling apparatus of the present invention;

FIG. 2-2 is a control sequence diagram of the power conversion controlling apparatus of the present invention;

FIG. 11 is a block diagram of the power conversion controlling apparatus of the present invention in which an inverter output voltage orthogonal biaxial transforming unit is provided in;

FIG. 36-1 is a diagram of a power conversion system in Example 1 when a plurality of synchronous motors are driven;

FIG. 36-2 is a diagram of operation waveforms when synchronous motors have different ratings in the power conversion system shown in FIG. 36-1;

FIG. 36-3 is a diagram of simulation analysis results when synchronous motors have the same load torque in the power conversion system shown in FIG. 36-1;

FIG. 36-4 is a diagram of simulation analysis results when synchronous motors have different load torques in the power conversion system shown in FIG. 36-1;

FIG. 43-1 is a diagram of a power conversion system when a plurality of induction motors are driven in the system in Example 4;

FIG. 43-2 is a diagram of simulation analysis results when induction motors have the same load torque in the power conversion system shown in FIG. 43-1;

FIG. 43-3 is a diagram of simulation analysis results when induction motors have different load torques in the power conversion system shown in FIG. 43-1;

EXPLANATIONS OF LETTERS OR NUMERALS

Figure 2:
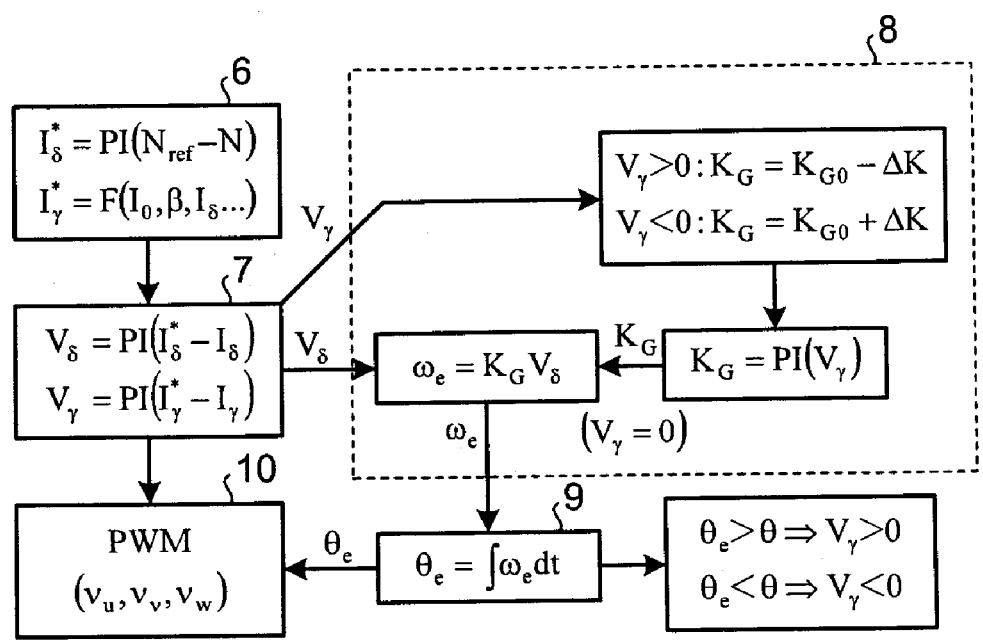

1 DC circuit
1a DC power supply
1b DC load
2 inverter
3 AC circuit (including an AC electromotive force source)
3b synchronous motor
3c induction motor
3d AC power supply
3e AC circuit (including a capacitor)
4 current detector
5 orthogonal biaxial transforming unit
5a rotational coordinate transforming unit
6 biaxial current setting unit
7 biaxial current controlling unit
8 frequency computing unit
8a gain controlling unit
8b impedance compensating unit
8c LPF (low-pass filter)
9 integral computing unit
10 PWM signal generating unit
11 speed converting unit
12 speed controlling unit
13 speed setting unit
14 magnetic flux controlling unit
15 voltage detector
17 DC voltage setting unit
18 reactive current controlling Unit
20 inverter controlling unit
21 AC side voltage detector
22 inverter output voltage orthogonal biaxial transforming unit
30 common bus
31 interconnecting reactor
100 power conversion controlling apparatus

BEST MODES FOR CARRYING OUT THE INVENTION

Exemplary embodiments of a power conversion controlling apparatus, a power conversion controlling method, and a power conversion controlling program according to the present invention will be described below with reference to attached drawings. However, the present invention is not limited by such embodiments. Components in the embodiments shown below include those that can easily be conceived by a person skilled in the art or are substantially identical. Meanwhile, it is assumed herein that a power converting unit that exchanges power between DC and AC includes an inverter that converts DC power into AC power and an AC-DC converter that converts AC power into DC power. Though inverters are mainly exemplified as the power converting unit in embodiments that follow, the present invention is also applicable to AC-DC converters.

First Embodiment

Figures 1, 36:
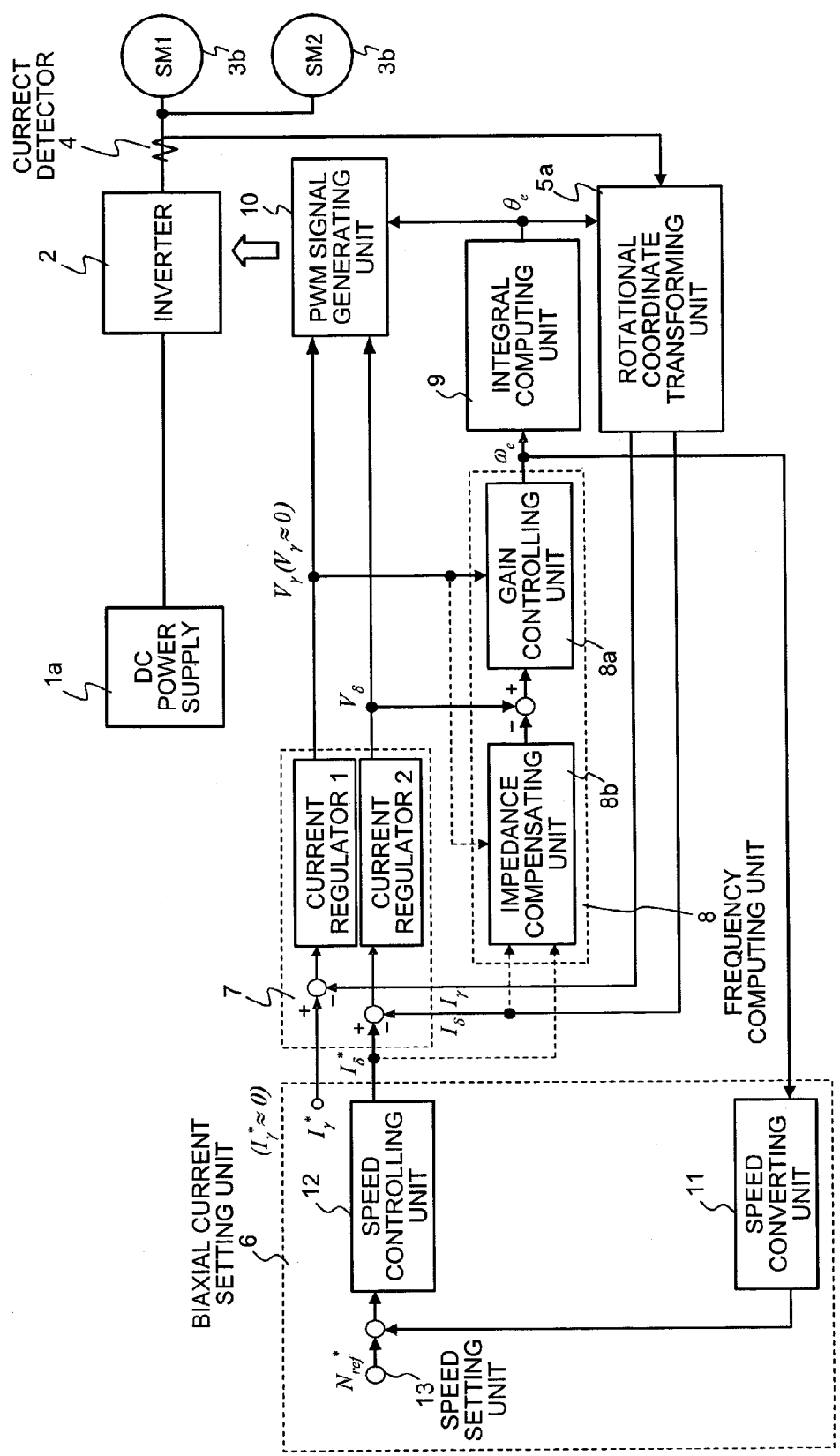
Figures 2, 36:
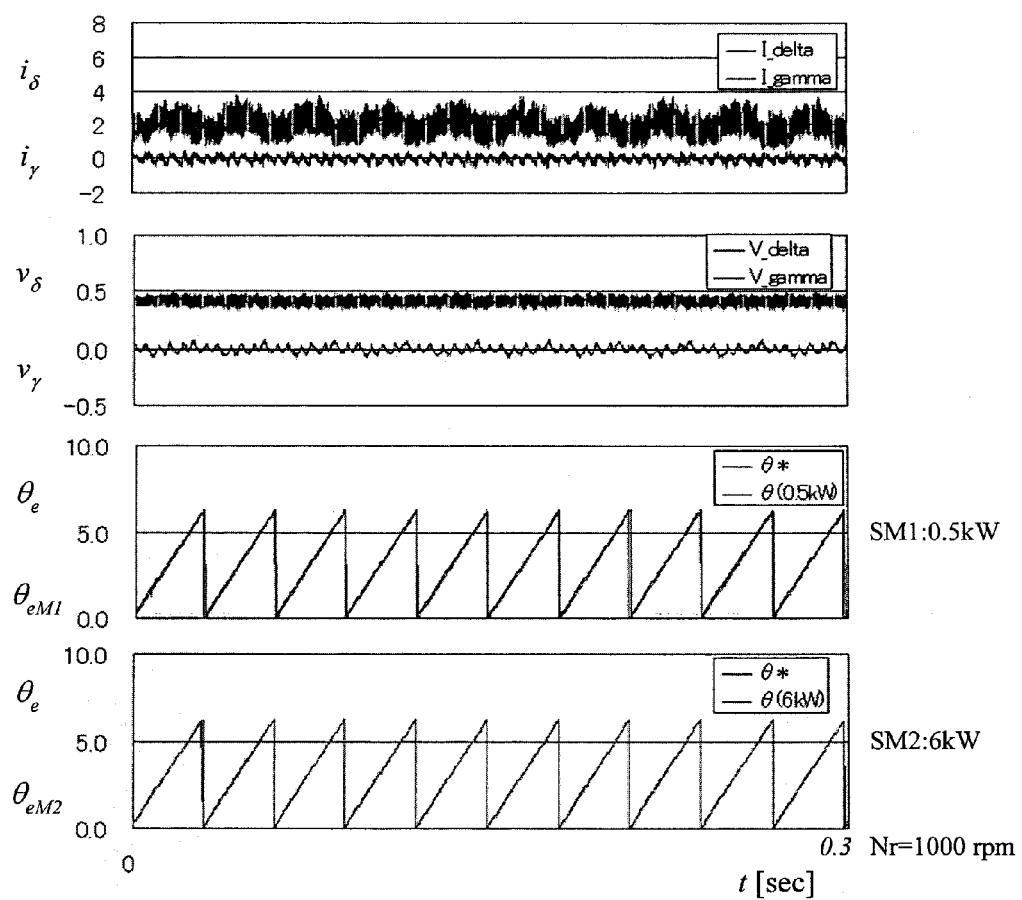
Figures 3, 36:
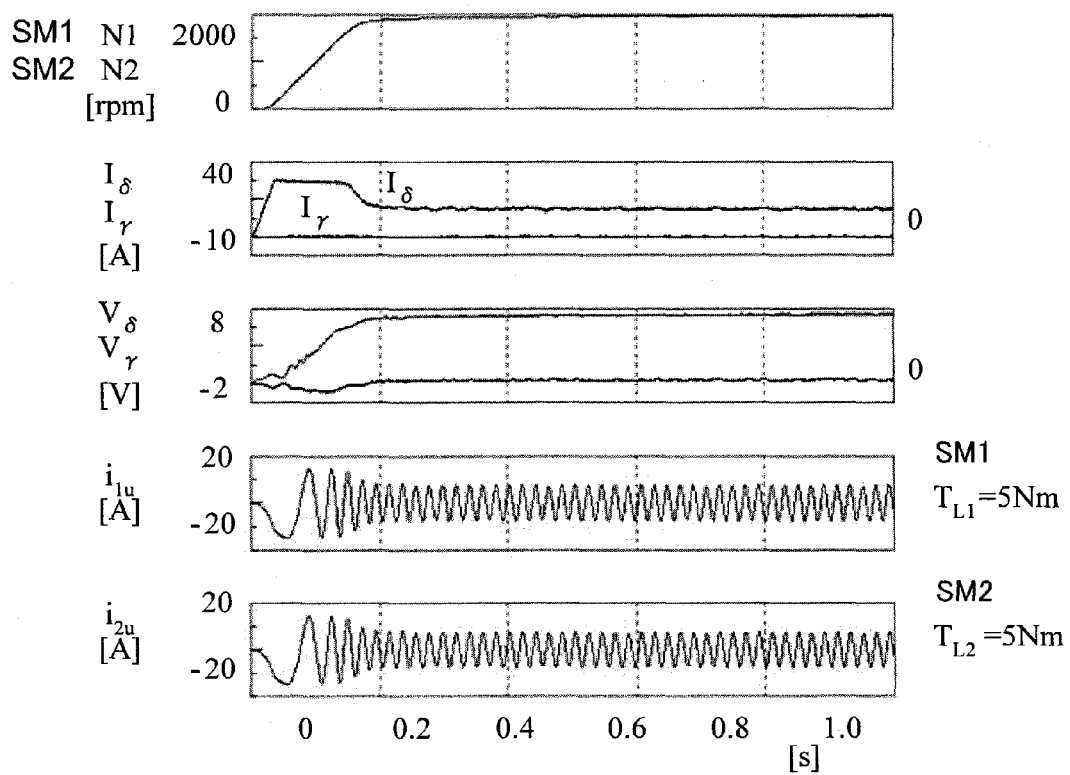
Figures 4, 36:
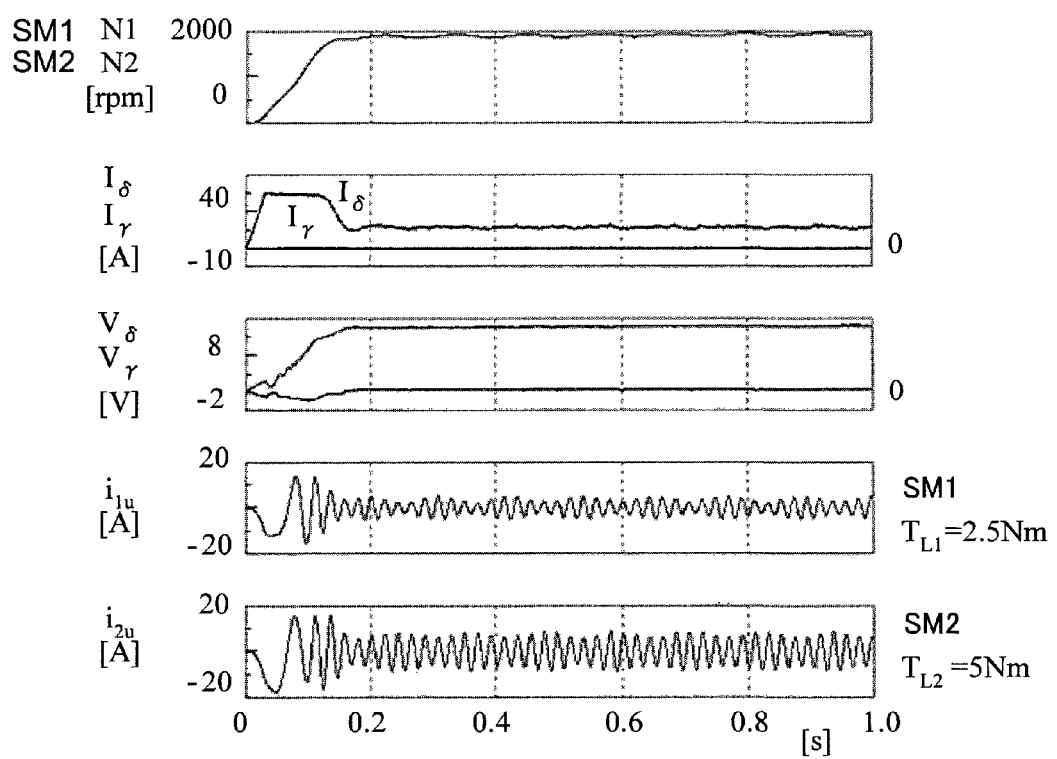

FIG. 1 is a diagram of a basic configuration of a power conversion controlling apparatus according to the present invention. The power conversion controlling apparatus according to a first embodiment is used to control an inverter that performs power conversion between DC and AC when an AC circuit has an electromotive force source.

In FIG. 1, numeral 1 is a DC circuit, numeral 2 is an inverter connected between the DC circuit 1 and an AC circuit 3 to exchange power between DC and AC with a switching device, numeral 3 is the AC circuit including the electromotive force source (hereinafter also called an "AC circuit"), and numeral 100 is a power conversion controlling apparatus. In embodiments that follow, numeral 2 is illustrated as an inverter, but numeral 2 may be an AC-DC converter that performs AC-DC conversion depending on types of the connected DC circuit 1 and the AC circuit 3.

The DC circuit 1 is a circuit including a DC power supply, a DC load, or a capacitor. The AC circuit 3 including an AC electromotive force source is an AC circuit having an electromotive force source such as an AC motor, an AC generator, an AC power supply, and a load including a capacitor.

The power conversion controlling apparatus 100 includes a current detector 4 that detects a current flowing through the AC circuit 3 to output a detection signal and an inverter controlling unit 20 that controls the inverter 2 based on the detection signal of the current detector 4.

The inverter controlling unit 20 includes an orthogonal biaxial transforming unit 5, a biaxial current setting unit 6, a biaxial current controlling unit 7, a frequency computing unit 8, an integral computing unit 9, and a PWM signal generating unit 10. The inverter controlling unit 20 may be configured by a microcomputer, DSP or the like and a power conversion controlling program may be executed by a computer to implement functions of the orthogonal biaxial transforming unit 5, biaxial current setting unit 6, biaxial current controlling unit 7, frequency computing unit 8, integral computing unit 9, and PWM signal generating unit 10.

The frequency computing unit 8 determines an operating frequency of the inverter 2 to output an operating frequency signal $\omega_e$. In this case, the frequency computing unit 8 determines the operating frequency signal $\omega_e$ of the inverter 2 in such a way that the amplitude command value corresponding to a reactive component of current among the amplitude command values output by the biaxial current controlling unit 7 is led to zero. Details of this principle will be described later.

The integral computing unit 9 computes a phase angle signal $\theta_e$ by integration from the output of the frequency computing unit 8 and outputs the phase angle signal $\theta_e$. The orthogonal biaxial transforming unit 5 computes a biaxial current of an active component and a reactive component by orthogonal biaxial transformation from the detection signal of the current detector 4 and the phase angle signal $\theta_e$ of the frequency computing unit 8 to output the biaxial current. The biaxial current setting unit 6 determines a command value of the biaxial current to output the command value. The biaxial current controlling unit 7 computes an amount of error from a difference between the output of the orthogonal biaxial transforming unit 5 and that of the biaxial current setting unit 6 to output an amplitude command value according to the amount of error for each biaxial component. The PWM signal generating unit 10 generates a PWM signal, which is a control signal to be provided to the inverter 2, based on the output of the biaxial current controlling unit 7 and the phase angle signal $\theta_e$ of the integral computing unit 9 to supply the PWM signal to the inverter 2.

FIG. 2-1 is a diagram of the configuration of the power conversion controlling apparatus that performs a frequency computation using an amplitude command value (an inverter voltage command value in a broad sense) in the power conversion controlling apparatus in FIG. 1. In FIG. 2-1, the same numerals are attached to components having functions equivalent to those of components in FIG. 1 to omit a description of common portions. The power conversion controlling apparatus 100 in FIG. 2-1 depicts a concrete configuration example when a three-phase (UVW) AC load including an AC electromotive force source is connected to the AC circuit 3 in the power conversion controlling apparatus in FIG. 1. The inverter 2 is a three-phase inverter and can be configured by a bridge circuit including a switching device such as an IGBT.

In FIG. 2-1, the current detector 4 detects at least two phases of current flowing through the AC circuit 3 as a detection signal. A rotational coordinate transforming unit 5*a*, which is the orthogonal biaxial transforming unit, performs a δ-γ transformation of a detection signal detected by the current detector 4 in which the active component is set to a γ-axis component and the reactive component is set to a γ-axis component in synchronization with the operating frequency of the inverter 2 to output transformed biaxial amounts Iγ and Iδ to the biaxial current controlling unit 7. The biaxial current controlling unit 7 generates biaxial control voltages of the inverter 2, that is, amplitude command values Vγ and Vδ of the inverter 2 via two sets of current regulators 1 and 2 included in the biaxial current controlling unit 7 in such a way that the transformed biaxial amounts Iγ and Iδ match biaxial current command values Iγ* and Iδ* output by the biaxial current setting unit 6.

The frequency computing unit 8 (gain controlling unit 8*a*) determines the operating frequency signal $\omega_e$ of the inverter 2 in such a way that the uniaxial voltage value Vγ of the amplitude command values Vγ and Vδ becomes zero, and the integral computing unit 9 obtains the operating phase angle signal $\theta_e$ of the inverter 2 by integrating the operating frequency signal $\omega_e$ to perform the rotational coordinate transformation of the AC current and also causes the PWM signal generating unit 10 to generate a PWM signal ($v_u$, $v_v$, $v_w$), which is a control signal of the inverter 2, by trigonometry or the like from biaxial voltage amounts Vγ and Vδ to operate the inverter 2. Accordingly, it becomes possible to control power exchange between AC and DC only by detection control of current flowing through the AC circuit without acquiring phase information of an AC electromotive force source of the AC circuit 3 by a sensor and using circuit constants.

Figure 3:
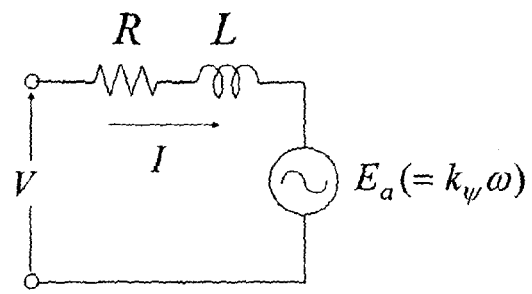
FIG. 3 is a diagram of a single-phase basic equivalent circuit of the power conversion controlling apparatus of the present invention.

Next, the control principle of the inverter in the power conversion controlling apparatus of the above configuration will be described in detail. FIG. 2-2 is a control sequence diagram of the power conversion controlling apparatus in FIG. 2-1. FIG. 3 is a diagram of a single-phase equivalent circuit when a synchronous motor and an AC power supply are connected as an example that an electromotive force source in the AC circuit 3 is included. In FIG. 3, R denotes a circuit resistor, L denotes a circuit inductance, and $E_a$ denotes a transformation amount of rotational coordinates of an AC electromotive force source ea. Here, the AC electromotive force source is proportional to the angular frequency ω when a motor is connected, but the voltage takes an approximately constant value when a commercial AC power supply is connected. Rotational coordinate transformation under the formula (1) based on a circuit equation of the equivalent circuit of FIG. 3 yields the formula (2) shown below.

[Formula 1]

$$\theta = \int \omega dt \qquad (1)$$

[Formula 2]

$$V_\gamma = RI_\gamma + L\frac{dI_\gamma}{dt} - \omega LI_\delta + E_a \sin\beta$$
$$V_\delta = RI_\delta + L\frac{dI_\delta}{dt} + \omega LI_\gamma + E_a \cos\beta \qquad (2)$$

Here, Vδ is a voltage command value component proportional to an output voltage vector of the inverter 2, Vγ is a voltage command value component orthogonal to this axis, Iδ is the active component of current of a current vector, and Iγ is the reactive component of current. β is an angle of phase difference between the output voltage vector Vδ of the inverter 2 and a voltage vector $E_a$ of AC electromotive force.

Since differential terms are zero in a stationary state in the formula (2), the formula (3) shown below is obtained,

[Formula 3]

$$V_\gamma = RI_\gamma - \omega LI_\delta + E_a \sin\beta$$

$$V_\delta = RI_\delta + \omega LI_\gamma + E_a \cos\beta \quad (3)$$

Figure 4:
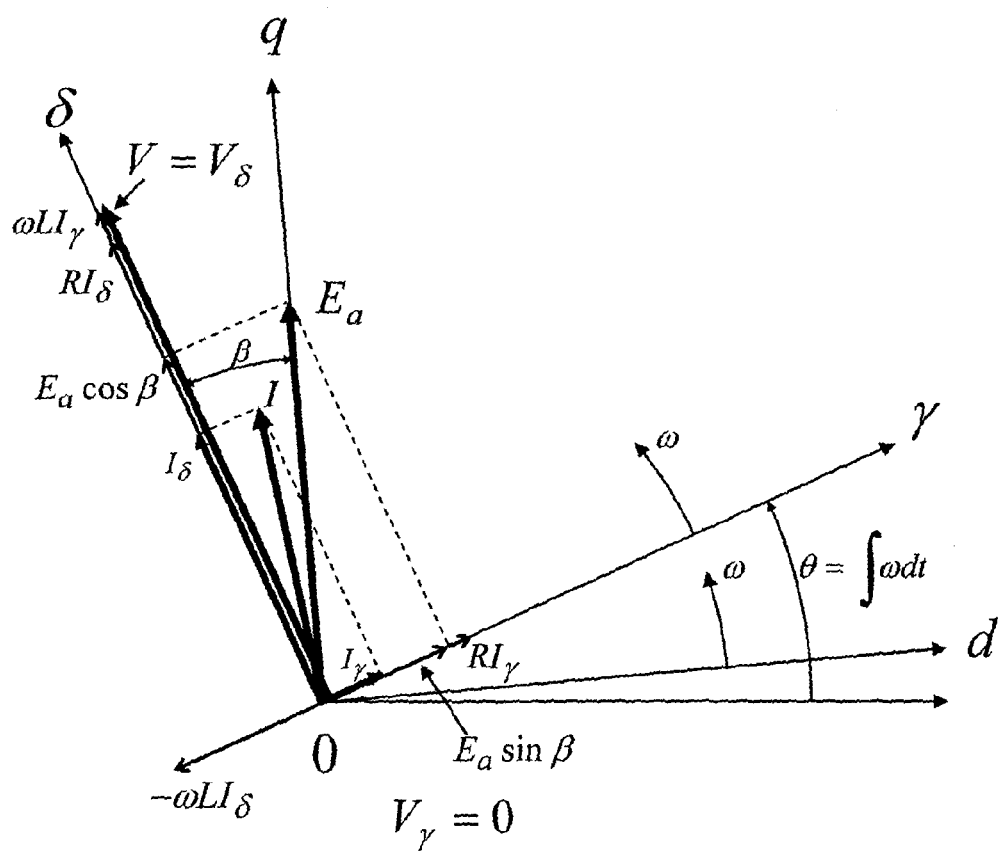
FIG. 4 is a diagram of relationships (in consideration of circuit resistance) among biaxial voltage vectors $V\delta$ and $V\gamma$, biaxial current vectors $I\delta$ and $I\gamma$, and an AC electromotive force $E_a$ of the power conversion controlling apparatus of the present invention.
Figure 5:
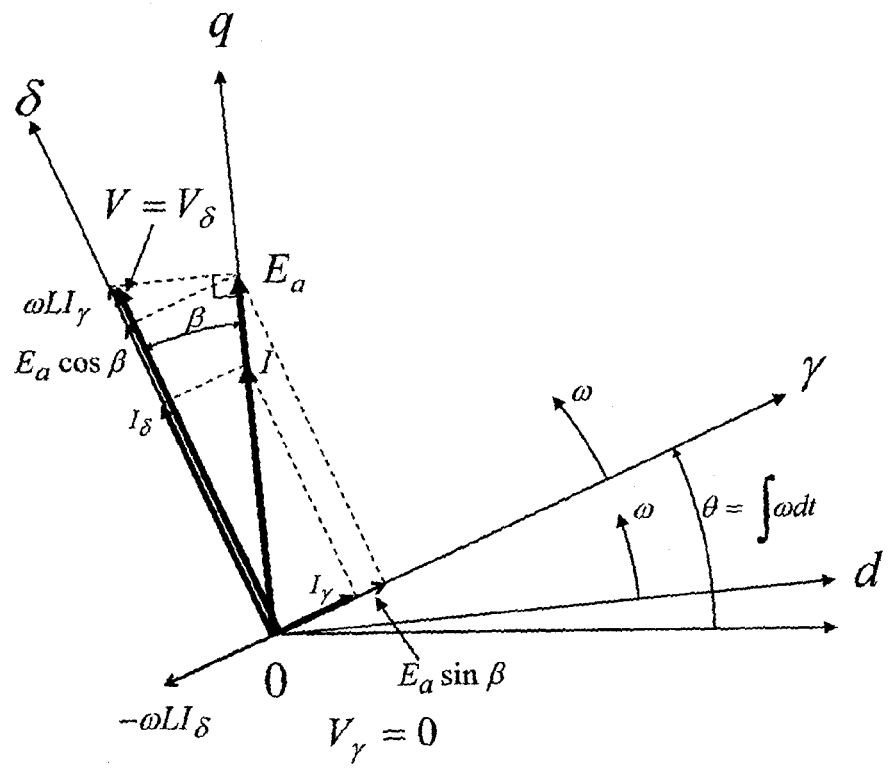
FIG. 5 is a diagram of relationships (without consideration of circuit resistance) among the biaxial voltage vectors $V\delta$ and $V\gamma$, the biaxial current vectors $I\delta$ and $I\gamma$, and the AC electromotive force $E_a$ of the power conversion controlling apparatus of the present invention.

FIG. 4 depicts a vector diagram when the component voltage $V\gamma$ of the $\gamma$ axis is zero in a stationary state with the biaxial component voltages $V\delta$ and $V\gamma$, biaxial component currents $I\delta$ and $I\gamma$, and AC electromotive force $E_a$ based on the formula (3). Here, it is assumed that coordinate axes of the biaxial component voltages $V\delta$ and $V\gamma$ are the $\delta$ axis and $\gamma$ axis, the voltage vector $E_a$ of the AC electromotive force is the q axis, and a magnetic flux axis orthogonal to the q axis is the d axis. Here, $\beta$ denotes a phase angle between two coordinate axes. FIG. 5 depicts a vector diagram when a voltage drop by circuit resistance is ignored. Now, if controlled to be $I\gamma=0$ and $I\delta=$const., the formula (3) is further simplified to the formula (4) shown below.

[Formula 4]

$$V_\gamma = -\omega LI_\gamma + E_a \sin\beta$$

$$V_\delta = RI_\delta + E_a \cos\beta \quad (4)$$

Here, if controlled to be $V\gamma=0$, the formula (5) shown below can be obtained from the formula (4).

[Formula 5]

$$I_\delta = \frac{E_a}{\omega L}\sin\beta \quad (5)$$

At this time, power $P_a$ from the inverter 2 is given by the formula (6) shown below, which is represented by a sine-wave function of an angle of phase difference or load angle $\beta$.

[Formula 6]

$$P_a = V_\delta I_\delta = \frac{V_\delta E_a}{\omega L}\sin\beta \quad (6)$$

If the angle of phase difference (or load angle) $\beta$ is small, the formula (4) can be approximated by the formula (7) shown below.

[Formula 7]

$$V_\gamma \approx -\omega LI_\delta + E_a\beta$$

$$V_\delta \approx RI_\delta + E_a \quad (7)$$

From the VS formula of the formula (7), the AC electromotive force source $E_a$ is obtained from the formula (8) shown below.

[Formula 8]

$$E_a \approx V_\delta - RI_\delta \quad (8)$$

Further, if a voltage drop $RI\delta$ caused by circuit resistance can be ignored, the formula (8) will be the formula (9) shown below.

[Formula 9]

$$E_a \approx V_\delta \quad (9)$$

At this time, the AC electromotive force $E_a$ is approximated from the output voltage vector value $V\delta$. If the AC electromotive force source derives from an AC motor, the AC electromotive force source is proportional to the angular frequency $\omega$ and given by the formula (10) shown below.

[Formula 10]

$$E_a = k_\psi \omega \quad (10)$$

Here, $k_\psi$ is a proportionality constant proportional to the magnetic flux. If $V\gamma=0$, from the formulas (7) and (10), the angle of phase difference $\beta$ can be approximated by the formula (11) shown below.

[Formula 11]

$$\beta \approx (L/k_\psi)I_\delta \quad (11)$$

Further, from the formulas (9) and (10), the angular frequency $\omega$ can be approximated by the formula (12) shown below and is proportional to $V\delta$.

[Formula 12]

$$\omega \approx V_\delta/k_\psi \quad (12)$$

From the formula (12), if an appropriate proportional gain for $V\delta$ is $K_G$, the angular frequency $\omega$ of the AC electromotive force source can be considered basically to be $\omega$ shown below

[Formula 13]

$$\omega_e = K_G V_\delta \quad (13)$$

The integral computing unit 9 can calculate a rotational phase angle $\theta_e$ of the inverter 2 in synchronization with the rotational phase angle of the AC electromotive force source according to the formula (14) shown below with the operating frequency $\omega_e$ of the inverter of the formula (13) as an input.

[Formula 14]

$$\theta_e = \int \omega_e dt \quad (14)$$

Figure 6:
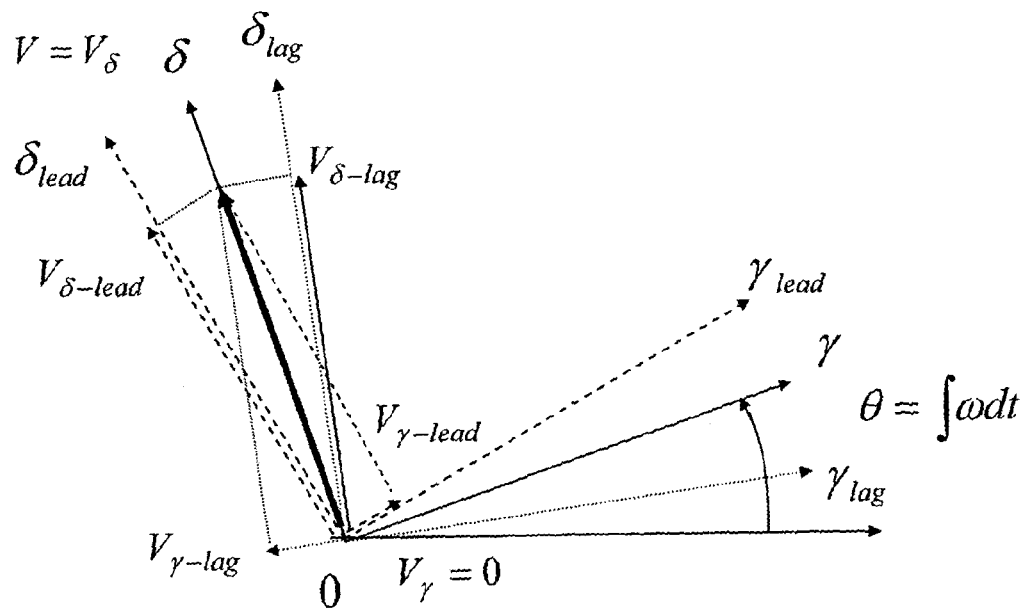
FIG. 6 is a diagram of relationships between phase angles and $\delta$-$\gamma$ axis components in rotational coordinate transformation of the power conversion controlling apparatus of the present invention.

Here, if the rotational phase angle $\theta_e$ obtained from the frequency computation does not match an appropriate phase angle $\theta$ synchronized with the rotation phase angle of the AC electromotive force source, the $\gamma$-axis component voltage $V\gamma$ of the output voltage vector V of the inverter 2 shown in FIG. 6 appears. This $V\gamma$ takes a negative value when the phase angle $\theta_e$ obtained from the computation lags and a positive value when the phase angle leads. Thus, the rotational phase angle $\theta_e$ obtained from the computation can be led to the appropriate rotational phase angle $\theta$ by adjusting the value of $K_G$ in the formula (13) so that the value of $V\gamma$ becomes zero through a PI controller or the like based on the sign of the $\gamma$-axis component voltage $V\gamma$.

The power conversion controlling apparatus according to the first embodiment includes the frequency computing unit 8 that determines an operating frequency of the inverter 2 to output the operating frequency signal $\omega_e$, the integral computing unit 9 that determines a phase angle signal $\theta_e$ by integration from the output of the frequency computing unit 8 to output the phase angle signal, the orthogonal biaxial transforming unit 5 that computes a biaxial current of the active component and reactive component by orthogonal biaxial transformation from a detection signal of the current detector 4 and the phase angle signal $\theta_e$ of the frequency computing unit 8 to output the biaxial current, the biaxial current setting unit 6 that determines a command value of the biaxial current to output the command value of the biaxial current, the biaxial current controlling unit 7 that computes an amount of error from a difference between output of the orthogonal biaxial transforming unit 5 and that of the biaxial current setting unit 6 to output an amplitude command value according to the amount of error for each biaxial component, and the PWM signal generating unit 10 that generates a control signal to be provided to the inverter 2 from output of the biaxial current controlling unit 7 and the phase angle signal $\theta_e$ of the integral computing unit 9, and the frequency computing unit 8 determines the operating frequency $\omega_e$ of the inverter 2 in such a way that the amplitude command value corresponding to the reactive component of current among the amplitude command values output by the biaxial current controlling unit 7 is led to zero. Therefore, it becomes possible to control the inverter only by detection of an AC current without detecting the phase of an electromotive force source of the AC circuit by a phase detection sensor and using circuit constants when controlling the inverter to enable desired power conversion between AC and DC, to control the inverter easily with high precision, and to use the inverter in a wade range of fields. To add a remark, the power conversion controlling apparatus according to the first embodiment can be used for general purposes because no AC circuit constant is used.

Meanwhile, the frequency computing unit 8 may use a value obtained by multiplying the constant by a gain as the operating frequency $\omega_e$ of the inverter 2. Since the amplitude command value corresponding to the active component of current among the amplitude command values output by the biaxial current controlling unit 7 takes a constant value if the AC electromotive force source has a constant frequency like a commercial power supply, instead of using the amplitude command value as an input into the frequency computing unit 8, the corresponding constant value may be used as an input to be multiplied by a gain in such a way that the amplitude command value corresponding to the reactive component of current among the amplitude command values output by the biaxial current controlling unit 7 becomes zero before being selected as the operating frequency $\omega_e$ of the inverter 2. The control system can thereby be simplified.

Second Embodiment

A power conversion controlling apparatus according to a second embodiment uses, in the frequency computing unit 8 (gain controlling unit 8a) of the power conversion controlling apparatus in FIG. 2-1, a value obtained by multiplying the amplitude command value corresponding to the active component of current among the amplitude command values output by the biaxial current controlling unit 7 by a gain, that obtained by multiplying a time variation reduced value of the amplitude command value corresponding to the active component of current by a gain, or a time variation reduced value of such a gain multiplied value is selected as the operating frequency $\omega_e$ of the inverter 7.

More specifically, the operating frequency $\omega_e$ of the inverter 2 is determined by multiplying the amplitude command value corresponding to the active component of current by a gain among the amplitude command values output from the biaxial current controlling unit 7. In this case, instead of the amplitude command value corresponding to the active component of current, a time variation reduced value of the amplitude command value corresponding to the active component of current may also be used. Also, instead of using such a gain multiplied value as the operating frequency $\omega_e$ of the inverter 2, a time variation reduced value of the gain multiplied value may also be determined as the operating frequency of the inverter 2. Time variation reduction at this time is intended to prevent control instability caused by a rapid change of the operating frequency of the AC circuit 3 compared with a case when no such rapid change occurs.

Figure 7:
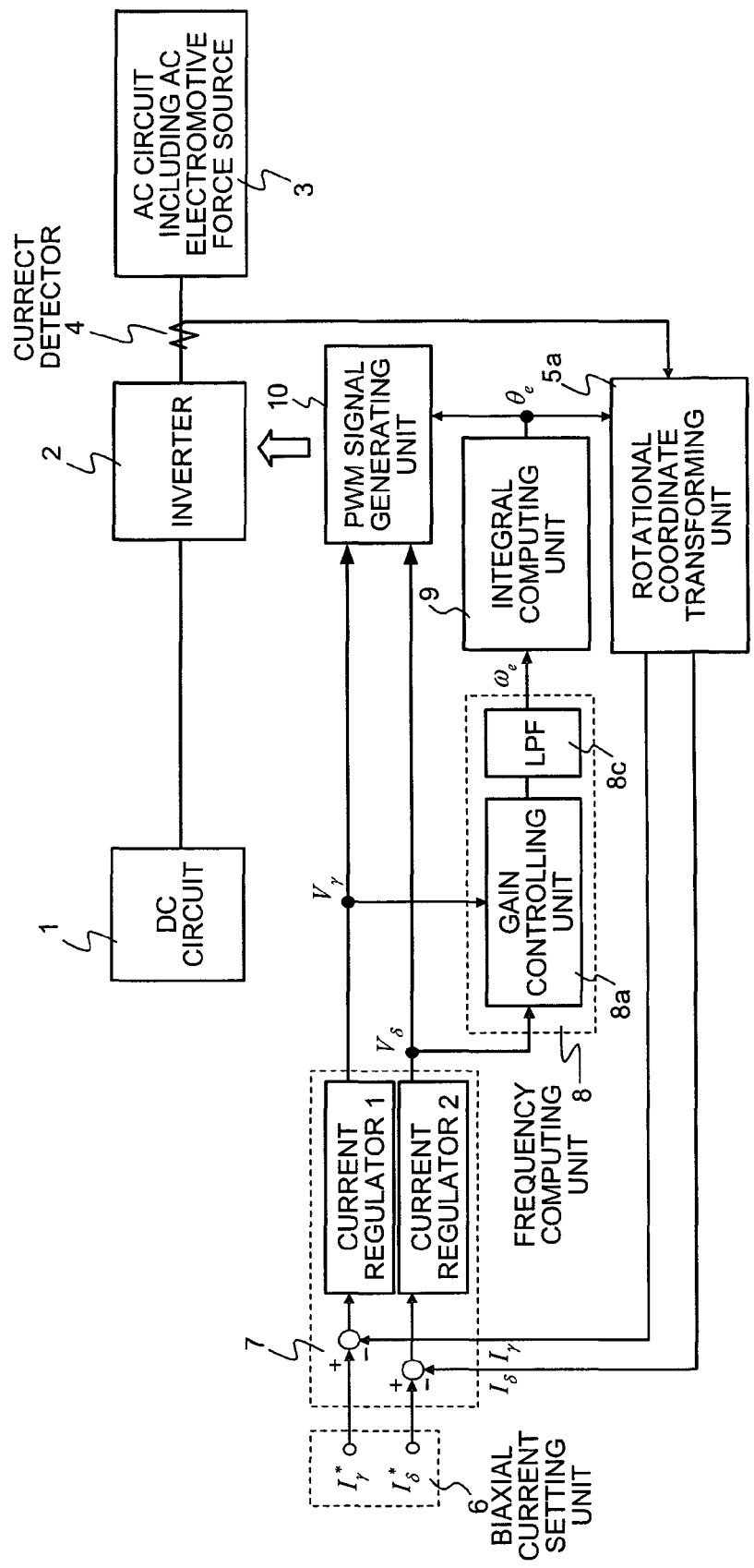
FIG. 7 is a block diagram of the power conversion controlling apparatus of the present invention, in which a frequency computing unit includes LPF.

FIG. 7 is a diagram exemplifying the power conversion controlling apparatus when an LPF (low-pass filter) is provided in the frequency computing unit 8 to reduce time variations. In FIG. 7, V$\gamma$ and V$\delta$ are output from the biaxial current controlling unit 7 and include some ripple components and thus, if output from the gain controlling unit 8a is directly used as the operating frequency and phase control, which is an integral thereof, operations may become unstable due to an influence of ripples. In order to reduce the influence of ripple components, output of the gain controlling unit 8a is used, after being caused to pass through an LPF (low-pass filter) 8c, as the operating frequency and a control phase signal, which is an integral thereof. The filter factor of the LPF 8c may be set, for example, as $k/(1+\tau)$.

V$\delta$ output by the biaxial current controlling unit 7 may also be caused to pass through the LPF (low-pass filter) before being input into the frequency computing unit 8 to reduce the influence of ripple components.

The power conversion controlling apparatus according to the second embodiment uses, among the amplitude command values output by the biaxial current controlling unit 7, a value obtained by multiplying the amplitude command value corresponding to the active component of current by a gain, that obtained by multiplying a time variation reduced value of the amplitude command value corresponding to the active component of current by a gain, or time variation reduced values of such gain multiplied values is selected as the operating frequency of the inverter 2 and therefore, stable operation can be performed even if the operating frequency of the AC circuit changes rapidly.

Third Embodiment

Figure 8:
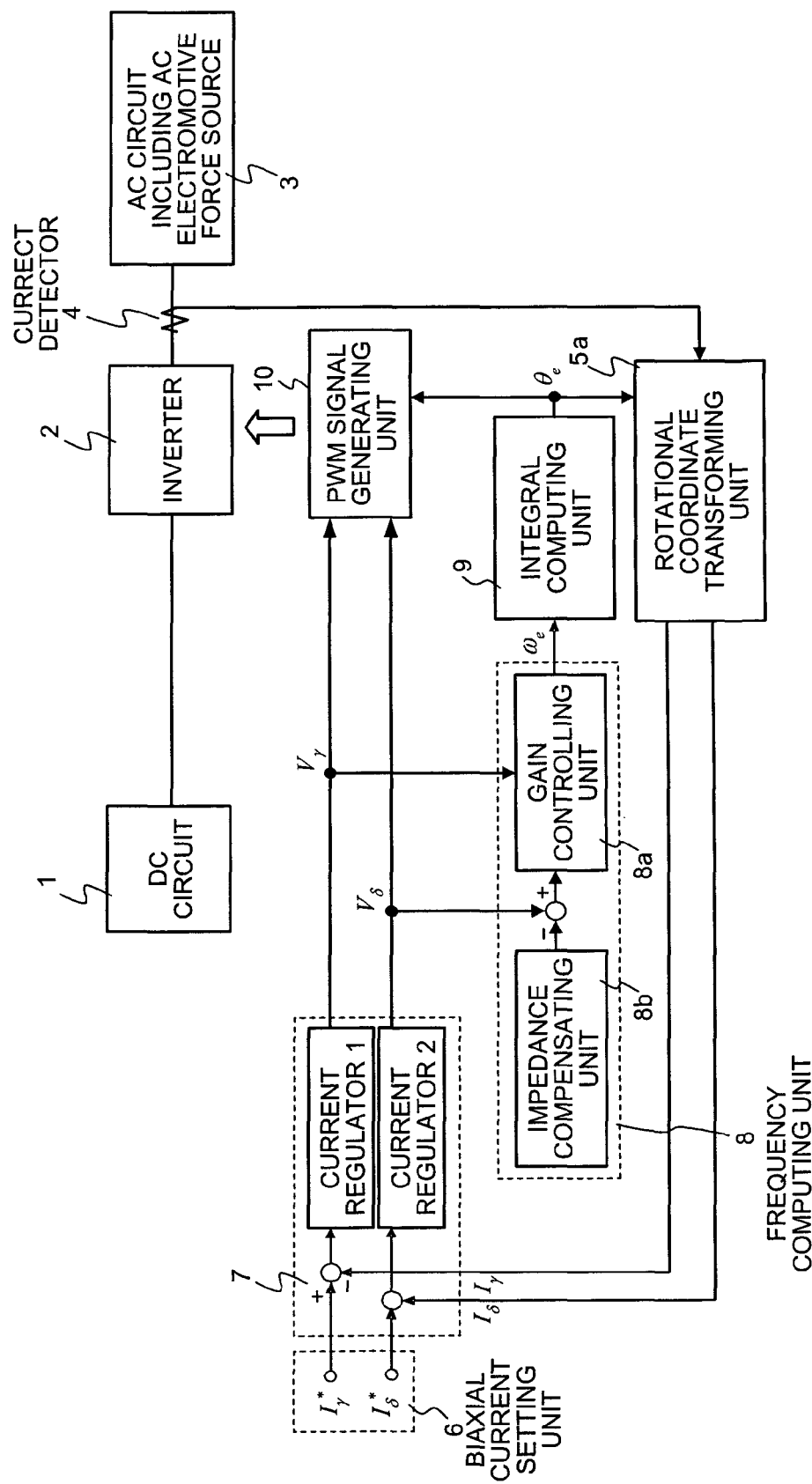
FIG. 8 is a block diagram of the power conversion controlling apparatus of the present invention in which the frequency computing unit includes an impedance compensating unit.

FIG. 8 is a diagram of an AC power conversion controlling apparatus according to a third embodiment. In FIG. 8, the same numerals are attached to components having functions equivalent to those of components in FIG. 2-1 to omit a description of common portions. The power conversion controlling apparatus according to the third embodiment has a configuration in which an impedance compensating unit is provided in the frequency computing unit 8.

In FIG. 8, the frequency computing unit 8 is provided with an impedance compensating unit 8b that outputs a compensation value for compensating for a stationary or transient voltage drop in a line impedance portion when an amplitude command value corresponding to the active component of current among the amplitude command values output by the biaxial current controlling unit 7 changes. The frequency computing unit 8 adopts a value obtained by multiplying an added value of an amplitude command value corresponding to the active component of current or a time variation reduced value of the amplitude command value by, for example, an LPF (not shown) and an output of the impedance compensating unit 8b by a gain or a time variation reduced value of the gain multiplied value by, for example, an LPF as the operating frequency of the inverter 2.

The phase angle $\theta_e$ obtained from the formulas (13) and (14) can easily be made to match the rotational phase angle $\theta$ of the AC electromotive force source if the term of $E_a$ in the formula (2) is large. However, as the term of $E_a$ in the formula (2) becomes smaller, it becomes more difficult to perform follow-up control of the phase angle $\theta_e$ obtained by computation to an appropriate phase angle $\theta$. Thus, frequency phase follow-up properties can be improved by removing terms due to an impedance voltage drop shown in the first and second terms from Vδ in the formula (2).

An impedance compensation method will be described below in detail. First, substituting the δ axis voltage Vδ given by the formula (2) into the formula (13) showing a relationship between Vδ and $\omega_e$ yields the formula (15) shown below.

[Formula 15]

$$\omega_e = K_G \left[ RI_\delta + L\frac{dI_\delta}{dt} + \omega LI_\gamma + E_a \cos\beta \right] \quad (15)$$

Here, if a voltage drop and a transient current by circuit resistance can be ignored to control Iγ to 0, the formula (16) shown below can be obtained.

[Formula 16]

$$\omega_e \approx K_G E_a \cos\beta \quad (16)$$

If the AC electromotive force is assumed to be a motor, substituting the formula (10) yields the formula (17) shown below.

[Formula 17]

$$\omega_e \approx K_G k_\psi \omega \cos\beta \quad (17)$$

From the formula (17), if $\omega_e = \omega$, the computation proportional gain $K_G$ will be a value shown by the formula (18) shown below.

[Formula 18]

$$K_G \approx 1/(k_\psi \cos\beta) \quad (18)$$

The proportional gain $K_G$ in the formula (18) will be an approximate value of the appropriate proportional gain $K_G$ in the formula (13). If, in the formula (15), $E_a \cos\beta$ is large, the voltage drop RIδ by resistance can be ignored and also the second term dIδ/dt, which is a transient term, can be ignored due to a near stationary state. Therefore, the computed phase angle $\theta_e$ can be made to match the appropriate phase angle θ by tuning the proportional gain $K_G$ near the approximate value according to the formula (18) so that the γ-axis component voltage Vγ of the inverter output voltage vector V becomes zero.

If, in the formula (15), $E_a \cos\beta$ is small, an influence of line impedance drop of the first and second terms in the formula (15) grows and the ratio of the fourth term $E_a$ proportional to the frequency falls. Therefore, the appropriate proportional gain $K_G$ must change significantly and the frequency phase follow-up properties by the γ-axis component voltage Vδ significantly deteriorates. Thus, frequency phase follow-up properties can be improved by an amount obtained by subtracting a voltage ΔV compensating for a stationary/transient line impedance voltage drop in Vδ of the formula (15) being input into the frequency computing unit. A relationship between $\omega_e$ and Vδ in this case is shown by the formula (19) shown below.

[Formula 19]

$$\omega = K_G(V_\delta - \Delta V) \quad (19)$$

Accordingly, the frequency phase follow-up properties of the frequency when the amplitude command value of the active component of current changes can be improved.

Figure 9:
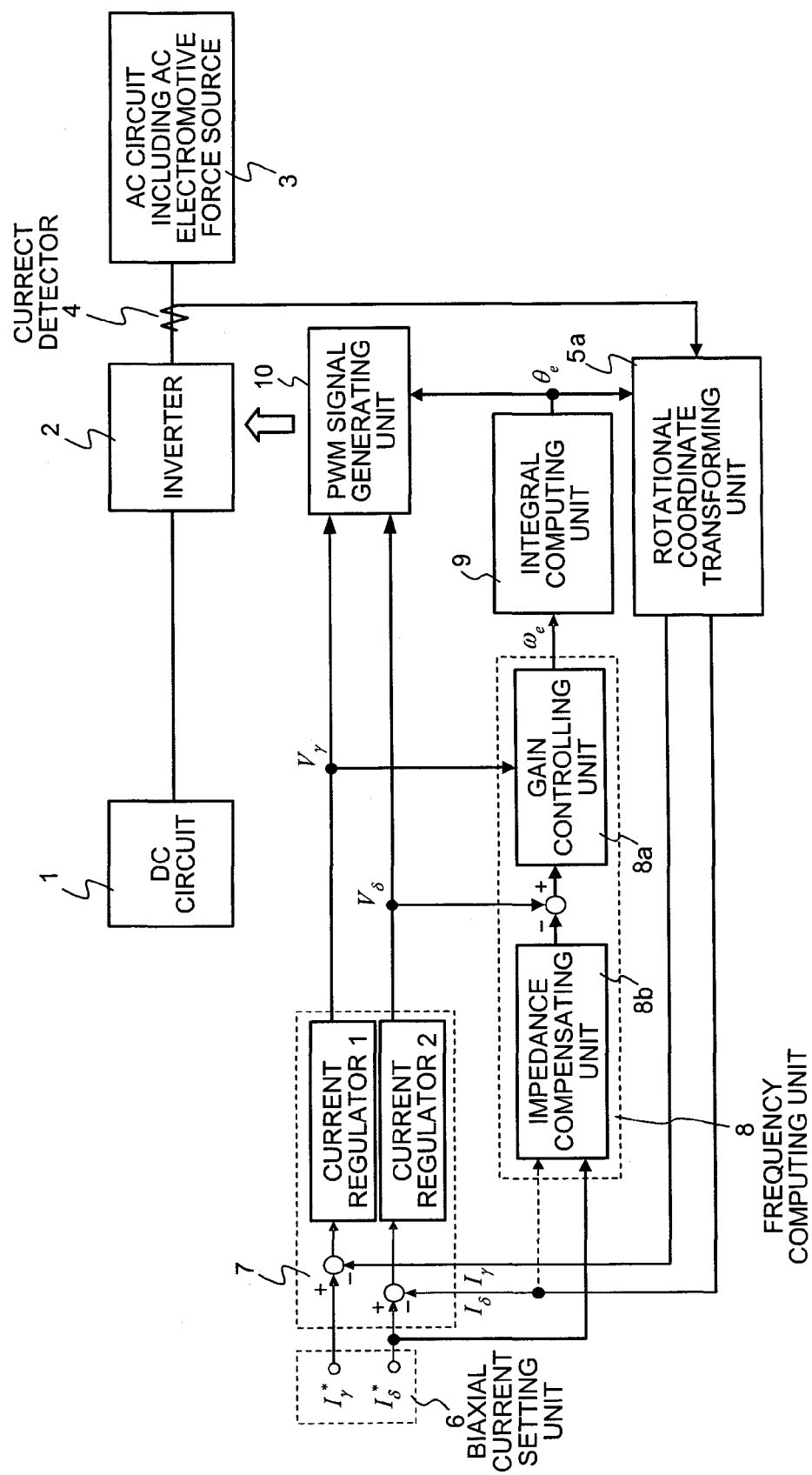
FIG. 9 is a block diagram of the power conversion controlling apparatus of the present invention in which Iδ is input into the impedance compensating unit.

The impedance compensating unit 8b may compute the compensation value using the active component of current or a command value of the active component of current. The configuration of the power conversion controlling apparatus in this case is shown in FIG. 9. More specifically, the resistance drop term and the differential drop term are included in ΔV in the formula (19) to which a compensating term of impedance voltage drop is added to change the form to the formula (20) shown below and the impedance compensating unit 8b compensates for the impedance voltage drop based on the active component of current Iδ or its setting value Iδ*.

[Formula 20]

$$\omega_e = K_G \left[ V_\delta - \left( RI_\delta + L\frac{dI_\delta}{dt} \right) \right] \quad (20)$$

The impedance compensating unit 8b may also compute the compensation value by reducing time variations of the active component of current or the command value of the active component of current. Control instability caused by a rapid change of the operating frequency of the AC circuit 3 compared with a case when no such rapid change occurs is thereby prevented. For example, if the operating frequency $\omega_e$ of the AC circuit 3 is extremely low, the current value detected by the current detector 4 will be small and the variation width ratio will be high in the detected current value. Thus, the variation ratio will also be high in the active component of current input into the impedance compensating unit 8b and current variations may excessively affect the compensation in the impedance compensating unit 8b. Therefore, by adding a filter for reducing time variations to a portion of the impedance compensating unit 8b where the active component of current is input, the frequency phase follow-up properties can be improved.

Figure 10:
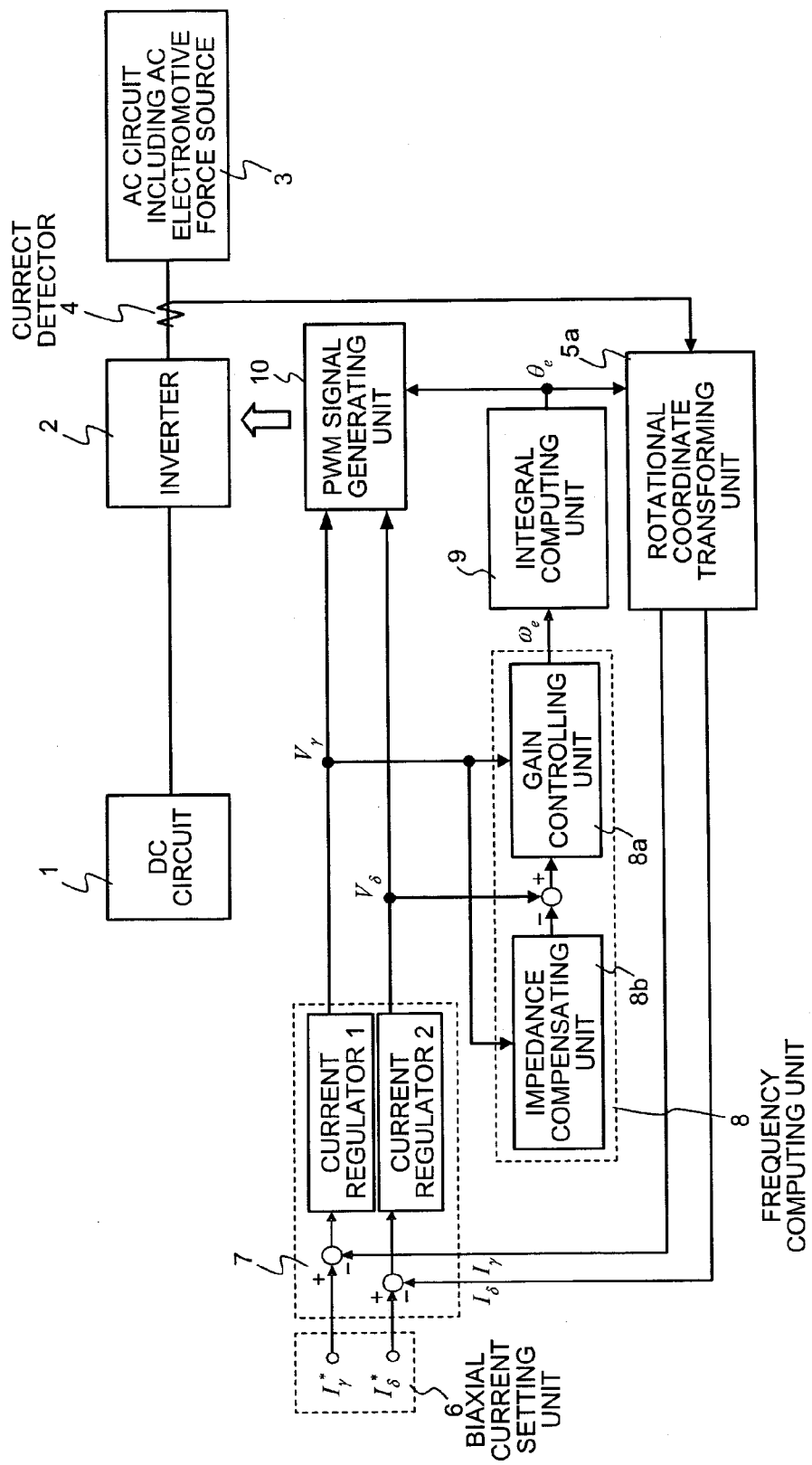
FIG. 10 is a block diagram of the power conversion controlling apparatus of the present invention in which Vγ is input into the impedance compensating unit.

Also, the impedance compensating unit 8b may compute the compensation value using the amplitude command value corresponding to the reactive component of current among the amplitude command values output by the biaxial current controlling unit 7. The configuration of the power conversion controlling apparatus in this case is shown in FIG. 10. Since the amplitude command value Vγ varies corresponding to the reactive component of current particularly during transient change under the influence of impedance voltage drop, the impedance compensating unit 8b may finally obtain a appropriate operating phase by making adjustments based on the formula (21) shown below using Vγ as ΔV.

[Formula 21]

$$\omega_e = K_G(V_\delta - k_\gamma V_\gamma) \quad (21)$$

Here, kγ is a proportionality factor for providing an appropriate compensation amount.

Fourth Embodiment

Figure 11:
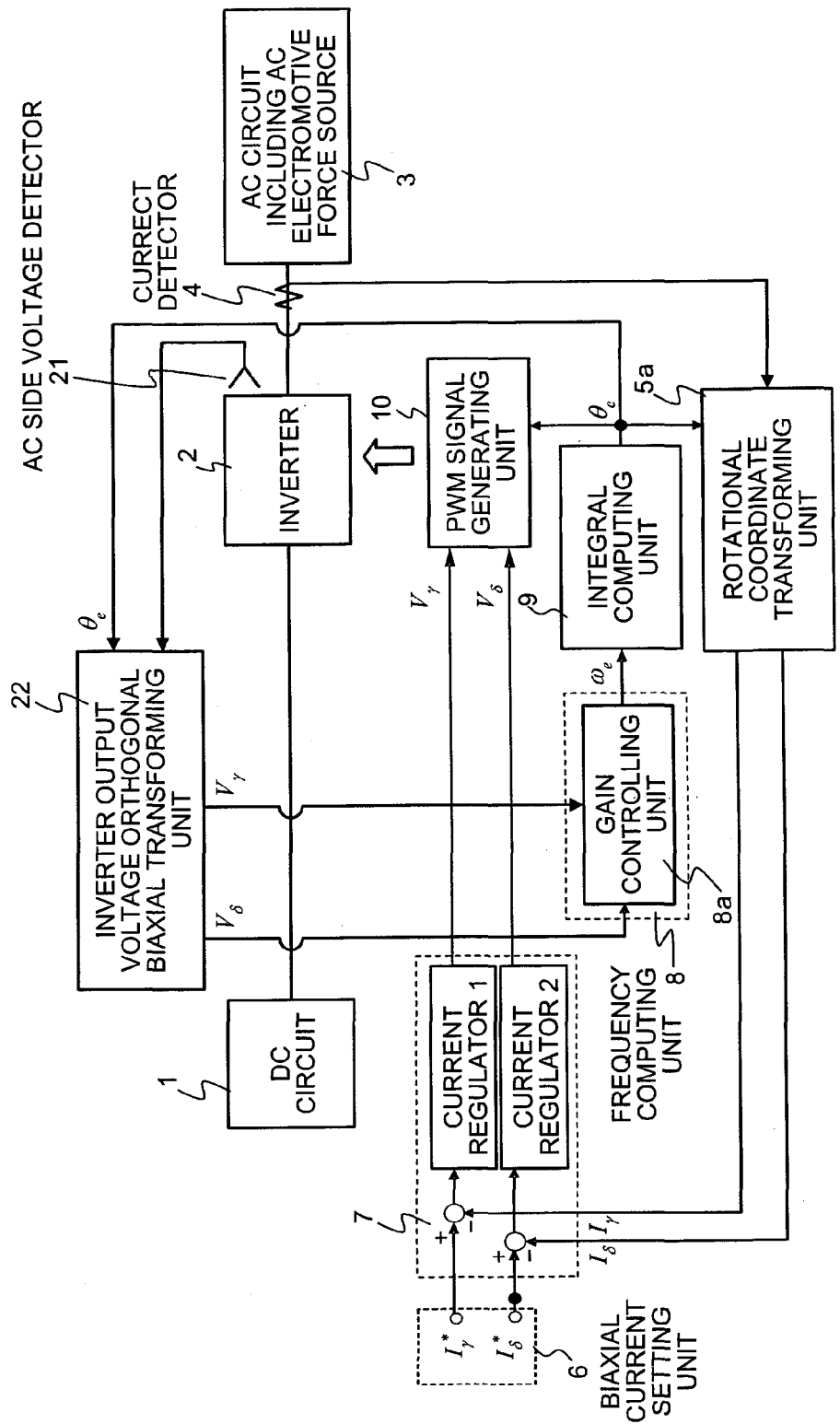

FIG. 11 is a diagram of a power conversion controlling apparatus according to a fourth embodiment. In FIG. 11, the same numerals are attached to components having functions equivalent to those of components in FIG. 2-1 to omit a description of common portions. As shown in FIG. 11, the power conversion controlling apparatus according to the fourth embodiment includes an AC side voltage detector 21 that detects an output voltage of the inverter 2 and an inverter output voltage orthogonal biaxial transforming unit 22 that performs an orthogonal biaxial transformation of an output voltage of the inverter 2. The inverter output voltage orthogonal biaxial transforming unit 22 computes a biaxial voltage by means of orthogonal biaxial transformation from the output voltage of the inverter 2 detected by the AC side voltage detector 21 and the phase angle signal $\theta_e$ of the integral computing unit 9 to output a signal of the amount corresponding to the amplitude command values Vδ and Vγ output by the biaxial current controlling unit 7 for each biaxial component to the frequency computing unit 8. The frequency computing unit 8 computes the operating frequency $\omega_e$ of the inverter 2 by replacing the amplitude command value with a signal value of the inverter output voltage orthogonal biaxial transforming unit 22 for each biaxial component and using these values.

Fifth Embodiment

Figure 12:
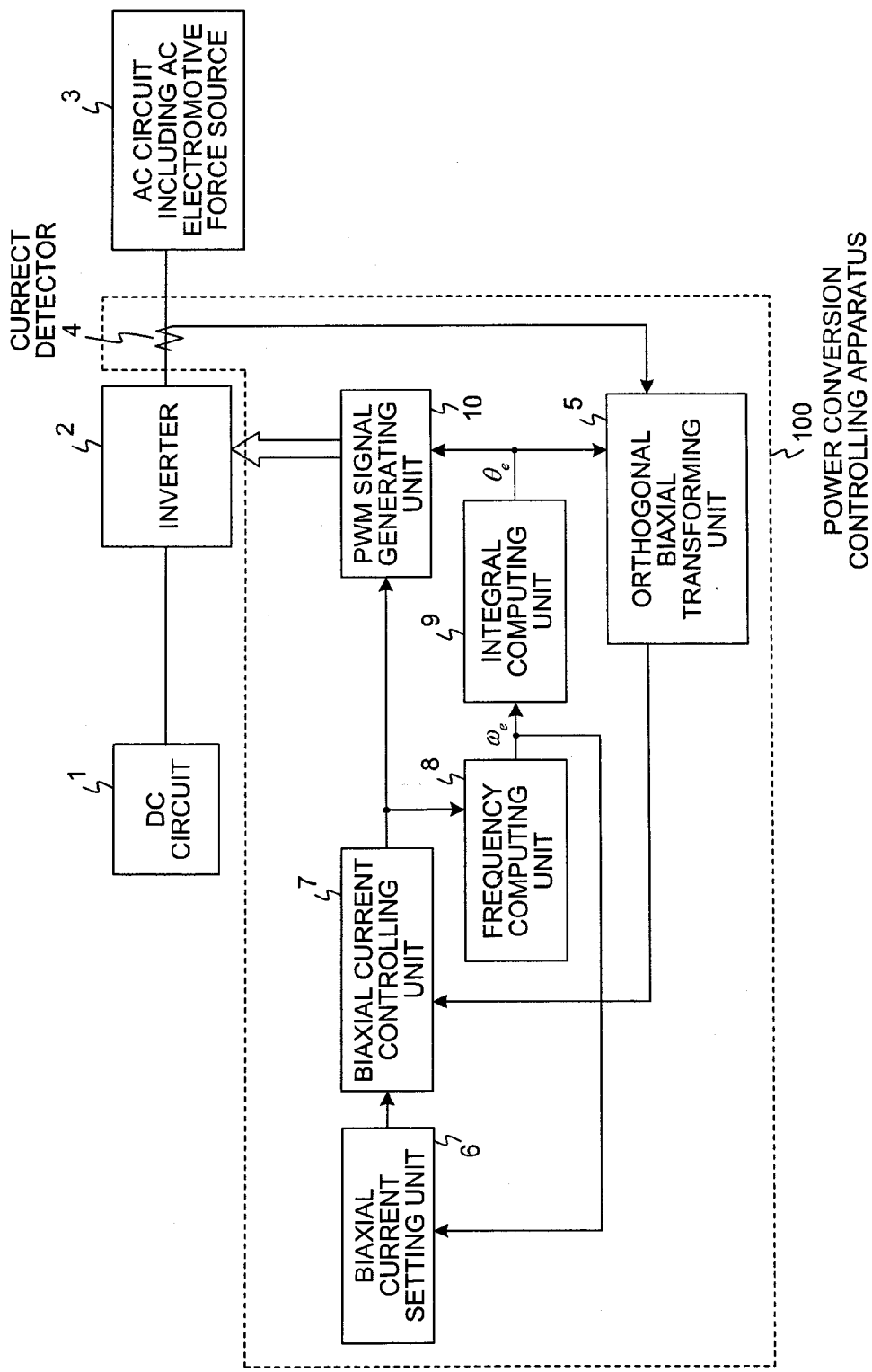
FIG. 12 is a block diagram of the power conversion controlling apparatus of the present invention in which an operating frequency of the inverter is input into a biaxial current setting unit.

FIG. 12 is a diagram of a power conversion controlling apparatus in a fifth embodiment. In FIG. 12, the same numerals are attached to components having functions equivalent to those of components in FIG. 2-1 to omit a description of common portions.

In FIG. 12, the biaxial current setting unit 6 computes a command value of the active component of current using the operating frequency $\omega_e$ of the inverter 2 output by the frequency computing unit 8. For example, when speed control of an AC machine connected to the AC side is performed, a rotational angular velocity $\omega_{me}$, of the AC machine may be computed by the formula (22) shown below using the operating frequency $\omega_e$ of the inverter 2.

[Formula 22]

$$\omega_{me} = \frac{2}{p}\omega_e \text{ (SYNCHRONOUS MOTOR)} \quad (22)$$

$$\omega_{me} = \frac{2}{p}\omega_e(1-s) \approx \frac{2}{p}\omega_e \text{ (INDUCTION MOTOR)}$$

Here, p denotes the number of poles of the motor and s denotes a slip of the induction motor. That is, a speed control loop can be formed, without using a speed sensor, by using an output of a speed regulator as the command value of the active component of current via the speed regulator by comparing with a speed setting value of the AC machine based the operating frequency $\omega_e$ of the inverter 2. Further, the operating frequency $\omega_e$ of the inverter 2 is not limited to speed settings of the AC machine and can be used also for settings of the reactive component of current in, for example, reactive power compensation.

Sixth Embodiment

Figure 13:
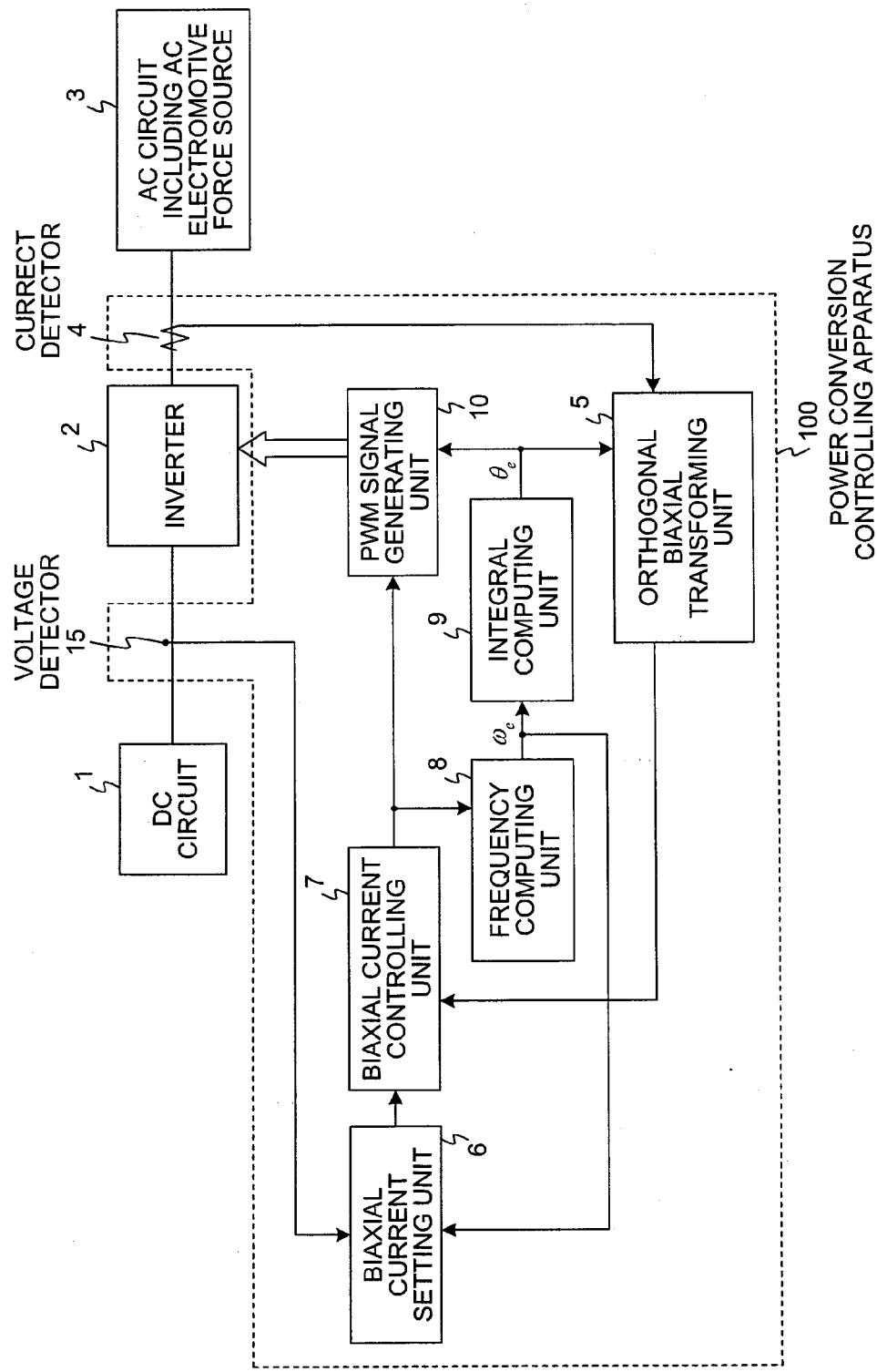
FIG. 13 is a block diagram of the power conversion controlling apparatus of the present invention in which a DC voltage of the inverter is input into the biaxial current setting unit.

FIG. 13 is a diagram of a power conversion controlling apparatus according to a sixth embodiment. In FIG. 13, the same numerals are attached to components having functions equivalent to those of components in FIG. 2-1 to omit a description of common portions. In FIG. 13, the biaxial current setting unit 6 computes the command value of the active component of current using the DC side voltage value of the inverter 2 detected by a voltage detector 15. If power is exchanged between the DC circuit 1 and the AC circuit 3 when the voltage of the DC circuit 1 is not determined, a DC voltage control loop can be formed by detecting the DC voltage, comparing the DC voltage with the DC voltage setting value, and using the output of the voltage regulator as the command value of the active component of current via the voltage regulator. Here, the DC circuit 1 is a DC load accompanied by DC voltage variations caused by a DC current, a DC power supply such as solar cells and fuel cells, or a DC circuit to which only a capacitor is connected such as an active filter and a reactive power compensating unit.

Seventh Embodiment

In a power conversion controlling apparatus in a seventh embodiment, the power factor is set arbitrarily in the power conversion controlling apparatus shown in FIG. 2-1 by adjusting the command value of the reactive component of current of the biaxial current setting unit 6. By regulating the reactive component of current, power factor 1 control at an output end of the inverter 2, power factor 1 control at an AC electromotive force source end of the AC circuit 3, and an operation as a reactive power compensating apparatus can be caused.

Figure 14:
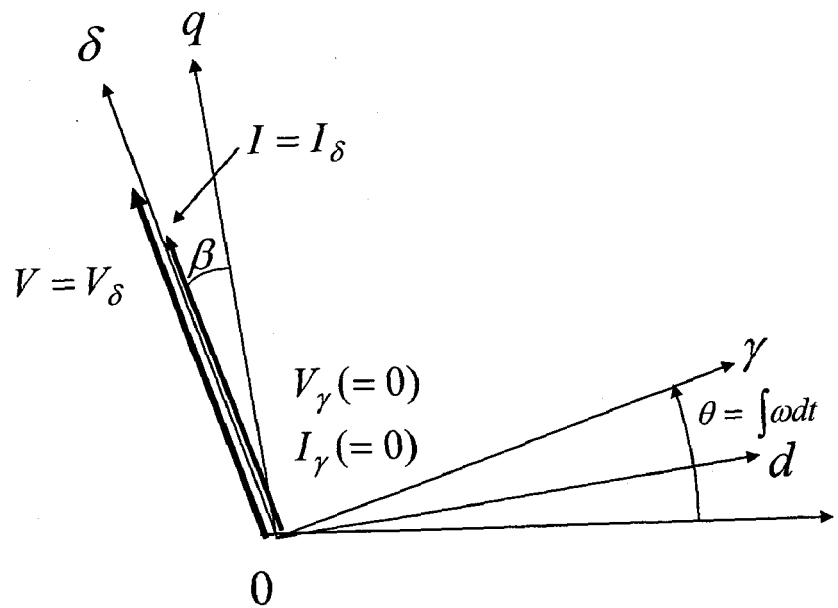
FIG. 14 is diagram of relationships between voltage and current vectors during power factor 1 operation at an output end of the inverter of the power conversion controlling apparatus of the present invention.

The biaxial current setting unit 6 determines the command value of the reactive component of current so that the power factor at the output end of the inverter 2 becomes 1. FIG. 14 is a diagram of relationships between voltage and current vectors during power factor 1 operation at the output end of the inverter of the power conversion controlling apparatus according to the seventh embodiment.

If, as shown in FIG. 14, the rotational phase angle $\theta_e$ of the inverter 2 can be made to match the rotational phase angle θ of the frequency of the AC electromotive force, like the voltage vector Vδ, the current vector becomes a δ-axis component current Iδ only when Iγ is controlled to 0 and Iδ to be constant so that the power factor at an inverter output end can be controlled to be 1. Accordingly, the power conversion controlling apparatus can be operated at high efficiency.

Figure 15:
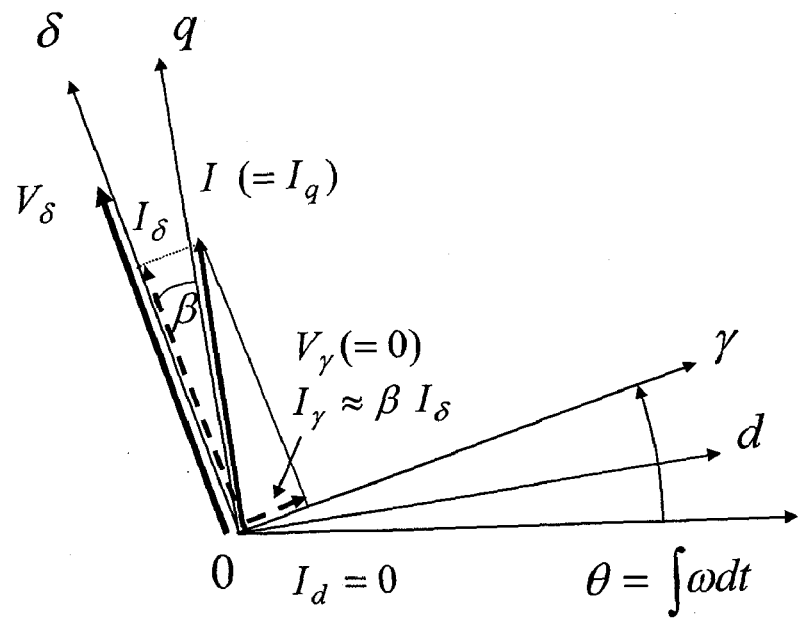
FIG. 15 is diagram of relationships between voltage and current vectors during power factor 1 operation at an electromotive force end of an AC circuit of the power conversion controlling apparatus of the present invention.

The biaxial current setting unit 6 determines the command value of the reactive component of current so that the power factor at the AC electromotive force source end of the AC circuit 3 becomes 1. By setting the command value in such a way that the power factor at the AC electromotive force end becomes 1, response characteristics of an AC motor can further be enhanced. FIG. 15 is a diagram of relationships between voltage and current vectors during power factor 1 operation at an electromotive force end of the AC circuit 3 of the power conversion controlling apparatus. In FIG. 15, an induced voltage vector $E_a$ of an AC machine matching the q axis and the current vector can be matched by giving the setting value Iγ* of the γ-axis component current Iγ by the formula (23) shown below, and can realize a power factor 1 operation at the electromotive force end. Maximum power can thereby be supplied to the AC electromotive force source and thus, high-speed response characteristics can be given.

[Formula 23]

$$I_\gamma = I_\delta \tan \beta \quad (23)$$

Here, if the AC electromotive force source derives from an AC motor, the angular frequency of the AC electromotive force source is proportional to ω and substituting the formula (11) into the formula (23) when β is small yields the formula (24) shown below.

[Formula 24]

$$I_\gamma \approx (L/k_\Psi)I_\delta^2 \quad (24)$$

Thus, as shown in the formula (24), the setting value Iγ* of the γ-axis component current Iγ is given as a product of Iδ², which is an amount of the square of δ-axis component current, and (L/kΨ). Since, as shown in the formula (10), kΨ is a proportionality constant proportional to the magnetic flux, kΨ is known and a constant value and 1/kΨ is also a constant value.

Eighth Embodiment

The AC circuit 3 may be made to be a circuit including one or a plurality of AC machines. If the AC circuit 3 is configured by a circuit including one AC machine, power can be exchanged with the DC circuit 1 by connecting the AC machine as the electromotive force source. If the AC circuit 3 is configured by a circuit including a plurality of AC machines, the plurality of AC machines are connected to one inverter in parallel and the plurality of AC machines are considered virtually to be one AC machine for operation/control.

A synchronous machine, a reluctance machine, an induction machine, or a synchronous induction machine can be used as the AC machine. If a synchronous machine is configured as the AC machine, a wide range of synchronous machines from ones having a field winding including saliency and non-salient poles to permanent-magnet synchronous machines can be applied. If a reluctance machine is configured as the AC machine, reluctance machines including neither field winding nor magnet become applicable by setting the reactive component of current and active component of current appropriately.

Figure 16:
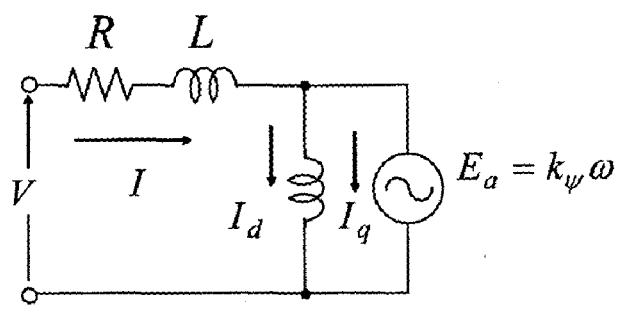
FIG. 16 is a diagram of a single-phase equivalent circuit when an electromotive force source involving an excitation circuit is connected to the AC circuit.

FIG. 16 depicts a single-phase equivalent circuit when viewed from a stator side of an induction machine. In FIG. 16, R denotes a wire wound resistor, L a wire wound inductance, and $E_a$ an electromotive force source proportional to the frequency, and $\omega$ and Lm shows an exciting inductance.

Figure 17:
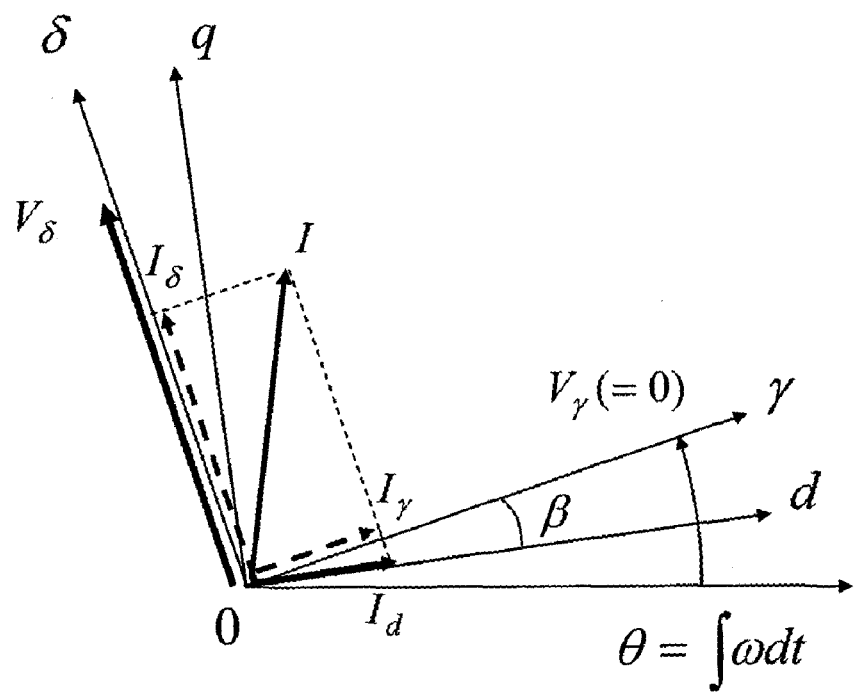
FIG. 17 is a diagram of voltage and current vectors when the electromotive force source involving the excitation circuit is connected to the AC circuit.

In the induction machine, a d-axis exciting component current $I_d = I_0$ must be flown in addition to a q-axis torque component current $I_q$ when the induced voltage vector is made to match the q axis. FIG. 17 is a diagram of voltage and current vectors when the electromotive force source involving an excitation circuit is connected to the AC circuit. In FIG. 17, the output voltage vector of the inverter 2 is assumed to have only a $\delta$-axis component and voltage and current vectors when a current vector obtained by adding a d-axis exciting component current Id to a $\delta$-axis component current I$\delta$ is I are shown. In this case, a $\gamma$-axis component current I$\gamma$ is given by the formula (25) shown below.

[Formula 25]

$$I_\gamma = I_0 \cos \beta \quad (25)$$

Figure 18:
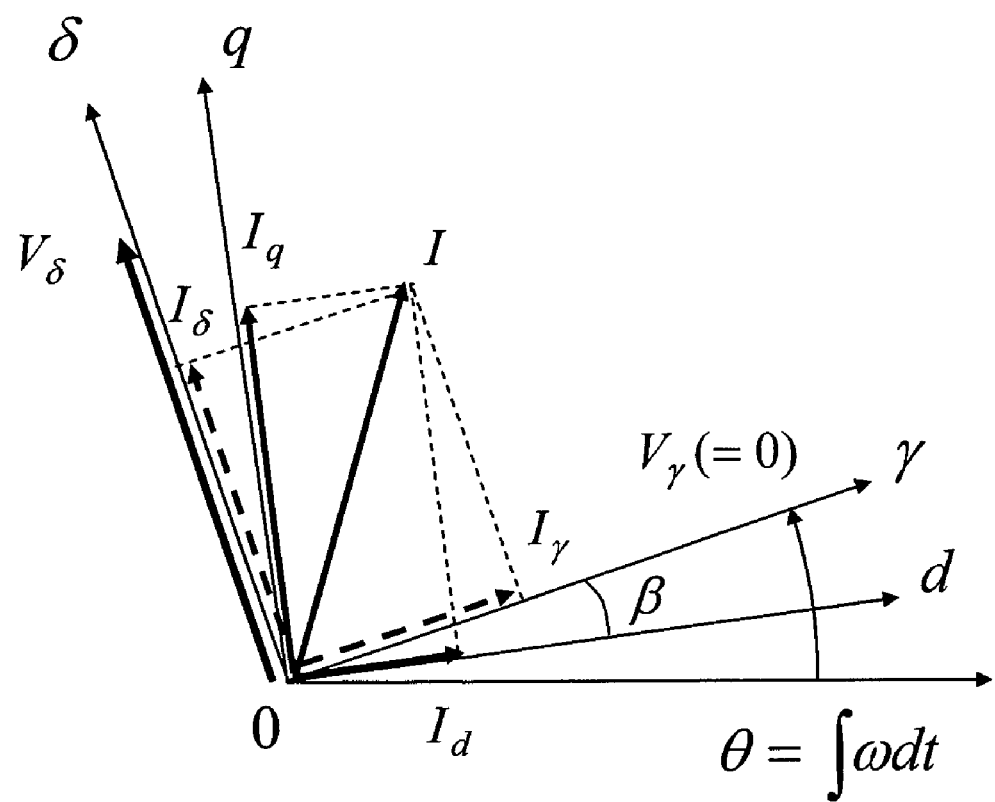
FIG. 18 is a diagram of voltage and current vectors during power factor 1 operation at the electromotive force end when the electromotive force source involving the excitation circuit is connected to the AC circuit.

Here, FIG. 18 depicts voltage and current vectors when the current of the induction machine is controlled by a resultant current vector I from the q-axis torque component current $I_q$ and the d-axis exciting component current $I_d = I_0$. In this case, the current vector I can be decomposed into the $\delta$-axis component current I$\delta$ and the $\gamma$-axis component current I$\gamma$, forming the exemplified relationships. The $\gamma$-axis component current I$\gamma$ is given by the formula (26) shown below.

[Formula 26]

$$I_\gamma = I_0 \cos \beta + I_\delta \tan \beta \quad (26)$$

Here, substituting the formula (24) assuming that $\beta$ is small yields the formula (27) shown below.

[Formula 27]

$$I_\gamma \approx I_0 + (L/k_\psi)I_\delta^2 \quad (27)$$

Since vector control of the biaxial component current can independently be performed, response characteristics can be enhanced when compared with the general V/f constant control. By providing the setting value I$\gamma$* of the reactive component of current by the formula (27), the power factor between the torque component current $I_q$ and the AC electromotive force $E_a$ excluding the exciting component current $I_d$ becomes 1, enabling still faster control.

Since magnetization can be caused by flowing a lagging reactive component of current I$\gamma$ of the biaxial component current in the power conversion controlling apparatus, a high torque can be caused without increasing the active component of current I$\delta$ significantly. Also, demagnetization can be caused by flowing a leading reactive component of current I$\gamma$, enabling high-speed operation control without raising the voltage.

Though increasing/decreasing the lagging reactive component of current I$\gamma$ is affected by a saturation phenomenon of the magnetic circuit, the power conversion controlling apparatus can be controlled without being affected by magnetization/demagnetization control by the reactive component of current I$\gamma$ because sensorless control of the present invention does not depend on any estimation method using a motor model even though the magnetic flux model of the motor is unknown. By adjusting the command value of the biaxial current of the biaxial current setting unit 6, as described above, magnetization or demagnetization of a magnetic field can be caused.

Ninth Embodiment

Figure 19:
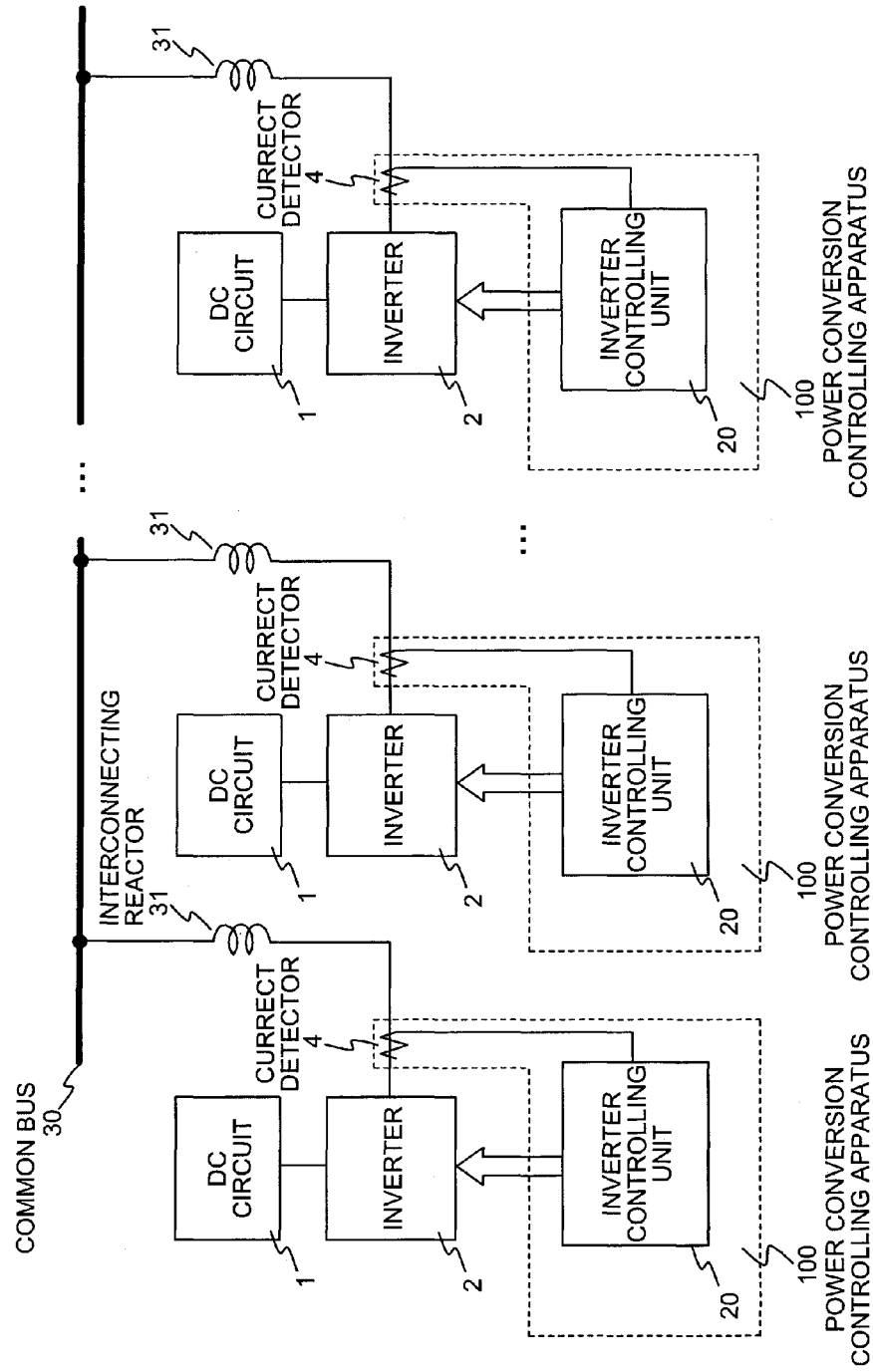
FIG. 19 is a diagram of the power conversion controlling apparatuses in which a plurality of inverters are connected.

As the AC electromotive force source of the AC circuit 3, for example, a commercial power supply, an AC side output of another inverter, or an AC load including a capacitor may be used. The AC side output of another inverter may be connected via a serially coupled reactor as the AC circuit 3 to mutually exchange power. FIG. 19 is a diagram of the power conversion controlling apparatuses in which a plurality of inverters are connected. FIG. 19 can suitably be used when only weak electric power systems are interconnected. Loads are connected to a common bus 30 and the inverter 2 is connected to the common bus 30 via an interconnecting reactor 31.

Figure 20:
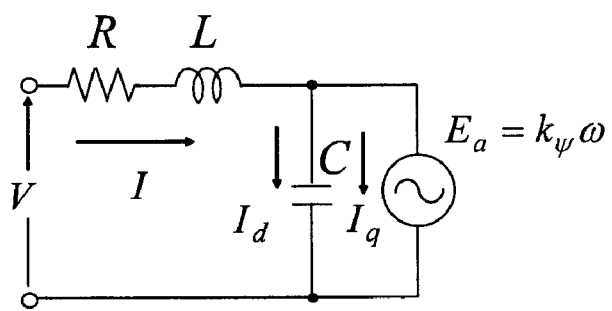
FIG. 20 is a diagram of a single-phase equivalent circuit when an AC load including a capacitor is connected to the AC circuit.
Figure 21:
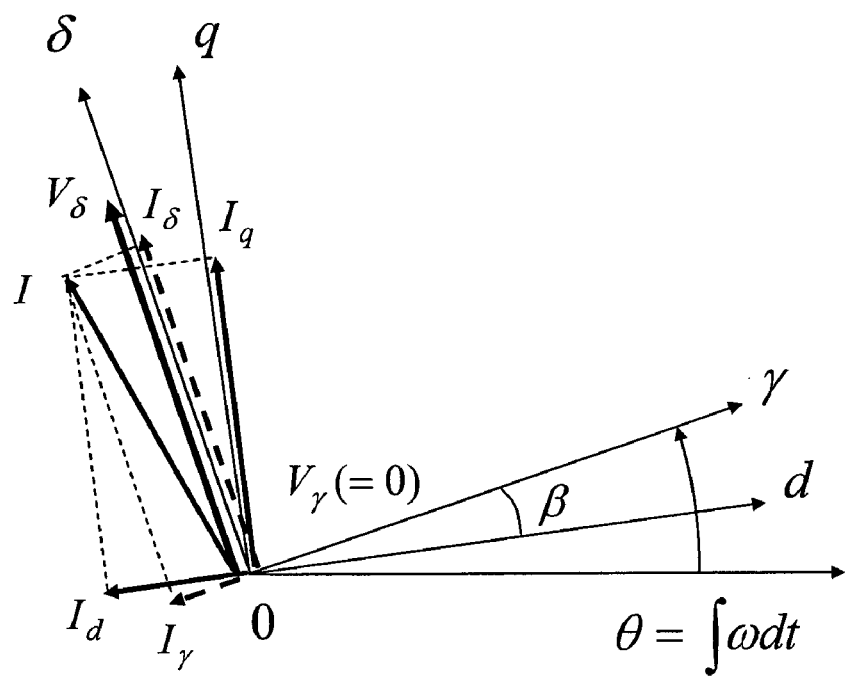
FIG. 21 is a diagram of voltage and current vectors during power factor 1 operation at a capacitor end when the AC load including the capacitor is connected to the AC circuit.

A case when an AC circuit including a capacitor via a serially coupled reactor is connected as the AC circuit 3 will be described. In this case, the voltage charged in the capacitor acts as the AC electromotive force source of the AC circuit 3. FIG. 20 is a single-phase equivalent circuit, and R denotes a wire wound resistor, L a wire wound inductance, C a capacitor, and $E_a$ a load connected to the capacitor in parallel. FIG. 21 depicts a relationship diagram of voltage and current vectors with respect to the $\delta$-$\gamma$ axis and the q-d axis when a current in phase with the capacitor terminal voltage flows through the load. In addition to the active component of current $I_q$ to the load, the leading reactive component of current $I_d$ must be flown and the resultant current vector I of such current vectors can be decomposed into the $\delta$-axis component current I$\delta$ and the $\gamma$-axis component current I$\gamma$, forming the exemplified relationships.

In the power conversion controlling apparatus according to the ninth embodiment, power exchange between DC and AC, that is, power conversion when the AC circuit that can exchange active power between the AC electromotive force source and inverter output can be performed. An AC power supply failure state in which some failure occurs in a commercial power supply or a generator constituting the AC power supply can also be detected by the power conversion controlling apparatus.

Tenth Embodiment

The DC circuit 1 of the power conversion controlling apparatus may be, for example, a circuit including a capacitor, a DC power supply, or a DC load. If the DC circuit 1 is configured with the circuit including a capacitor, reactive power can be exchanged between the DC circuit side and AC circuit side even in a state in which only a capacitor is connected on the DC circuit side and therefore, the apparatus can be operated as a reactive power compensating apparatus or an active filter.

If the DC circuit 1 is configured with the circuit including the DC power supply, this means that power is exchanged from the DC power supply to the AC power supply. If, for example, an AC motor is connected to the AC circuit 3, the DC power supply can be used as a drive energy source of an inverter and, if an AC generator or a commercial power supply is connected to the AC circuit 3, the DC power supply can be used as an energy source to transfer power to the AC circuit side. Also, when charging, for example, an accumulator in the DC circuit from the AC circuit side, the DC power supply can be used as an energy source to transfer power to the AC circuit side. If the DC circuit 1 is configured with the circuit including a DC load, power can be supplied from a generator or AC power supply of the AC circuit to the DC load in the DC circuit.

Meanwhile, the present invention is not limited to the above first to tenth embodiments and can be carried out by combining each of the first to tenth embodiments. The above embodiments have been described using a three-phase AC, but the present invention is not limited to this and is applicable to any two-phase AC or higher. Examples 1 to 9 of power conversion control systems to which the power conversion controlling apparatuses according to the first to tenth embodiments are applied will be described below.

Example 1

Figure 22:
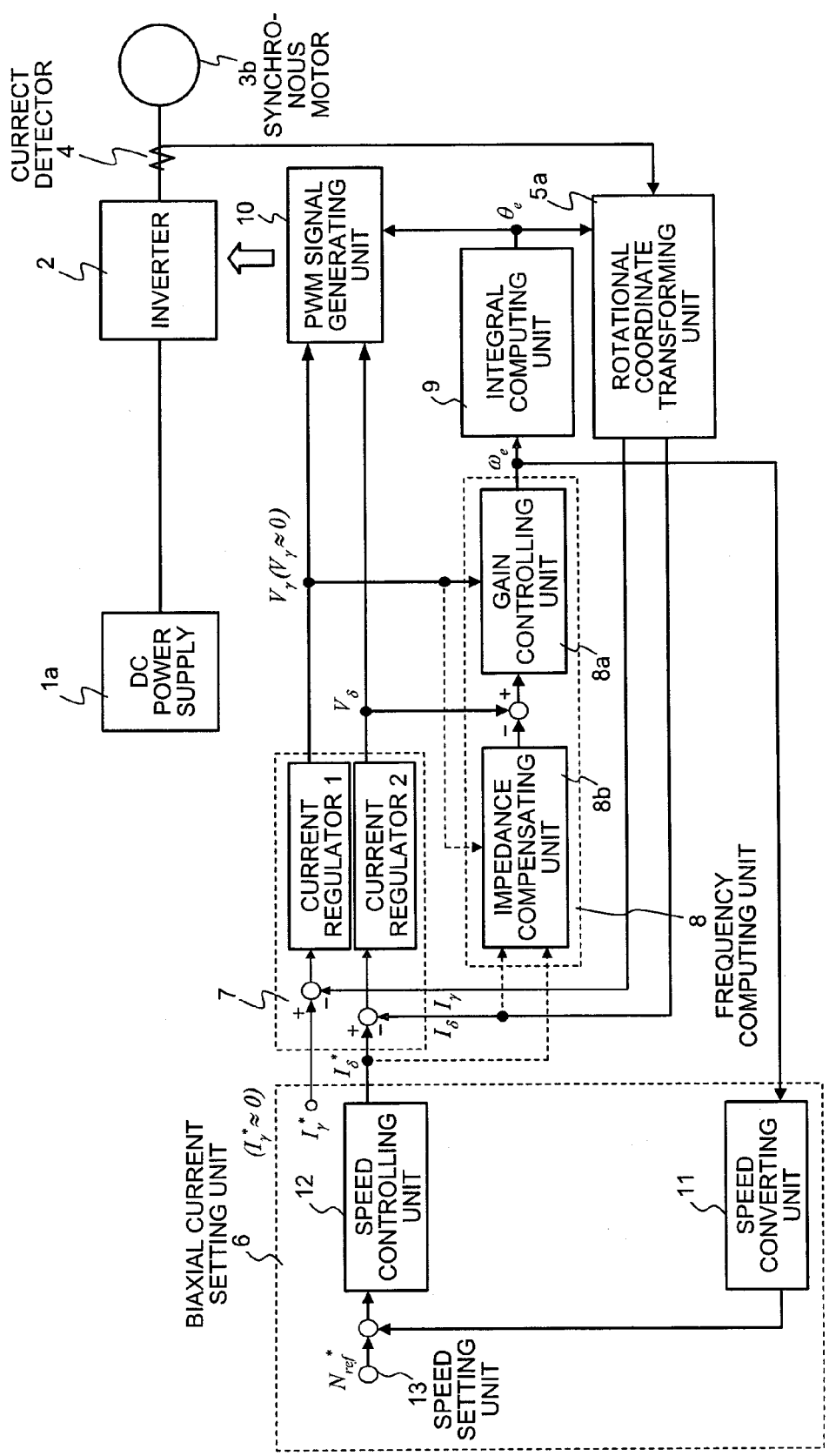
FIG. 22 is a block diagram of Example 1 when a synchronous motor is connected to the AC circuit in the power conversion controlling apparatus of the present invention.

FIG. 22 is a diagram of a power conversion control system according to Example 1. The power conversion control system shown in FIG. 22 performs speed control of a synchronous motor 3b without using a rotational position sensor or a speed sensor by connecting the synchronous motor 3b as an AC machine including an electromotive force source to the AC circuit 3 from a DC power supply 1a, which is the DC circuit 1, via the inverter 2.

A current flowing through the synchronous motor 3b is detected by the current detector 4. A coordinate transformation is performed by the rotational coordinate transforming unit 5a, which is the orthogonal biaxial transforming unit 5, and voltage command values (that is, amplitude command values) Vδ and Vγ are generated via the biaxial current controlling unit 7 so that rotational coordinate-transformed biaxial amounts Iδ and Iγ match corresponding biaxial current setting values Iδ* and Iγ* respectively to output the voltage command values to the PWM signal generating unit 10 and the frequency computing unit 8.

The PWM signal generating unit 10 generates a PWM signal to control the inverter 2. The amplitude command values Vδ and Vγ are at the same time used by the gain controlling unit 8a of the frequency computing unit 8 to determine the operating frequency $\omega_e$ of the inverter by multiplying the amplitude command value Vδ by a gain so that Vγ becomes zero. By integrating the operating frequency of the inverter by the integral computing unit 9, the phase angle signal $\theta_e$ made to match the phase angle θ of the internal electromotive force of the synchronous motor 3b is obtained.

Meanwhile, the impedance compensating unit 8b is effective for compensating for being incapable of controlling Vγ to zero when the reference value Iδ* of the active component of current changes markedly due, for example, to acceleration or deceleration. The case is shown here in which a compensation is made based on the active component of current command value Iδ*. The active component of current command value Iδ* is obtained from an output of a speed controlling unit 12 causing an estimated speed value obtained from the operating frequency $\omega_e$ of the inverter 2 by a speed converting unit 11 and a speed setting reference value to match. The reactive component of current command value Iγ* is set to zero. The phase angle $\theta_e$ determined by a control loop is used as a reference phase of coordinate transformation in the rotational coordinate transforming unit 5a and the PWM signal generating unit 10.

Experiments 1 to 8 of the power conversion control system according to Example 1 (FIG. 22) will be described.

[Experiment 1]

Figure 23:
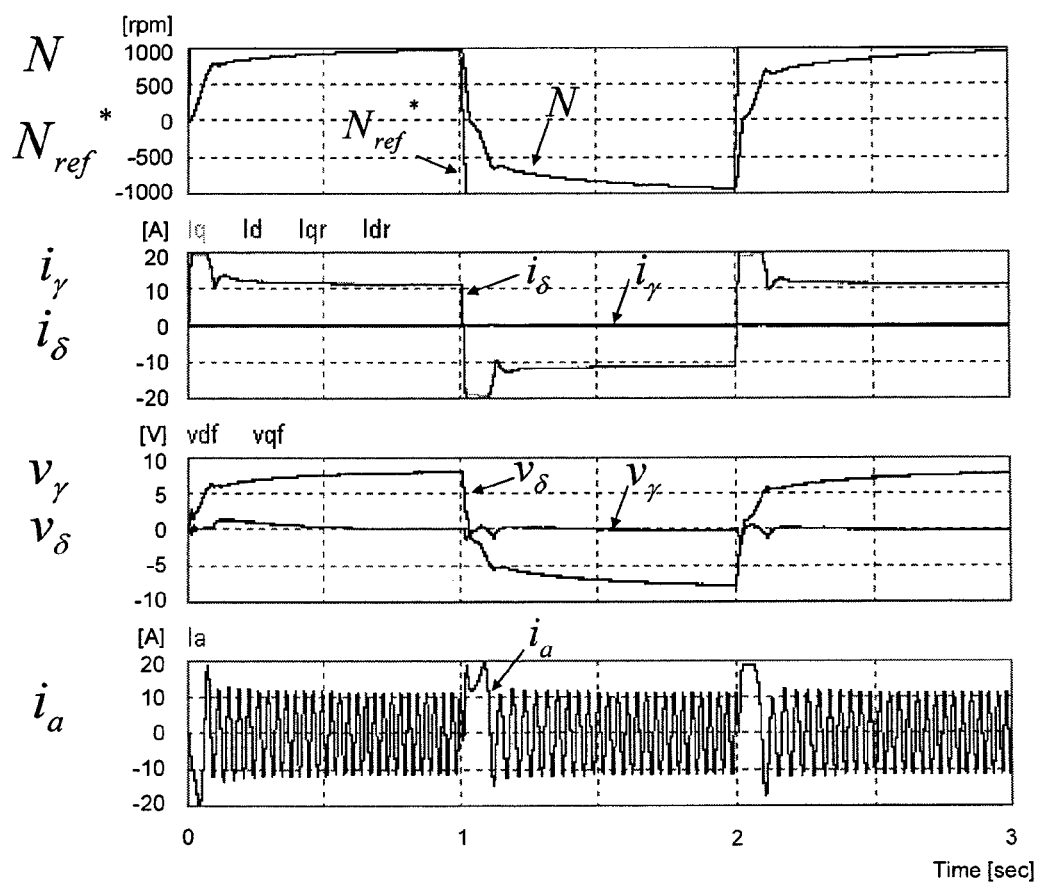
FIG. 23 is a diagram of simulation analysis results for the block diagram of Example 1 when the synchronous motor is connected to the AC circuit in the power conversion controlling apparatus of the present invention.

FIG. 23 depicts operation waveforms of simulation analysis performed when the DC operating voltage of the inverter is made to operate at 300 V using a permanent-magnet synchronous motor of 2.2 kW with four poles in the power conversion control system according to Example 1 (FIG. 22). Circuit constants include an armature resistance of 1Ω, an inductance of 10 mH, an electromotive force coefficient of 200 V/krpm, and a moment of inertia of 0.01 kgm². FIG. 23 depicts velocity response waveforms when the speed setting value is changed between +1000 rpm and −1000 rpm in a 0.5 Hz cycle. It can be verified that the active component of current Iδ has values drifting up to limiting values due to a moment of inertia of the motor in acceleration and deceleration sections and is a constant load current during normal operation. It can also be verified that the setting value Iγ of the reactive component of current is controlled to zero and the amplitude command value Vγ is also controlled to zero and, as a result, normal rotation and reverse rotation operations can be performed with power factor 1. Meanwhile, as shown in the formula (12), the amplitude command value Vδ can be verified to make the same change as the number of revolutions proportional to the frequency. $i_a$ in FIG. 23 denotes single-phase current waveforms.

[Experiment 2]

Figure 24:
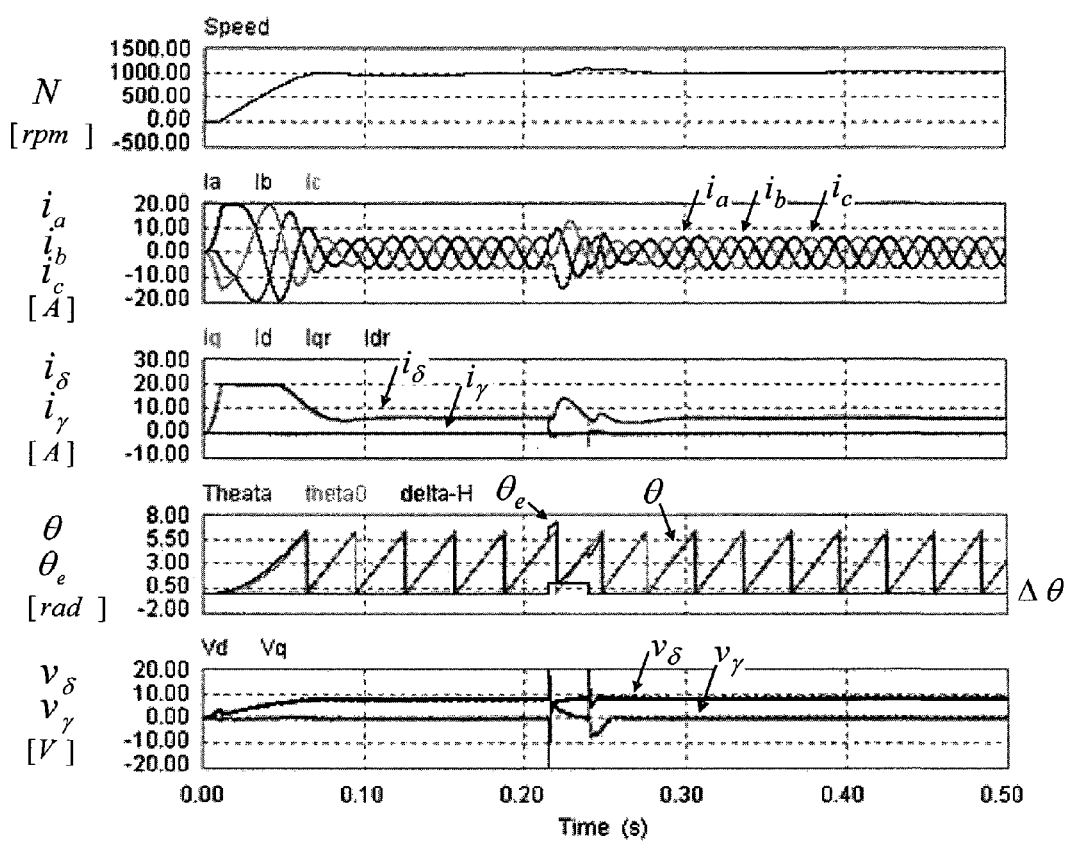
FIG. 24 is a diagram of simulation analysis results of transient phase follow-up control for the block diagram of Example 1 when the synchronous motor is connected to the AC circuit in the power conversion controlling apparatus of the present invention.

FIG. 24 depicts, for the same power conversion control system as that in Experiment 1 and circuit parameters of the synchronous motor 3b, transient response characteristics from starting up to a steady operation by setting the speed setting value to 1000 rpm. It can be verified that the phase angle $\theta_e$ showing the rotational position determined by computation is well controlled to follow up an actual phase angle θ. As a result of controlling Vγ to remain zero even if the inverter phase is changed by only Δθ=1 [rad] after a transition to a steady state occurs when the number of revolutions of 1000 rpm is reached, it can be verified that the phase angle $\theta_e$ determined by computation is well controlled to follow up the actual phase angle θ.

[Experiment 3]

Figure 25:
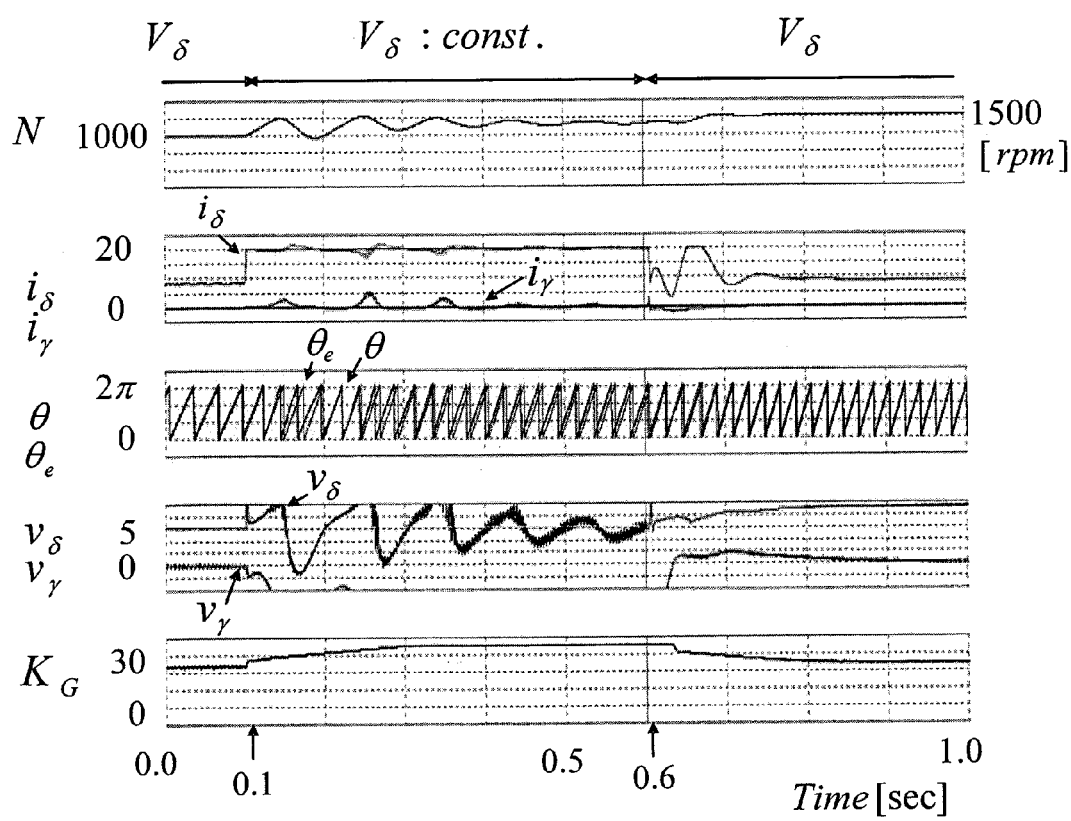
FIG. 25 is a diagram of simulation analysis results of phase follow-up control by Vδ for the block diagram of Example 1 when the synchronous motor is connected to the AC circuit in the power conversion controlling apparatus of the present invention.

FIG. 25 depicts, for the same power conversion control system as that in Experiment 1 and circuit parameters of the synchronous motor 3b, operation waveforms when input of the amplitude command value Vδ corresponding to the active component of current into the frequency computing unit 8 is fixed to a value of Vδ just before reaching 1000 rpm when the speed setting value reaches 1000 rpm and, after changing the speed setting value to 1500 rpm, input of the amplitude command value Vδ into the frequency computing unit 8 is again brought back to the value of Vδ computed in real time. It can be verified that, though it is impossible to control to follow up a suitable frequency when the input value of the amplitude command value Vδ into the frequency computing unit 8 is fixed to a constant value, the operating phase angle $\theta_e$ of the inverter follows up the actual phase angle θ with stability when the amplitude command value Vδ is computed in real time and therefore, Vδ is very effective for input into the frequency computing unit 8.

[Experiment 4]

Figure 26:
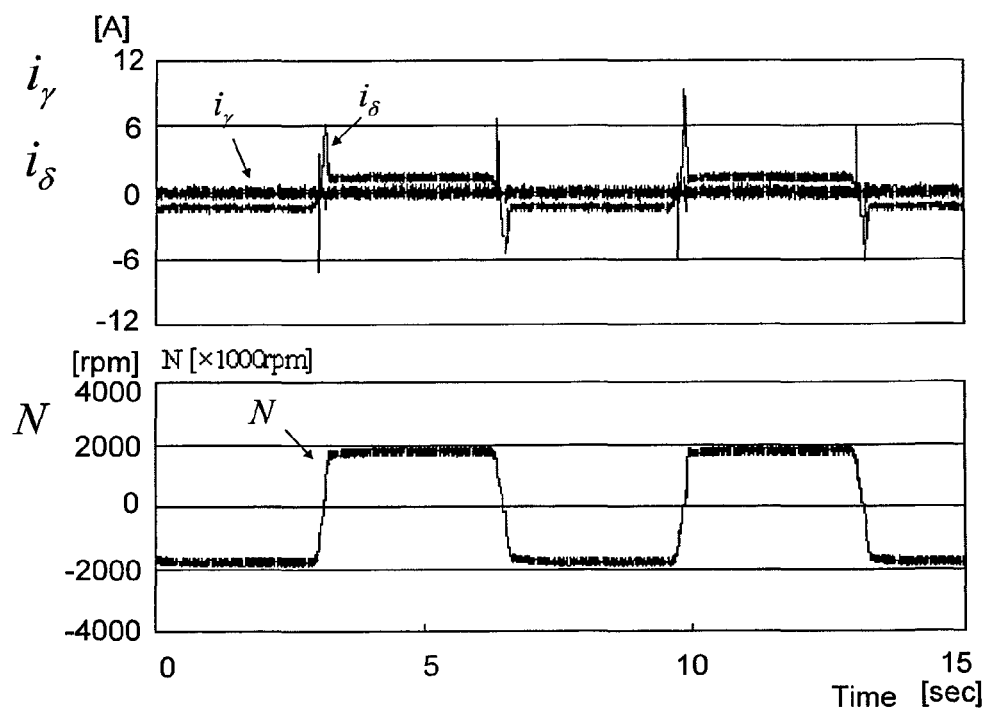
FIG. 26 is a diagram of experimental results of Example 1 when the synchronous motor is connected to the AC circuit in the power conversion controlling apparatus of the present invention.
Figure 27:
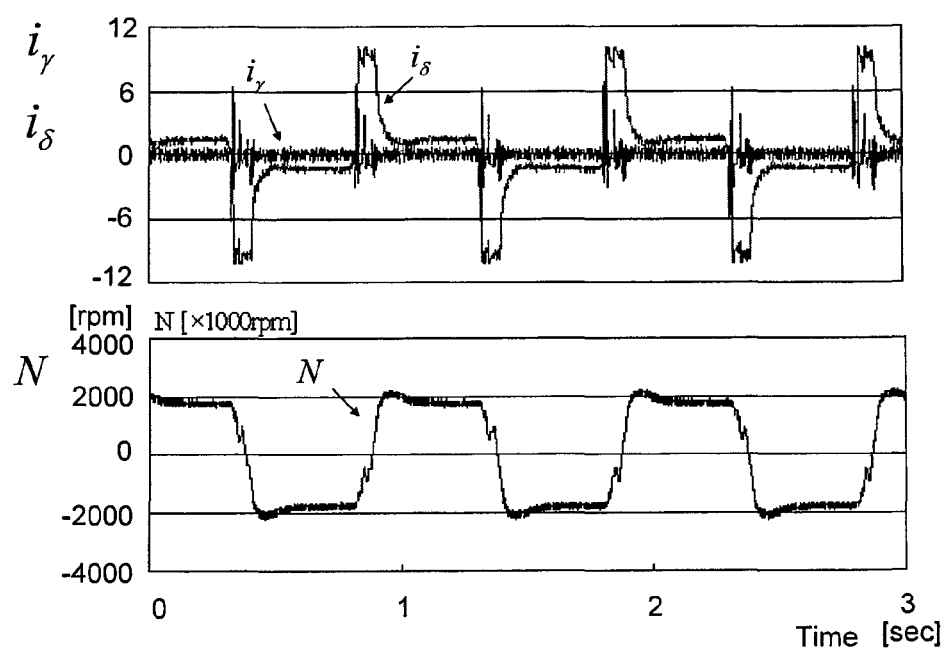
FIG. 27 is a diagram of experimental results of Example 1 when the synchronous motor is connected to the AC circuit in the power conversion controlling apparatus of the present invention.

The power conversion control system according to Example (FIG. 22) was configured and controlled using a DSP and its operation was verified by performing an experiment. FIG. 26 and FIG. 27 depict experimental results when normal rotation and reverse rotation operations were performed by changing the speed setting value between +2000 rpm and −2000 rpm under no load at 150 V of the DC operating voltage of the inverter using a permanent-magnet synchronous motor of 0.5 kW with four poles. FIG. 26 depicts normal/reverse rotation operation waveforms when the speed control period for normal/reverse rotation operations is about 7 seconds and FIG. 27 depicts normal/reverse rotation operation waveforms when the speed control period for normal/reverse rotation operations is about 1 second. It can be verified that the active component of current Iδ has a large value due to the moment of inertia of the motor during reversal of normal/reverse rotation, but a small current value due to no load during steady operation. It can be verified from these results that, in the present invention, biaxial current vector control can be performed only by detection control of the AC current using neither position sensor nor speed sensor from a synchronous motor and normal rotation and reverse rotation operations can be performed with good response.

[Experiment 5]

Figure 28:
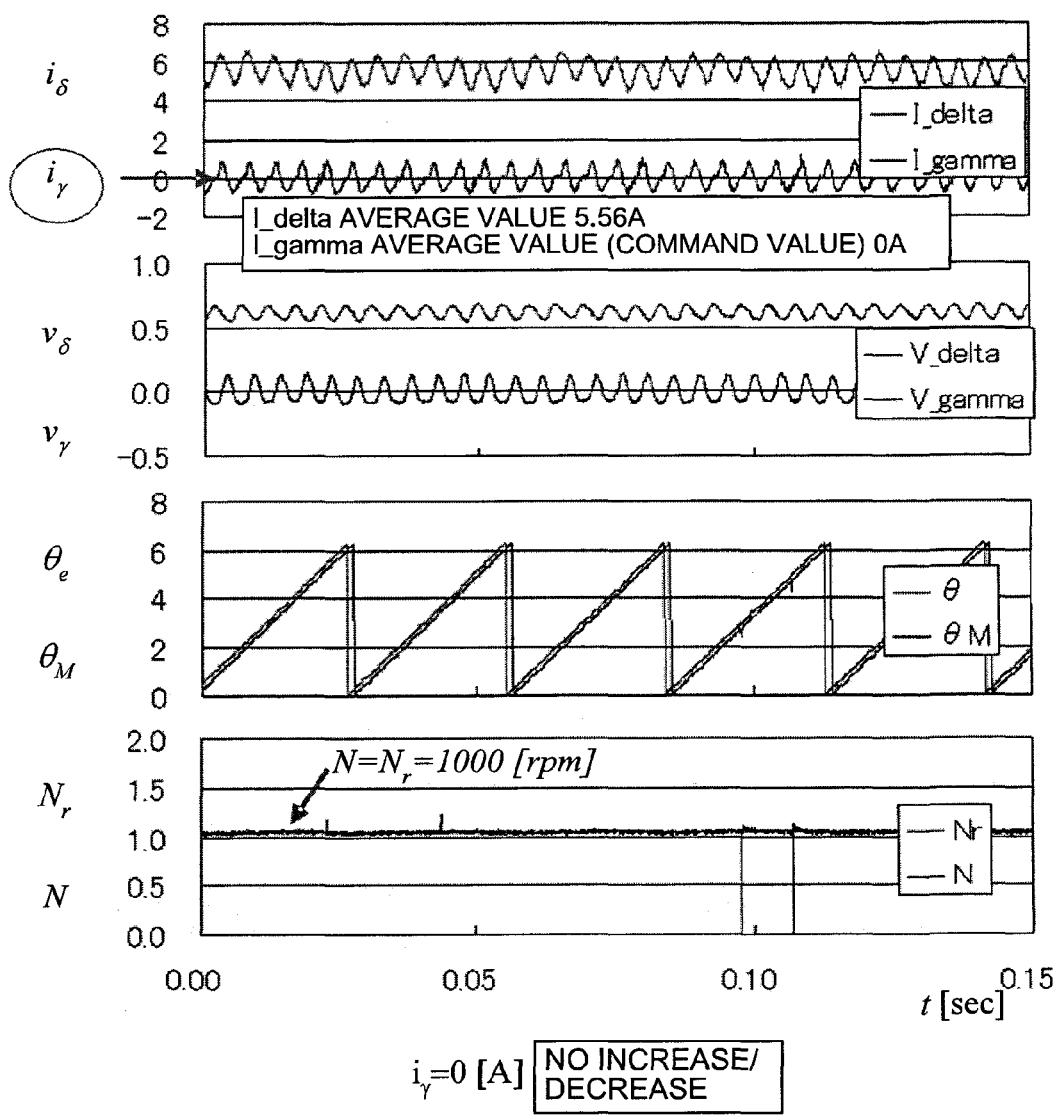
FIG. 28 is a diagram of experimental results at Iγ*=0 A in Example 1 when the synchronous motor is connected to the AC circuit in the power conversion controlling apparatus of the present invention.
Figure 29:
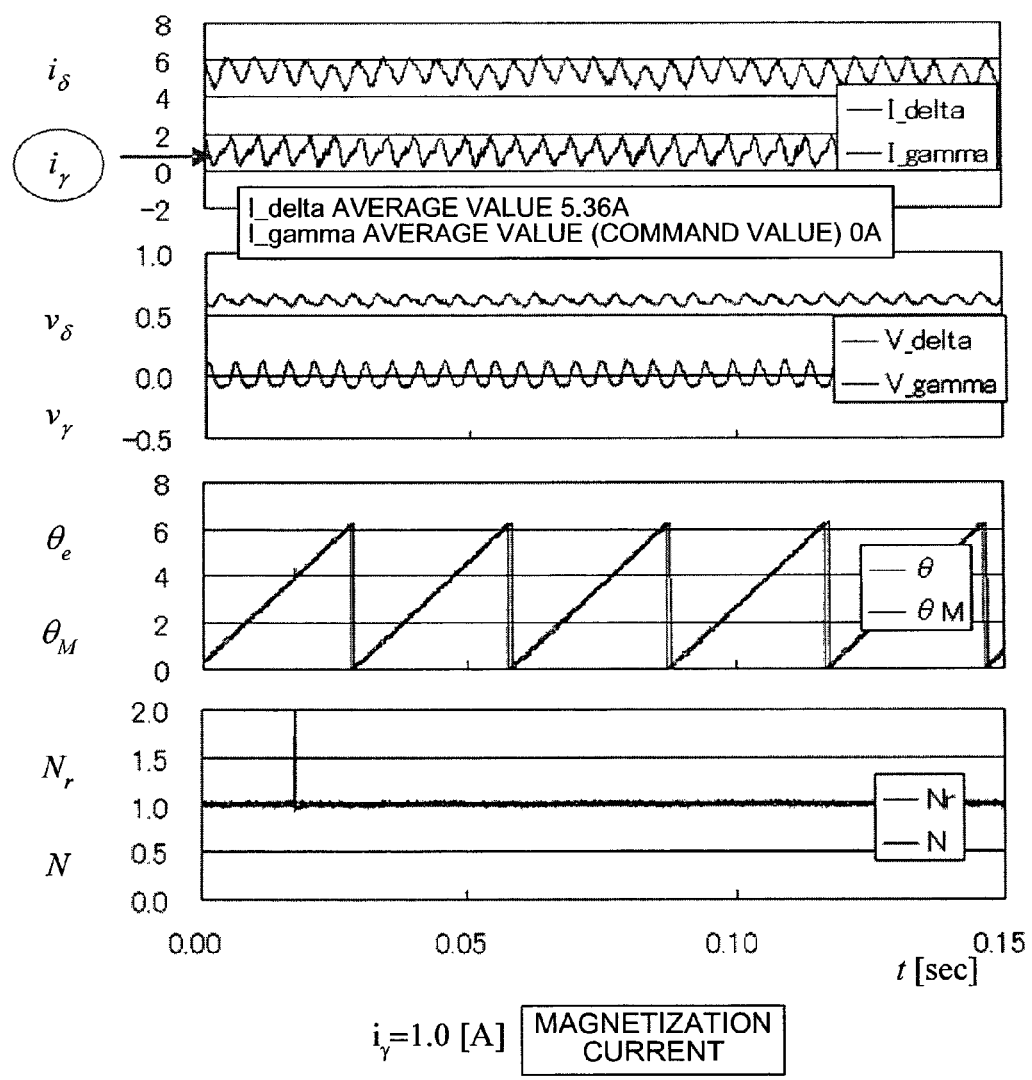
FIG. 29 is a diagram of experimental results at Iγ*=1.0 A in Example 1 when the synchronous motor is connected to the AC circuit in the power conversion controlling apparatus of the present invention.
Figure 30:
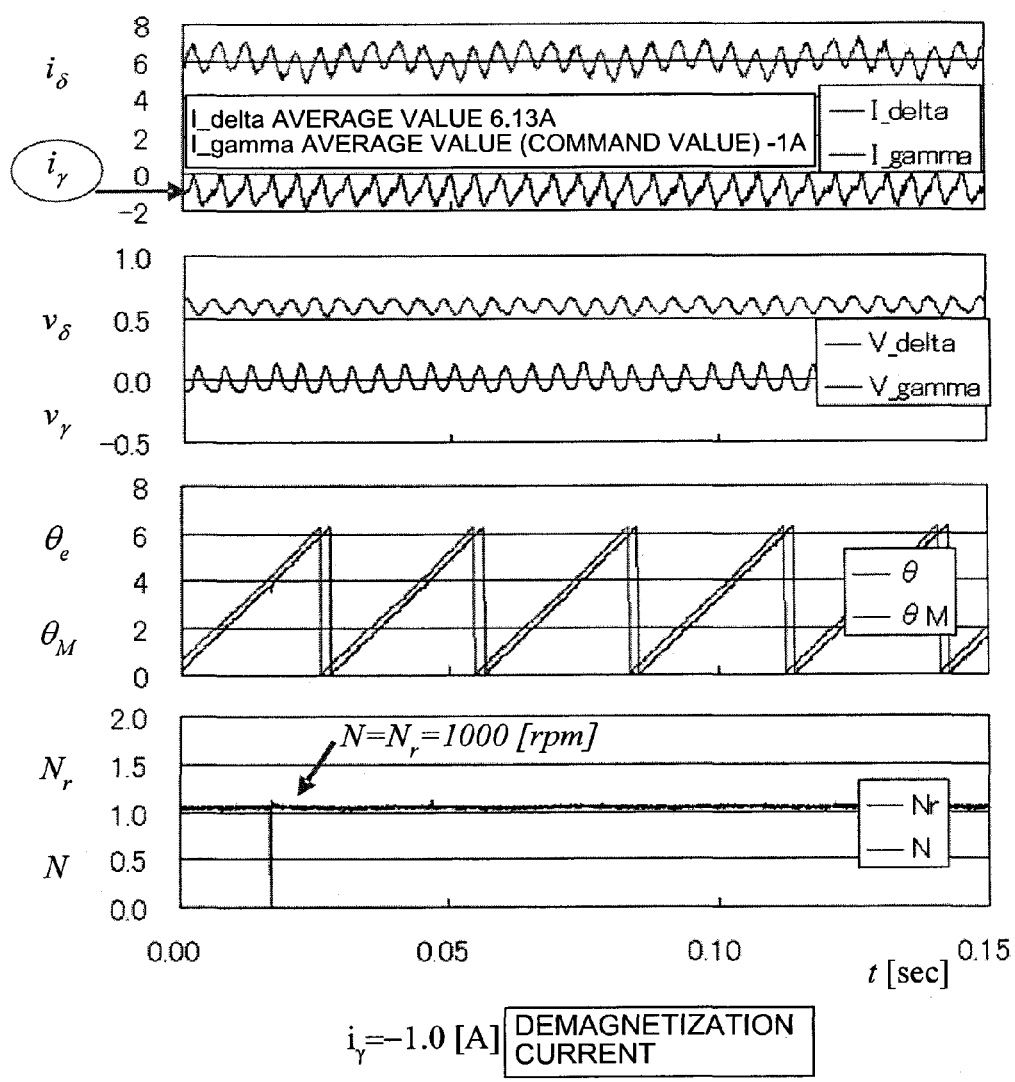
FIG. 30 is a diagram of experimental results at Iγ*=−1.0 A in Example 1 when the synchronous motor is connected to the AC circuit in the power conversion controlling apparatus of the present invention.
Figure 31:
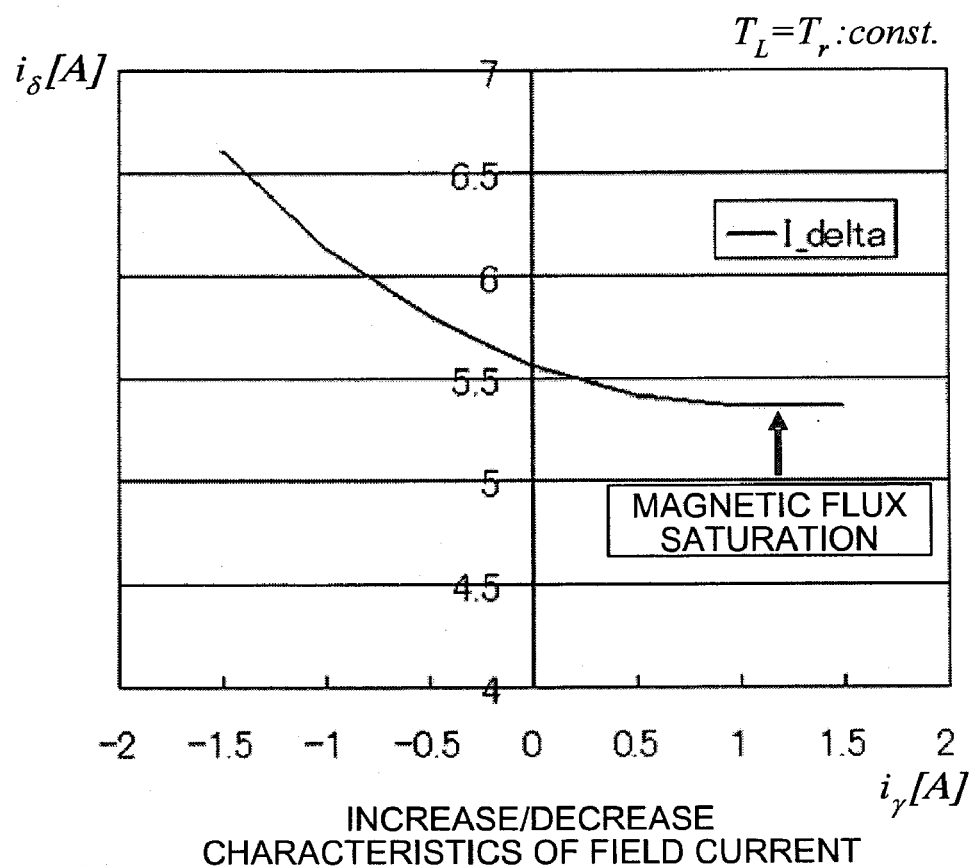
FIG. 31 is a diagram of experimental characteristics of Example 1 when the synchronous motor is connected to the AC circuit in the power conversion controlling apparatus of the present invention.

The power conversion control system according to Example 1 (FIG. 22) was configured and controlled using a DSP and its operation was verified by performing an experiment. FIG. 28, FIG. 29, and FIG. 30 depict operation waveforms when the command value Iγ* of the reactive component of current of the biaxial component current is changed during operation by setting the speed setting value to +1000 rpm under full-load torque at 200 V of the DC operating voltage of the inverter using a permanent-magnet synchronous motor of 0.5 kW and more specifically, operation waveforms when increase/decrease control of Iγ* is performed so that, relative to "0", Iγ* increases to +1.0 A (magnetization current) or decreases to −1.0 A (demagnetization current). The active component of current Iδ can closely approximate to a torque component current and the reactive component of current Iγ can closely approximate to a magnetic flux component current and a generated torque is approximately proportional to a product of both currents. Therefore, it can be read from these experimental results that, under a constant torque load, Iδ decreases when Iγ increases and Iδ increases when Iγ decreases. FIG. 31 is a graph of variation characteristics of the active component of current Iδ with respect to the biaxial reactive component of current Iγ corresponding to a field current, showing that the magnetic flux is saturated because a decrease of Iδ when Iγ is increased is smaller than that of Iδ when Iγ is decreased. Since the present invention does not use such a magnetic flux model for sensorless control, it is clear that torque control can be performed without using any sensor with stability regardless of nonlinear characteristics.

[Experiment 6]

Figure 32:
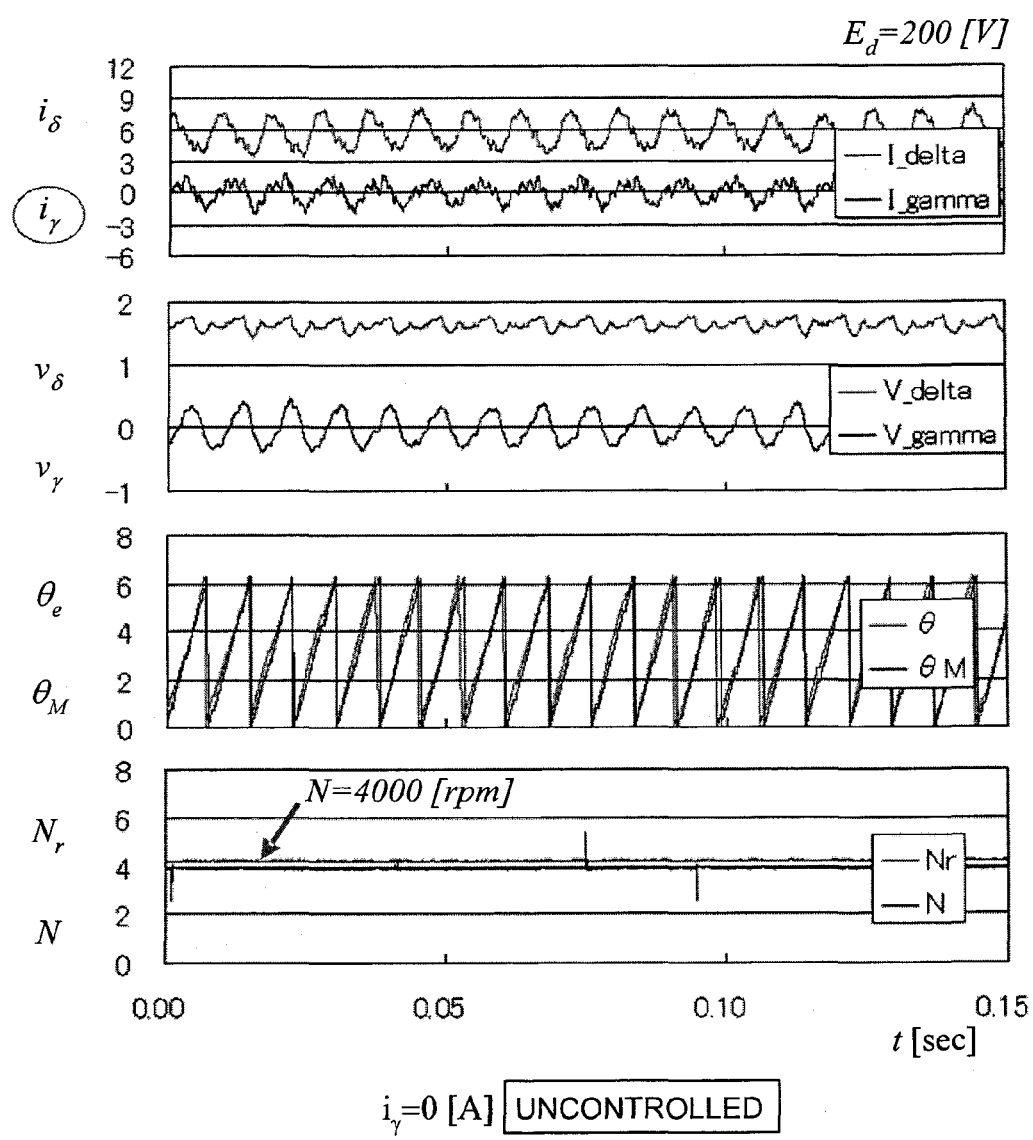
FIG. 32 is a diagram of experimental results at Iγ*=0 A and rated DC voltage in Example 1 when the synchronous motor is connected to the AC circuit in the power conversion controlling apparatus of the present invention.
Figure 33:
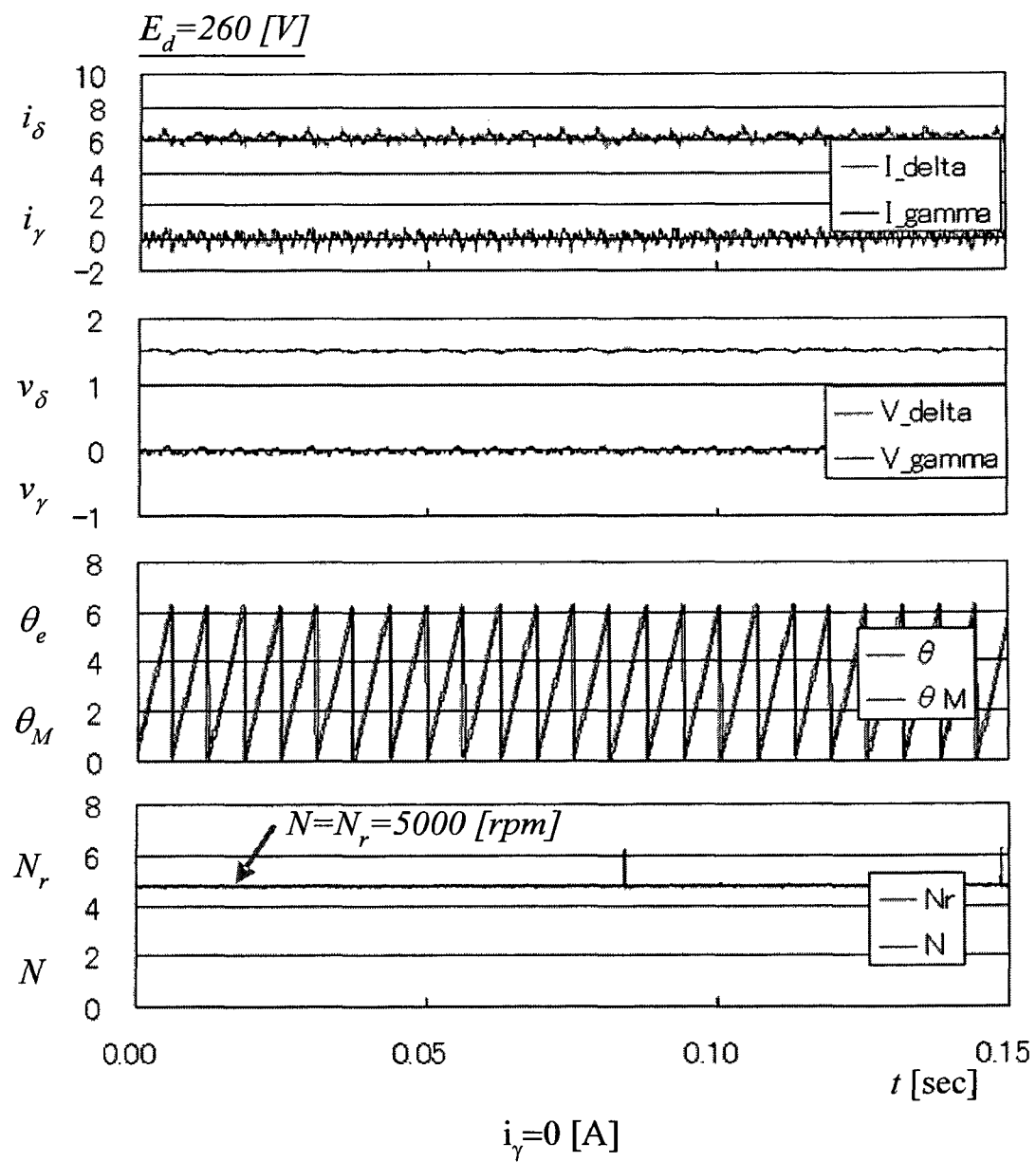
FIG. 33 is a diagram of experimental results at Iγ*=0 A and the raised DC voltage in Example 1 when the synchronous motor is connected to the AC circuit in the power conversion controlling apparatus of the present invention.
Figure 34:
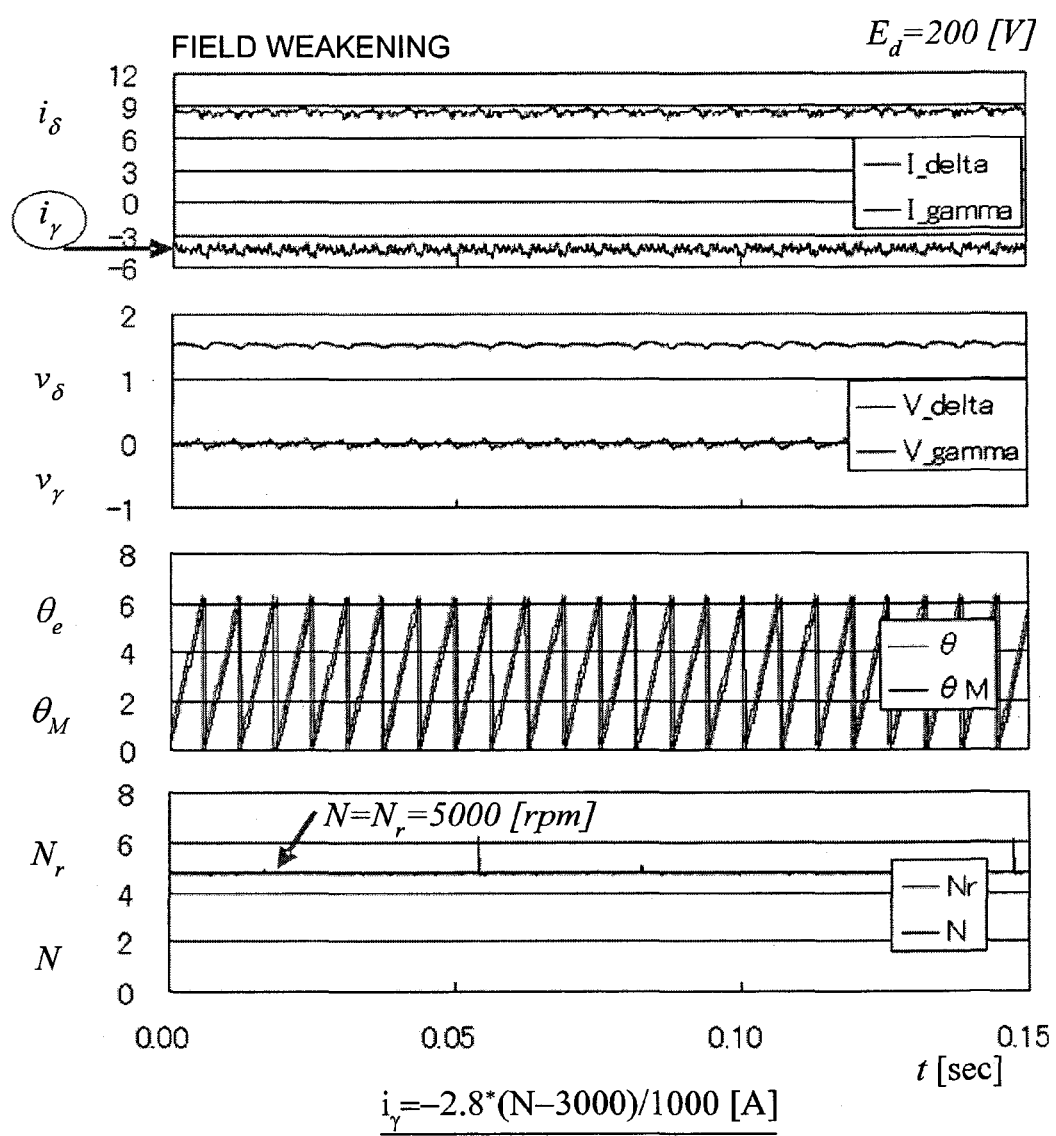
FIG. 34 is a diagram of experimental results when demagnetization operation is performed at the rated DC voltage in Example 1 when the synchronous motor is connected to the AC circuit in the power conversion controlling apparatus of the present invention.

The power conversion control system according to Example 1 (FIG. 22) was configured and controlled using a DSP and its operation was verified by performing an experiment. FIG. 32 depict operation waveforms when the setting value is increased while keeping the reference value Iγ* of the biaxial reactive component of current unchanged at "0" under full-load torque at 200 V of the DC operating voltage of the inverter 2 using the permanent-magnet synchronous motor of 0.5 kW, confirming that control operation becomes unstable near 4000 rpm and thus, a still faster operation is impossible. FIG. 33 verifies that operations at 5000 rpm become possible by raising the DC voltage of the inverter to 260 V while keeping the reference value Iγ* unchanged at "0". However, the DC voltage of the inverter is normally controlled to a rated value. FIG. 34 depicts experimental results verifying that operations at 5000 rpm can be performed while maintaining the DC voltage of the inverter constant at 200 V by changing the reference value Iγ* according to the speed reference and flowing a demagnetization current when the speed reference is raised.

[Experiment 7]

Figure 35:
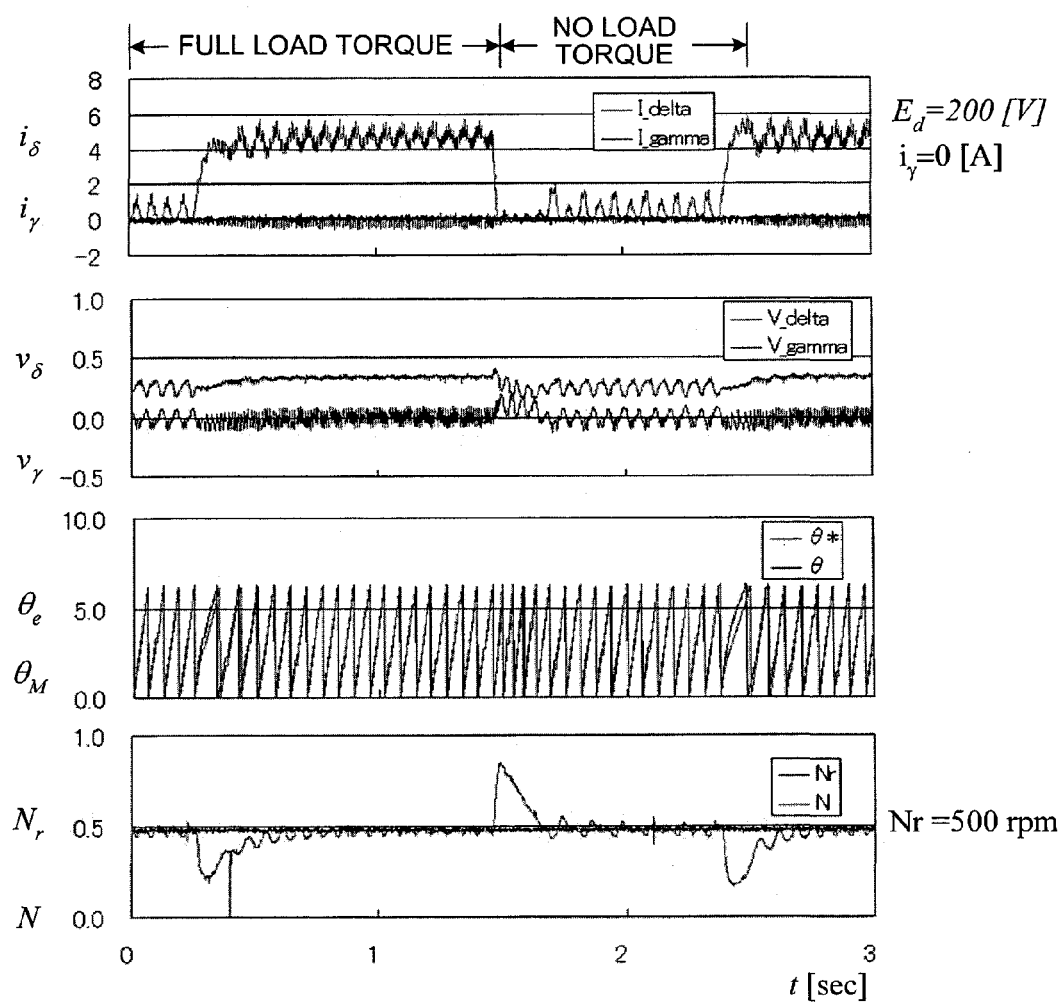
FIG. 35 is a diagram of experimental results when a load torque is abruptly changed between total load and no load in Example 1 when the synchronous motor is connected to the AC circuit in the power conversion controlling apparatus of the present invention.

The power conversion control system according to Example (FIG. 22) was configured and controlled using a DSP and its operation was verified by performing an experiment. FIG. 35 depict operation waveforms when the load torque is changed between full load and no load over time with low-speed rotation of 500 rpm of the reference speed at 200 V of the DC operating voltage of the inverter using the permanent-magnet synchronous motor of 0.5 kW, verifying from these experimental results that sensorless control of the present invention can perform operations with stability with respect to abrupt load torque variations at low speed.

[Experiment 8]

Simulation analysis and experiments were performed in a power conversion system shown in FIG. 36-1 as a control example in which a plurality of synchronous motors of Experiment 1 (FIG. 22) are driven. FIG. 36-2 depicts operation waveforms when two synchronous motors of rated 0.5 kW and 6 kW were driven by one inverter in the experiment. As shown in FIG. 36-2, experimental results can verify that the two synchronous motors can be operated with stability even though they have different capacities. FIG. 36-3 and FIG. 36-4 depict operation waveforms by means of simulations when the two synchronous motors of rated 2.2 kW were driven by one inverter. FIG. 36-3 depicts simulation results when a load torque acting on each of the two synchronous motors is 5 Nm and FIG. 36-4 depicts simulation results when different load torques of 2.5 Nm and 5 Nm act on the synchronous motors. Each of the two synchronous motor models used for simulations has four poles, the armature resistance of 1Ω, the inductance of 10 mH, the electromotive force coefficient of 200 V/krpm, and the moment of inertia of 0.01 kgm$^2$ and the DC operating voltage of the inverter is 300 V. These simulation results verify that the two synchronous motors can be operated with stability.

Example 2

Figure 37:
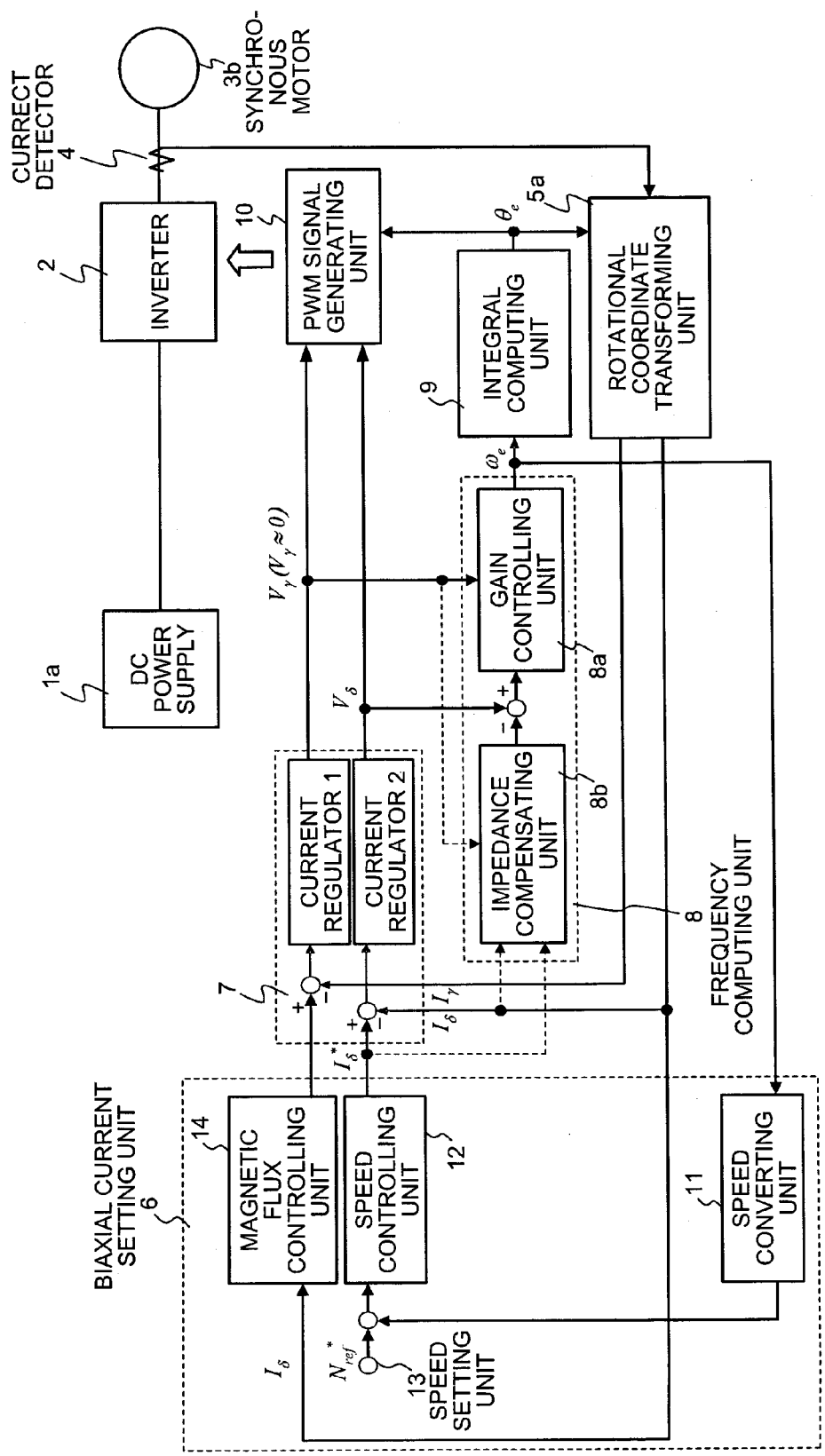
FIG. 37 is a block diagram of Example 2 when the synchronous motor is connected to an AC circuit in a power conversion controlling apparatus of the present invention.

FIG. 37 is a diagram of the configuration of a power conversion control system according to Example 2. The power conversion control system according to Example 2 shown in FIG. 37 has the reactive component of current Iγ* set through computation of the formula (24) based on the active component of current Iδ so that power factor 1 operation can be performed at an internal electromotive force end of the synchronous motor in the power conversion control system according to Example 1 (FIG. 22). With the power conversion control system according to Example 2, biaxial current vector control with the internal electromotive force of the motor as a reference can be performed only by AC current detection using neither position sensor nor speed sensor in the synchronous motor driving, power factor 1 operation can be performed at an internal electromotive force end of the synchronous motor, and normal rotation to reverse rotation operations and reverse rotation to normal rotation operations can continuously be controlled with still enhanced speed control response of the synchronous motor.

[Experiment 9]

Figure 38:
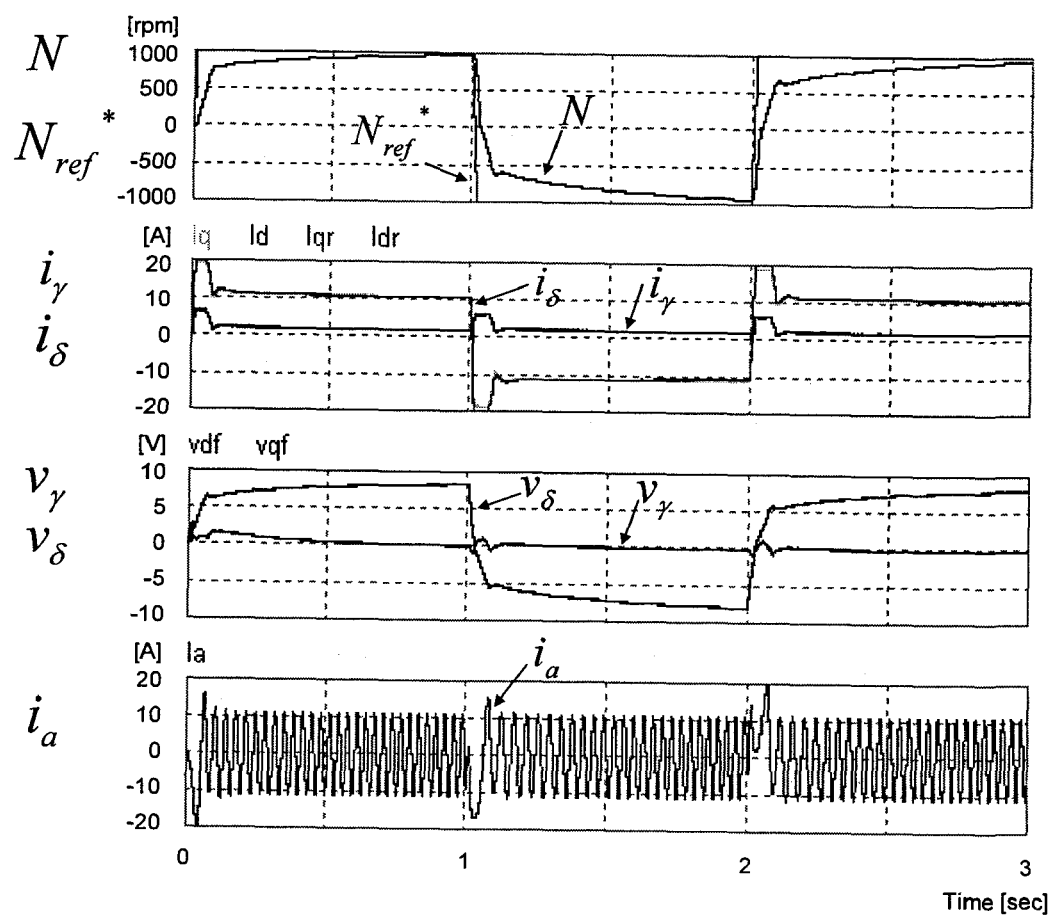
FIG. 38 is a diagram of simulation analysis results for the block diagram of Example 2 when the synchronous motor is connected to the AC circuit in the power conversion controlling apparatus of the present invention.

FIG. 38 depicts simulation analysis results for the power conversion control system according to Example 2 (FIG. 37). It can be verified that, as a result power factor 1 control being performed at the internal electromotive force end of the synchronous motor, normal rotation and reverse rotation operations can be performed in a short time compared with results of FIG. 23 where no power factor 1 control is performed.

Example 3

Figure 39:
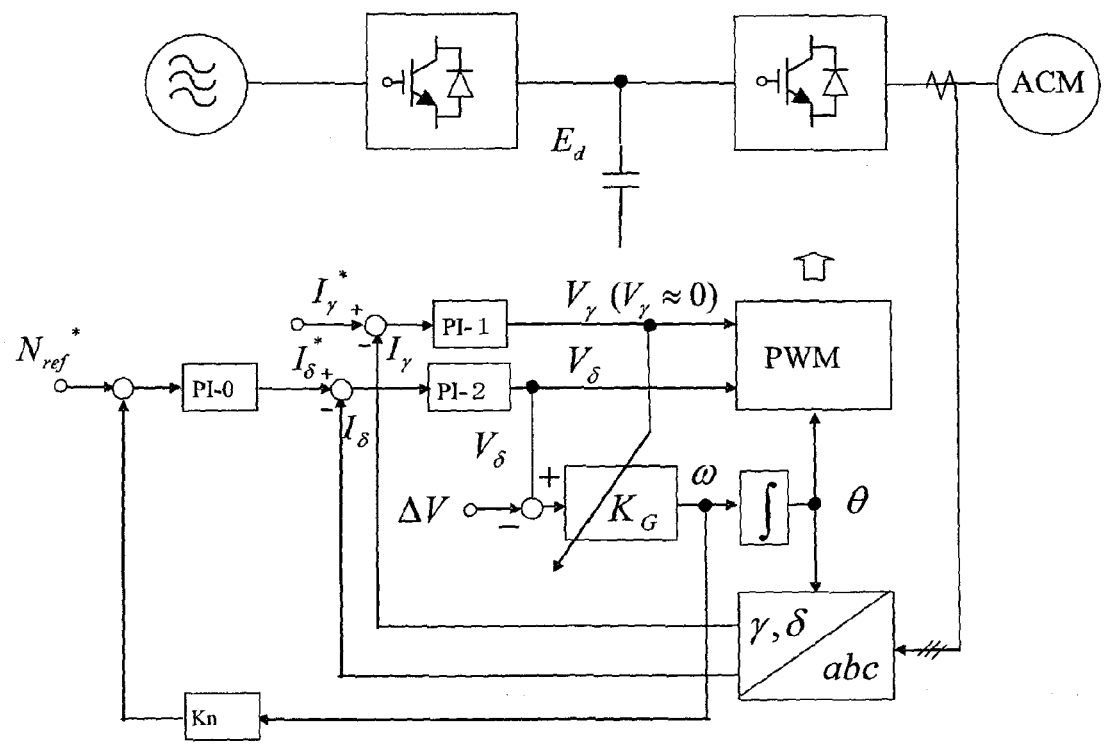
FIG. 39 is a block diagram of Example 3 when the synchronous motor is connected to an AC circuit in a power conversion controlling apparatus of the present invention.

FIG. 39 depicts a concrete sensorless drive system of the synchronous motor of the power conversion control system of Example 1 (FIG. 22) or Example 2 (FIG. 37). A difference in correspondence to FIG. 22 and FIG. 37 is a difference whether the command value Iγ* of Iγ is zero or determined by the formula (24). In FIG. 39, the operating frequency $\omega_e$ of the inverter is calculated by adjusting the proportional gain $K_G$ for Vδ so that Vγ becomes zero. Here, Vδ is used as an input into the gain controlling unit and ΔV denotes an impedance compensation amount by the formula (19) or (20).

Example 4

Figure 40:
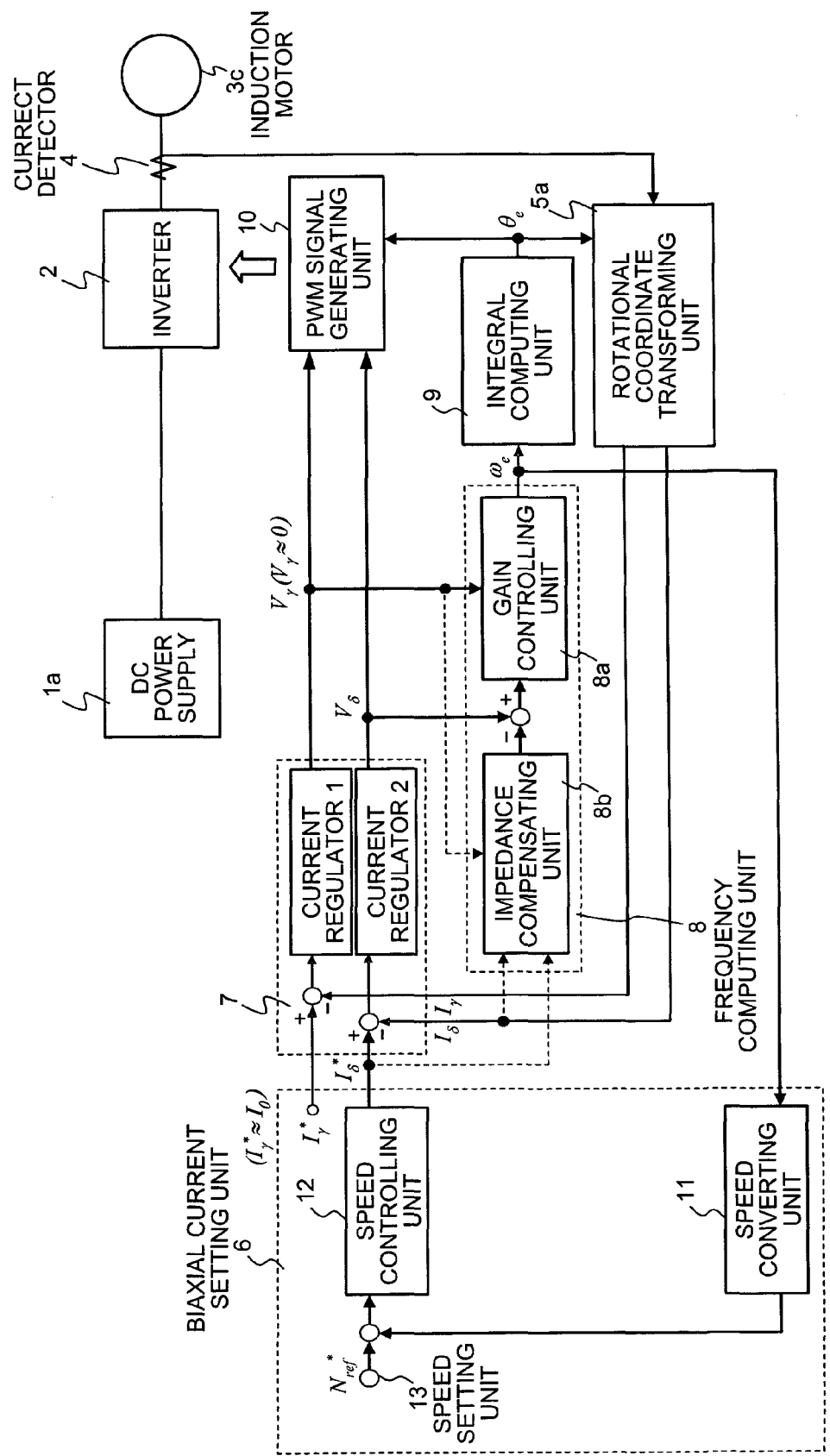
FIG. 40 is a block diagram of Example 4 when the induction motor is connected to an AC circuit in a power conversion controlling apparatus of the present invention.

FIG. 40 is a diagram of a power conversion control system according to Example 4. FIG. 40 is a diagram after replacing the synchronous motor 3b with an induction motor 3c and setting the command value Iγ* of the reactive component of current to an exciting current value $I_0$ needed for induction motor driving being given by the formula (25) in the power conversion control system according to Example 1 (FIG. 22). The rotational speed value of the induction motor can be computed approximately according to the formula (22) based on the operating frequency $\omega_e$ of the inverter.

With the power conversion control system according to Example 4, biaxial current vector control with the output voltage of the inverter as a reference can be performed only by AC current detection without using a speed sensor in induction motor driving and normal rotation to reverse rotation operations and reverse rotation to normal rotation operations of the induction motor can continuously be controlled.

[Experiment 10]

Figure 41:
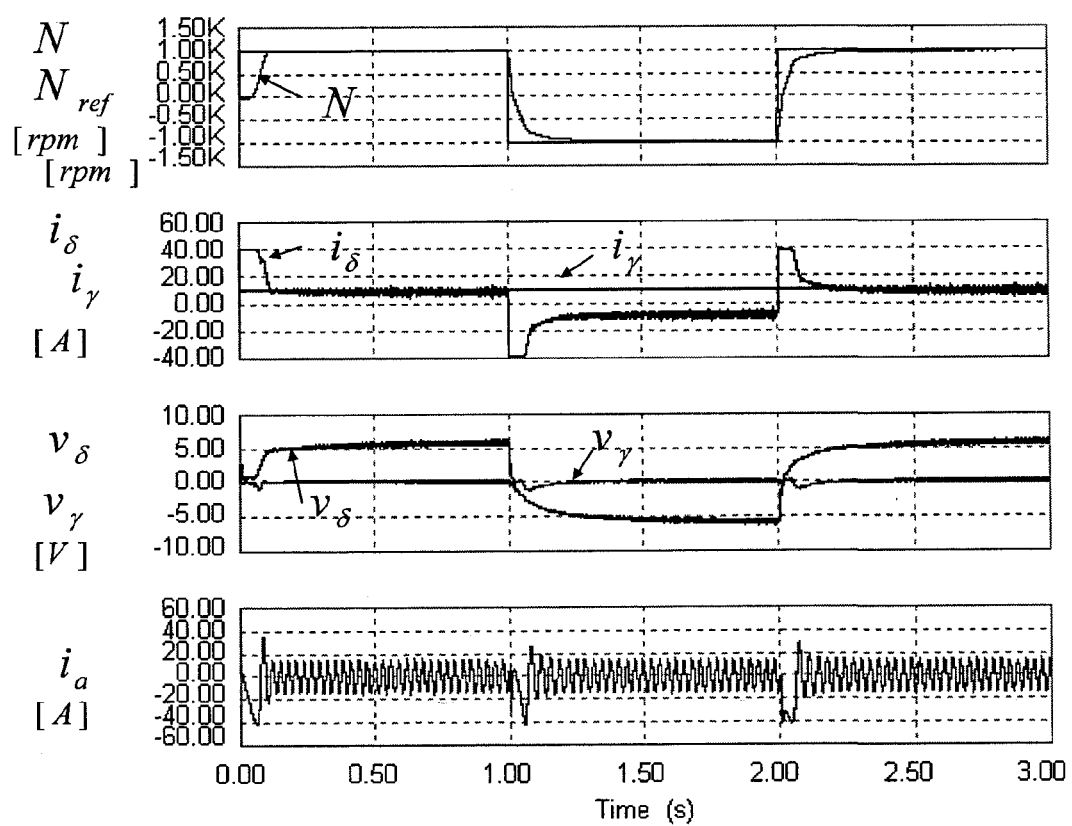
FIG. 41 is a diagram of simulation analysis results for the block diagram of Example 4 when the induction motor is connected to the AC circuit in the power conversion controlling apparatus of the present invention.

FIG. 41 depicts operation waveforms of simulation analysis performed when the DC operating voltage of the inverter is made to operate at 300 V using the induction motor of about 2.2 kW with four poles in the power conversion control system according to Example 4 (FIG. 40). Circuit constants include a stator resistance of 0.294Ω, a stator leakage inductance of 1.39 mH, a rotor resistance of 0.156Ω, a rotor leakage inductance of 0.74 mH, an exciting inductance of 41 mH, and a moment of inertia of 0.01 kgm². FIG. 41 depicts velocity response waveforms when the speed setting value is changed between +1000 rpm and −1000 rpm in a 0.5 Hz cycle with the reactive component of current setting value Iγ set to 10 A. Biaxial current vector control with the output voltage as a reference can be performed and therefore, it can be verified that normal rotation to reverse rotation operations and reverse rotation to normal rotation operations of the induction motor can continuously be controlled.

[Experiment 11]

Figure 42:
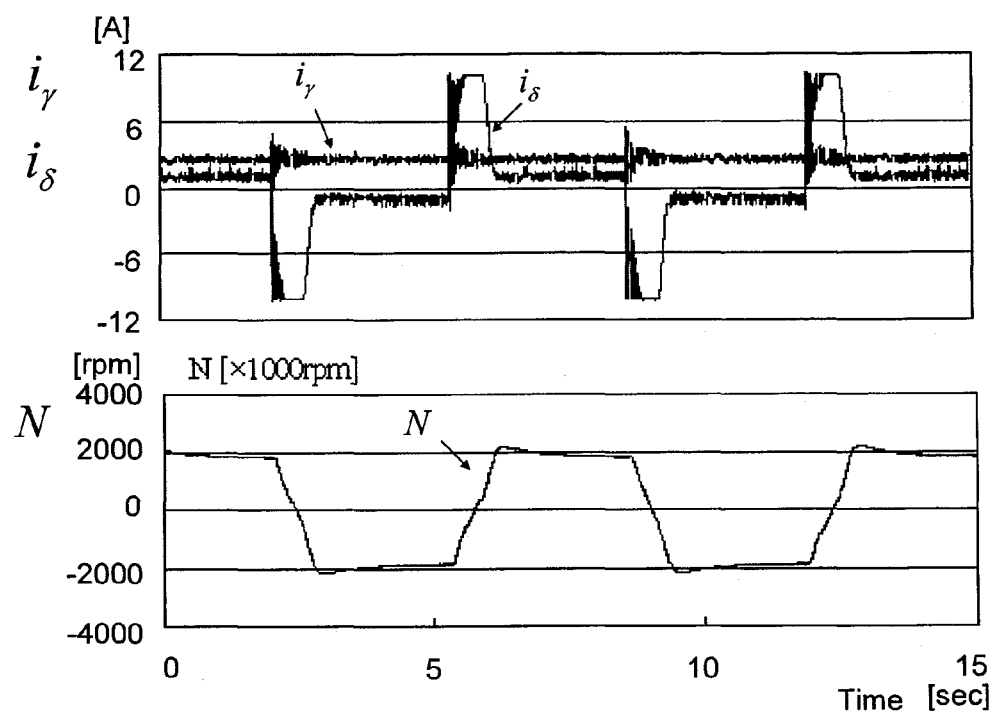
FIG. 42 is a diagram of experimental results of Example 4 when the induction motor is connected to the AC circuit in the power conversion controlling apparatus of the present invention.

The power conversion control system shown in Example 4 (FIG. 40) was configured and controlled using a DSP and its operation was verified by performing an experiment. FIG. 42 depicts experimental results when normal rotation and reverse rotation operations were performed by changing the speed setting value between +2000 rpm and −2000 rpm under no load at 150 V of the DC operating voltage of the inverter using a squirrel-cage induction motor of 0.75 kW with four poles. The setting value of the reactive component of current was set to 1.5 A for the exciting current of the induction motor. It can be verified that the active component of current has a large value due to the moment of inertia of the motor during reversal of normal/reverse rotation, but a small current value due to no load during steady operation. It can be verified from these results that, in the present invention, biaxial current vector control can be performed only by detection control of the AC current without using a speed sensor also for an induction motor and normal rotation and reverse rotation operations can be performed with good response.

[Experiment 12]

Figures 1, 43:
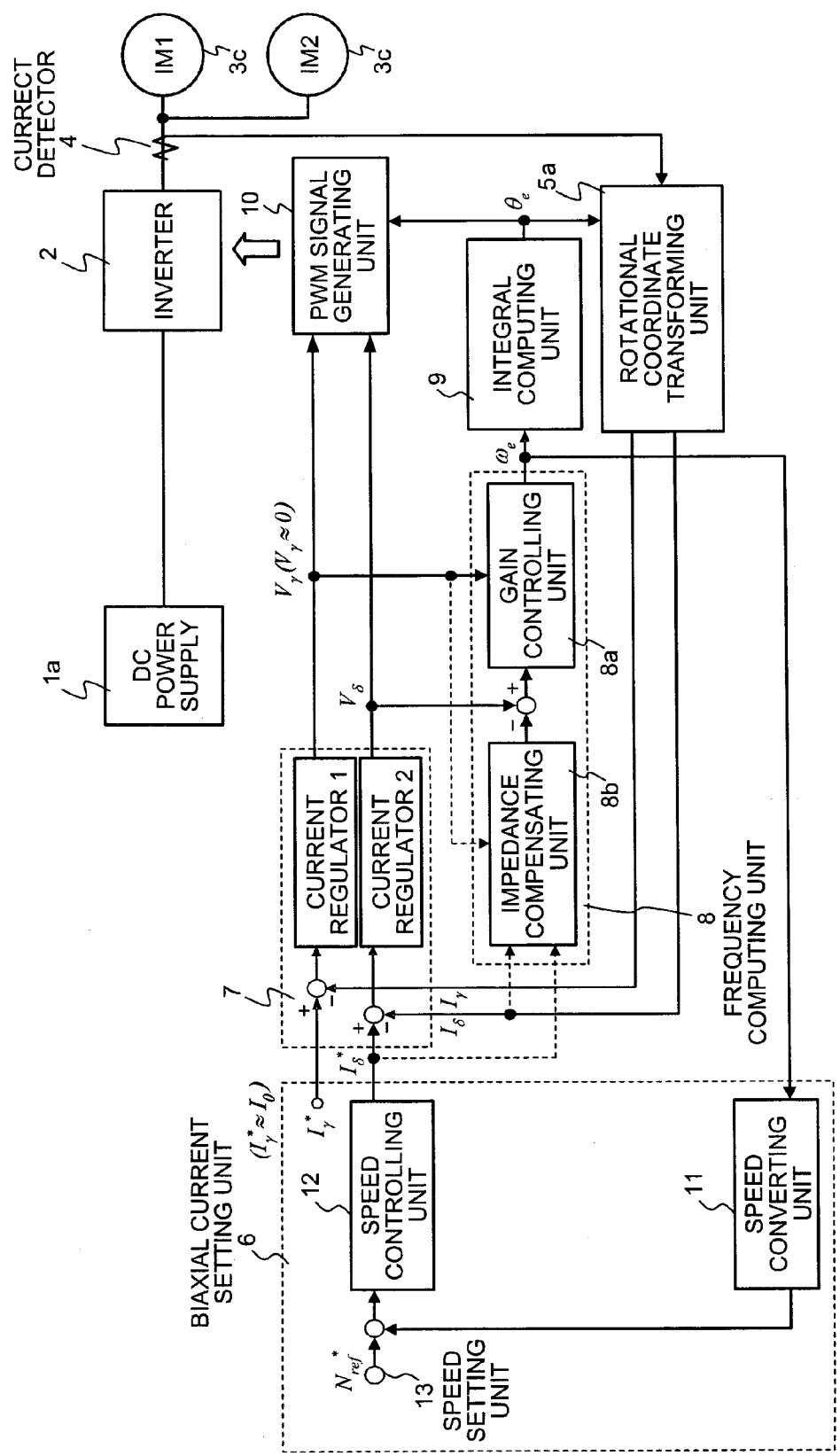
Figures 2, 43:
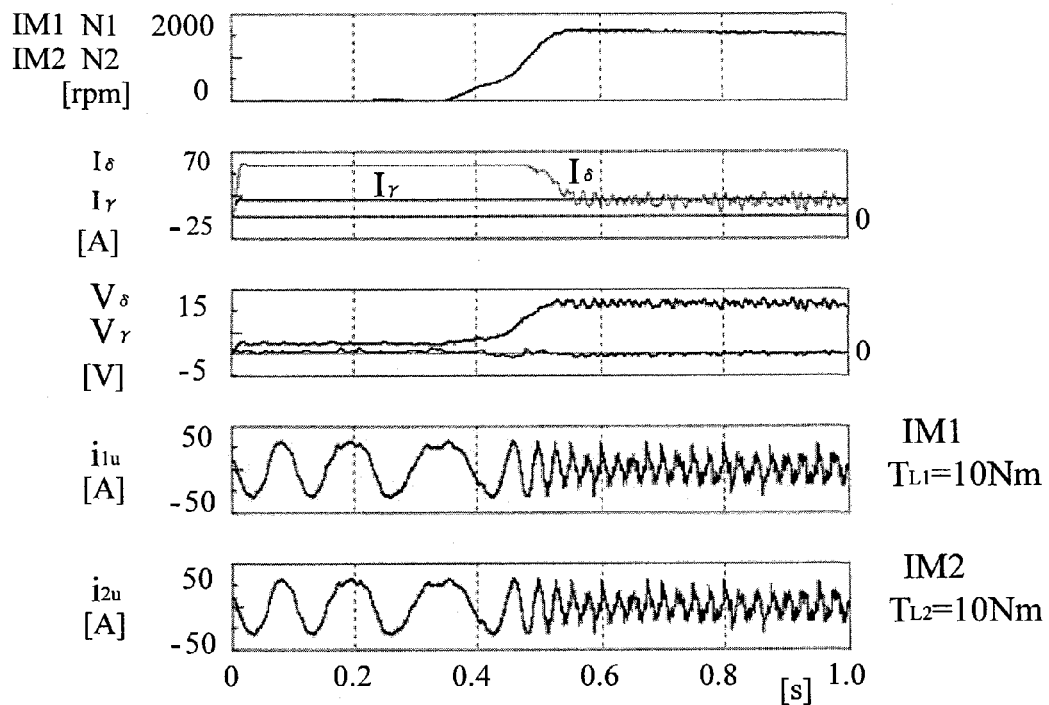
Figures 3, 43:
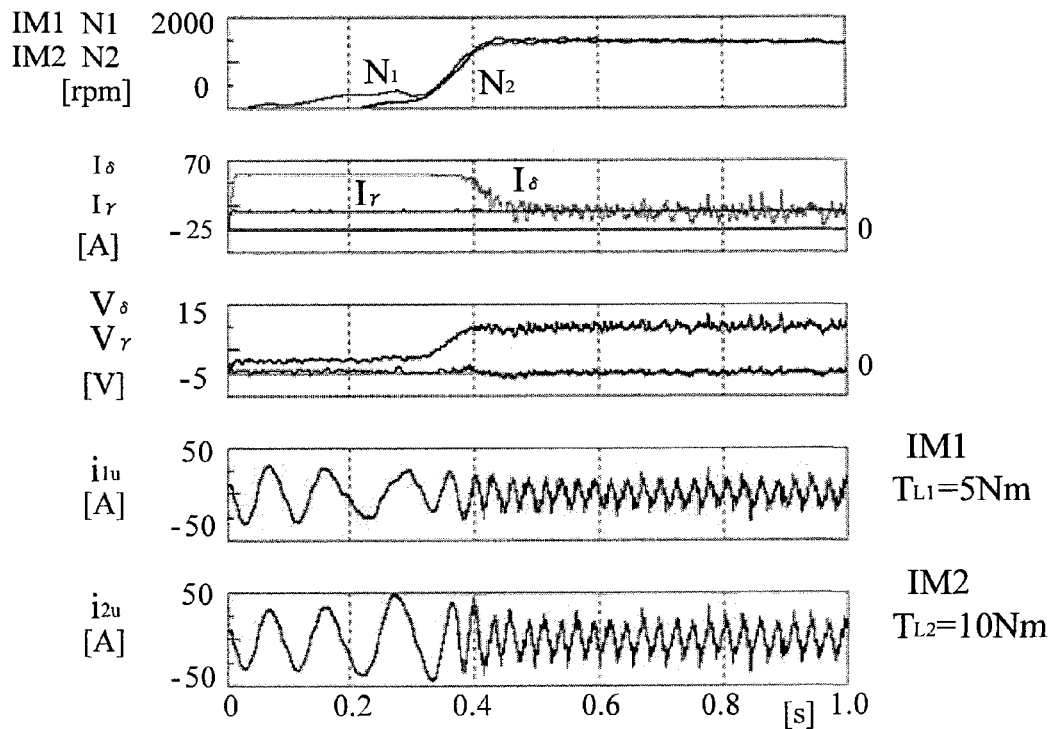

Simulation analysis was performed in a power conversion system shown in FIG. 43-1 as a control example in which a plurality of induction motors of Experiment 4 (FIG. 40) are driven. FIG. 43-2 and FIG. 43-3 depict operation waveforms by means of simulations when two induction motors of rated 2.2 kW were driven by one inverter. FIG. 43-2 depicts simulation results when a load torque acting on each of the two induction motors is 10 Nm and FIG. 43-3 depicts simulation results when different load torques of 5 Nm and 10 Nm act on the induction motors. Each of the two induction motor models used for simulations has four poles, the stator resistance of 0.294Ω, stator leakage inductance of 1.39 mH, rotor resistance of 0.156Ω, rotor leakage inductance of 0.74 mH, exciting inductance of 41 mH, and moment of inertia of 0.01 kgm² and the DC operating voltage of the inverter is 300 V. These simulation results verify that the two induction motors can be operated with stability.

Example 5

Figure 44:
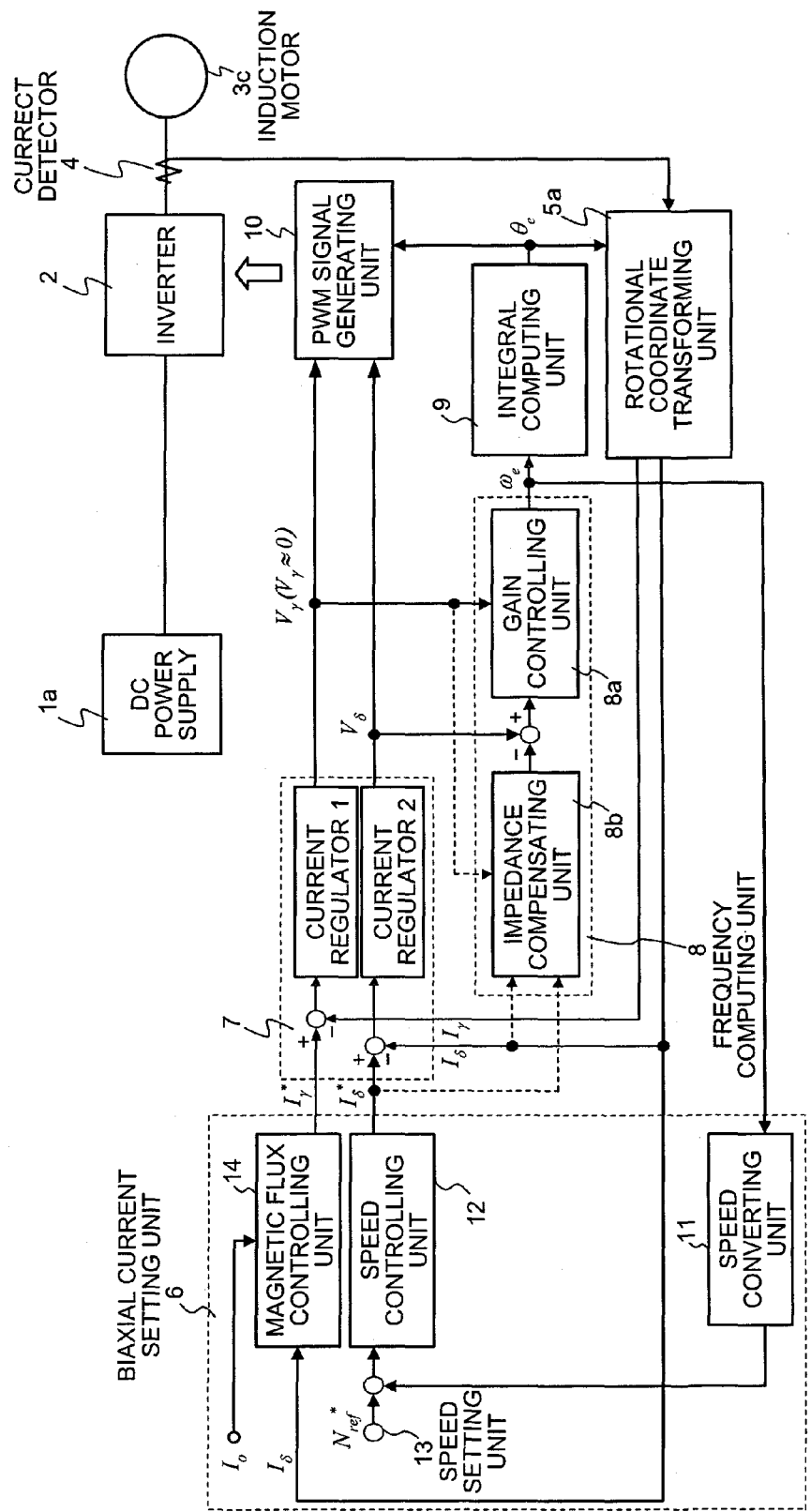
FIG. 44 is a block diagram of Example 5 when the induction motor is connected to an AC circuit in a power conversion controlling apparatus of the present invention.

FIG. 44 is a diagram of the configuration of a power conversion control system according to Example 5. FIG. 44 depicts that the command value Iγ* of the reactive component of current is determined through computation of the formula (27) based on the active component of current Iδ so that power factor 1 operation can be performed at the internal electromotive force end of the induction motor in the control system according to Example 4 (FIG. 40). With the power conversion control system according to Example 5, biaxial current vector control with the internal electromotive force of the motor as a reference can be performed only by AC current detection without using a speed sensor in induction motor driving, power factor 1 operation can be performed at the internal electromotive force end of the induction motor, and normal rotation to reverse rotation operations and reverse rotation to normal rotation operations can continuously be controlled with still enhanced speed control response of the induction motor.

Example 6

Figure 45:
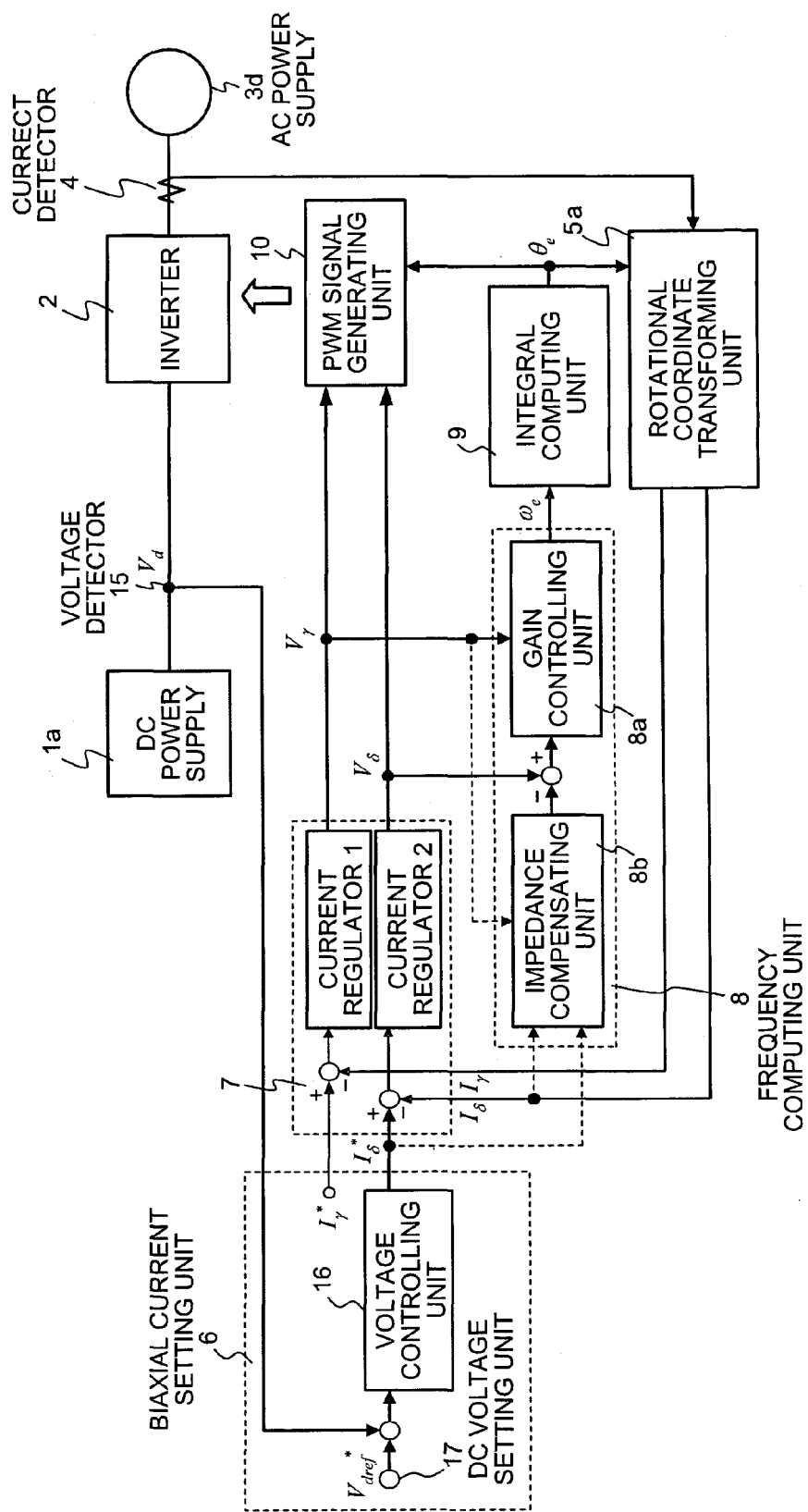
FIG. 45 is a block diagram of Example 6 when the AC power supply is connected to an AC circuit and the DC power supply is connected to a DC circuit in a power conversion controlling apparatus of the present invention.

FIG. 45 is a diagram of the configuration of a power conversion control system according to Example 6. The power conversion control system according to Example 6 exchanges power between a DC power supply and an AC power supply through PWM inverter control without detecting the phase of AC power supply by connecting an AC power supply 3d to the AC circuit via the inverter 2 from the DC power supply 1a.

In FIG. 45, a current to the AC power supply is detected by the current detector 4, a rotational coordinate transformation is performed by the rotational coordinate transforming unit 5a, which is an orthogonal biaxial transforming unit, and amplitude command values Vδ and Vγ of the inverter 2 are generated via the biaxial current controlling unit 7 so that rotational coordinate-transformed biaxial amounts Iδ and Iγ match corresponding biaxial current command values Iδ* and Iγ* respectively before causing the PWM signal generating unit 10 to generate a PWM signal of the inverter 2. The amplitude command values Vδ and Vγ are at the same time used by the gain controlling unit 8a of the frequency computing unit 8 to determine the operating frequency $\omega_e$ of the inverter by multiplying Vδ by a gain so that the amplitude command value Vγ becomes zero. By integrating the operating frequency of the inverter by the integral computing unit 9, the phase angle signal $\theta_e$ made to match the phase angle θ of the AC circuit is obtained.

Meanwhile, the impedance compensating unit 8b is provided to compensate for being unable to control Vγ to zero when the command value Iδ* of the active component of current changes markedly and a case is shown here in which a compensation is made based on the active component of current command value Iδ*. The active component of current command value Iδ* is obtained from an output of a voltage controlling unit 16 causing the DC voltage Vd detected by the voltage detector 15 and a DC voltage setting value $V_{dref}{}^*$ to match. The reactive current command value Iγ* can be set arbitrarily. The phase angle $\theta_e$ determined by a control loop is used as a reference phase of coordinate transformation in the rotational coordinate transforming unit 5a and the PWM signal generating unit 10.

With the power conversion control system according to Example 6, biaxial current vector control with the output voltage of an inverter as a reference can be performed only by AC current detection without detecting the phase of an AC voltage when a DC power supply and an AC power supply are interconnected and the AC current can continuously be controlled from in phase to opposite phase to the AC power supply with power factor 1 by setting the reactive component of current setting value Iγ* to zero.

[Experiment 13]

Figure 46:
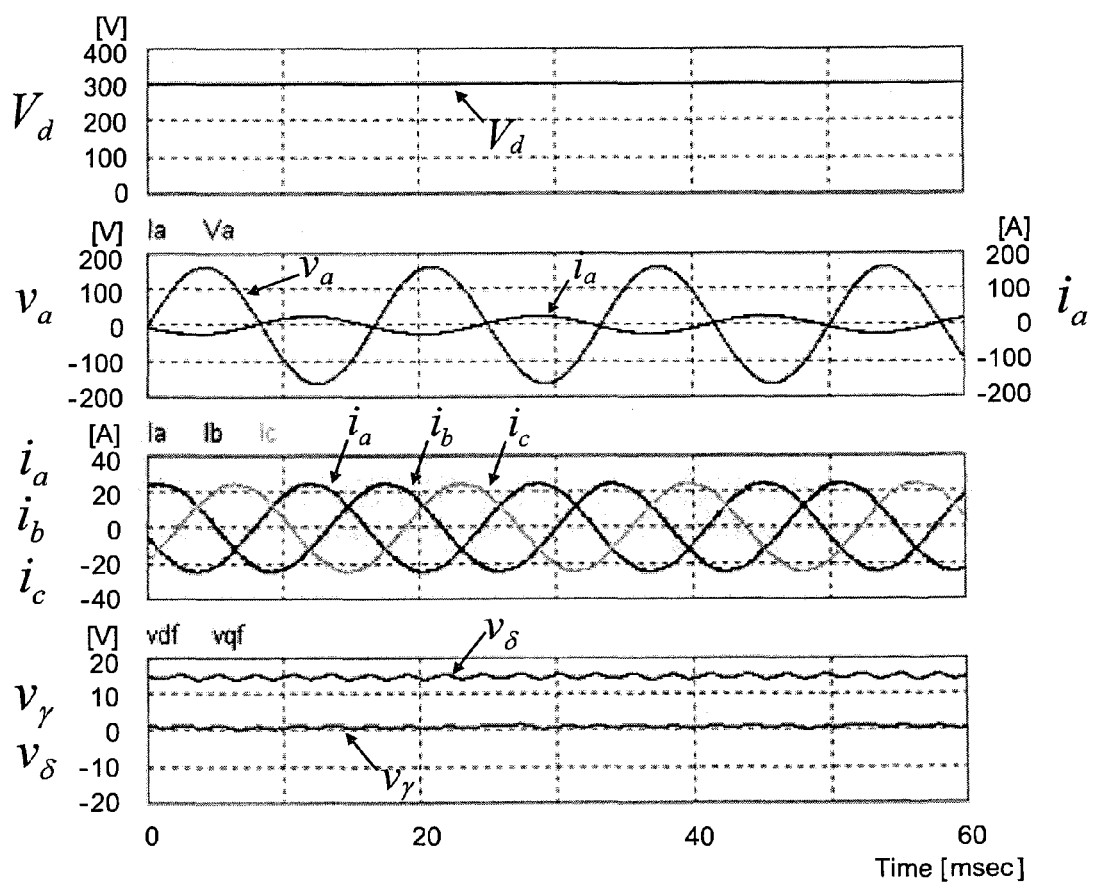
FIG. 46 is a diagram of simulation analysis results for the block diagram of Example 6 when the AC power supply is connected to the AC circuit and the DC power supply is connected to the DC circuit in the power conversion controlling apparatus of the present invention.

FIG. 46 depicts simulation analysis results operated by setting the DC operating voltage to 300 V with a DC power supply having Vd set to 310 V and internal resistance set to 0.5Ω and an AC power supply having an effective value of a three-phase AC voltage set to 200 V and the AC circuit inductance $L_a$ set to 2 mH in the power conversion control system of Example 6 (FIG. 45). As shown in FIG. 46, the AC current $i_a$ flows in opposite phase in synchronization with the AC voltage $v_a$ without the phase of the AC voltage being detected, verifying that an inverter operation transferring DC power to the AC side is realized.

[Experiment 14]

Figure 47:
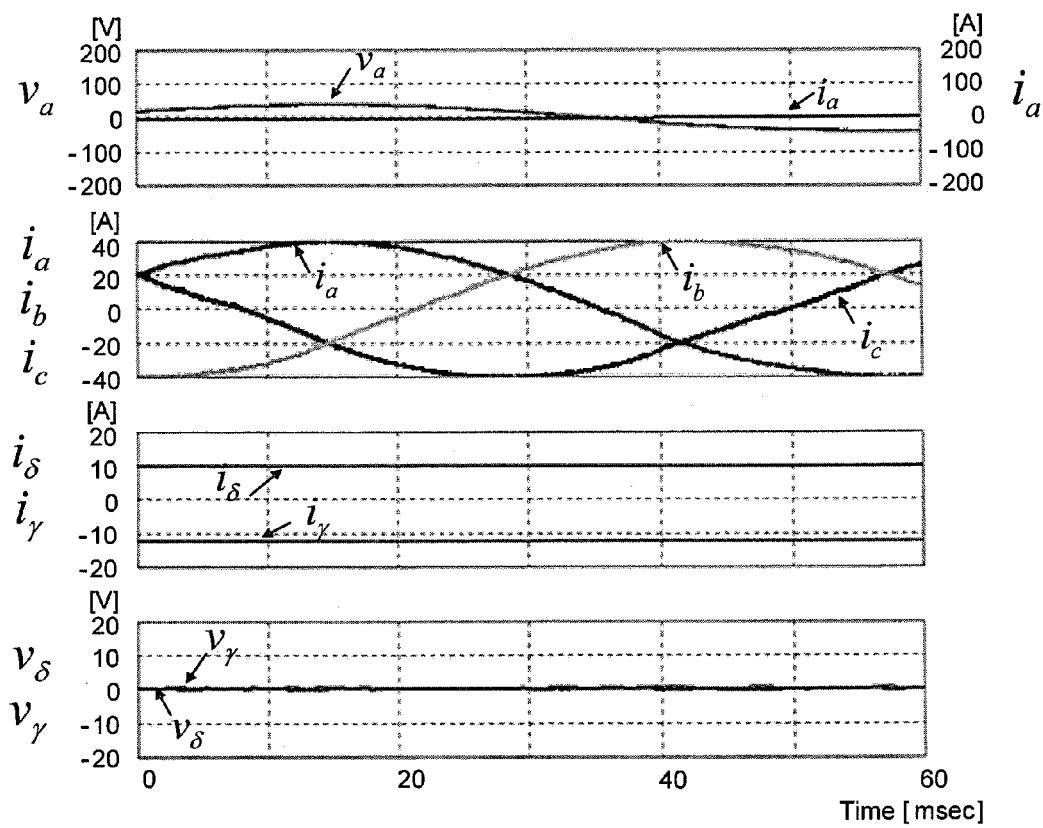
FIG. 47 is a diagram of simulation analysis results when the AC power supply is cut off in the block diagram of Example 6 when the AC power supply is connected to the AC circuit and the DC power supply is connected to the DC circuit in the power conversion controlling apparatus of the present invention.

FIG. 47 depicts simulation analysis results when the AC voltage becomes zero due to a power failure under the same operation conditions as those of Experiment 13 in the interconnected control system of the DC power supply and AC power supply shown in Example 6 (FIG. 45). Though the amplitude command value Vδ of the inverter drops due to the power failure, it can be verified that no overcurrent flows through the inverter. Accordingly, it can be verified that operations can be stopped without causing any particular problem of the inverter even if the AC power supply fails.

Example 7

Figure 48:
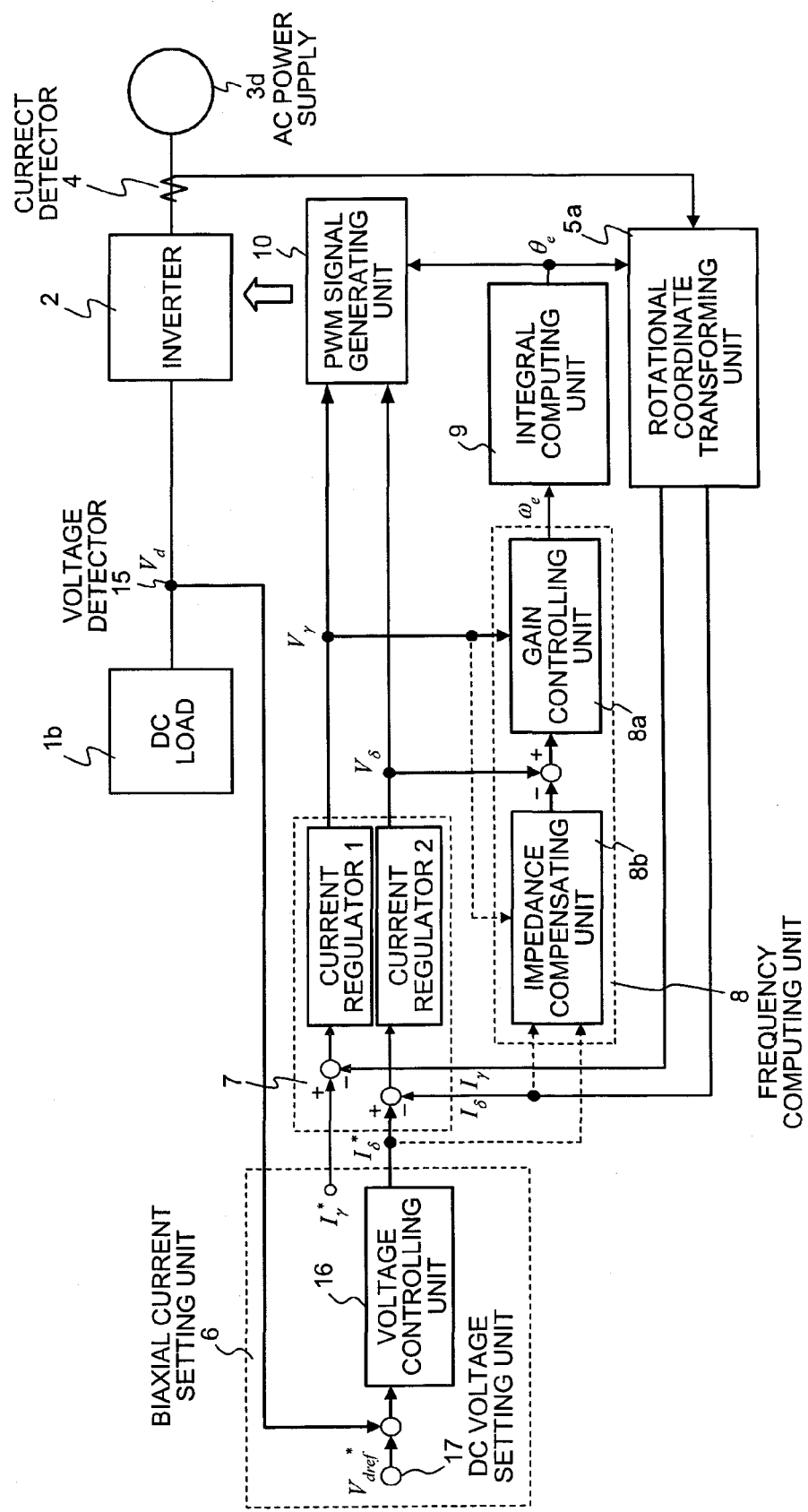
FIG. 48 is a block diagram of Example 7 when the AC power supply is connected to an AC circuit and the DC power supply is connected to a DC circuit in a power conversion controlling apparatus of the present invention.

FIG. 48 is a diagram of a power conversion control system according to Example 7. FIG. 48 depicts a diagram after replacing the DC power supply with a DC load 1b in the power conversion control system of Example 6 (FIG. 45). The inverter 2 here operates as an AC-DC converter converting AC power into DC power. The active component of current Iδ* is set via the voltage controlling unit 16 so that the DC terminal voltage of the inverter (AC-DC converter) 2 becomes a constant setting value and the reactive component of current Iγ* can be set arbitrarily. With the power conversion control system according to Example 7, a PWM control rectification operation acquiring direct output from the AC power supply can be realized only by AC current detection without detecting the phase of the AC voltage. Biaxial current vector control with the AC side voltage of the inverter (AC-DC converter) 2 as a reference can be performed and, by setting the reactive component of current command value Iγ* to zero, a rectification operation from the AC power supply can be realized with power factor 1.

Example 8

Figure 49:
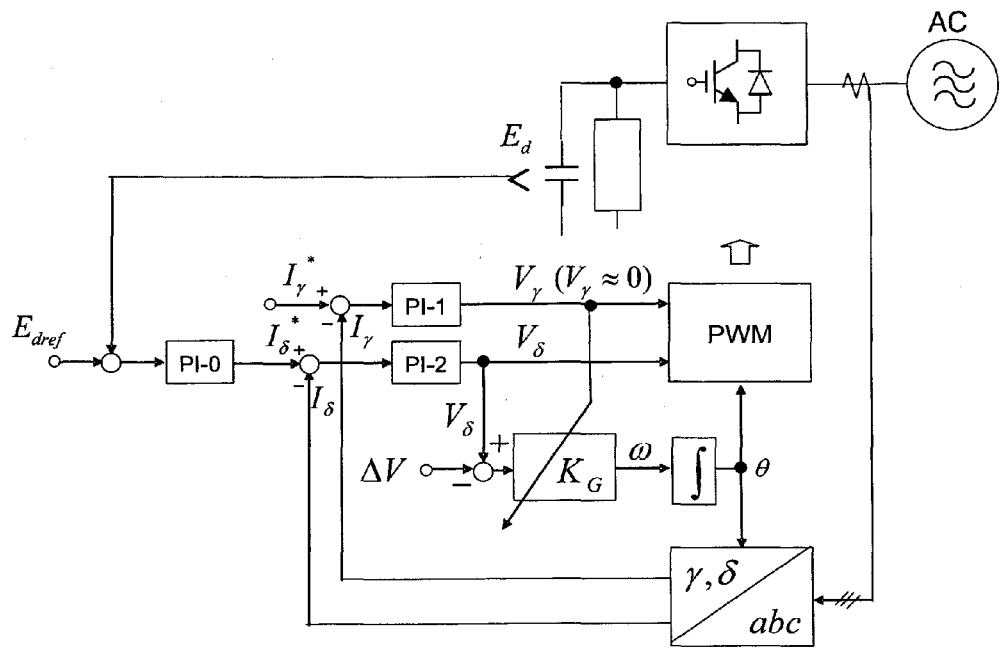
FIG. 49 is a block diagram of Example 8 when the AC power supply is connected to an AC circuit and the DC power supply is connected to a DC circuit in a power conversion controlling apparatus of the present invention.

FIG. 49 depicts a sensorless control system of the AC voltage in an interconnected operation with a concrete AC power supply of the control system of Example 6 (FIG. 45) or Example 7 (FIG. 48). A difference in correspondence to FIG. 45 and FIG. 48 is a difference whether a load is connected to the DC circuit or a DC power supply is connected. Vδ is also used here as an input into the gain controlling unit and ΔV denotes an impedance compensation amount by the formula (20) or (21). With a control system according to the present invention, biaxial current vector control with the output voltage of the inverter as a reference can be performed only by AC current detection without using a power supply synchronous sensor in an interconnected operation with the AC power supply and AC to DC and DC to AC can continuously be controlled at constant DC voltage with power factor 1.

[Experiment 15]

Figure 50:
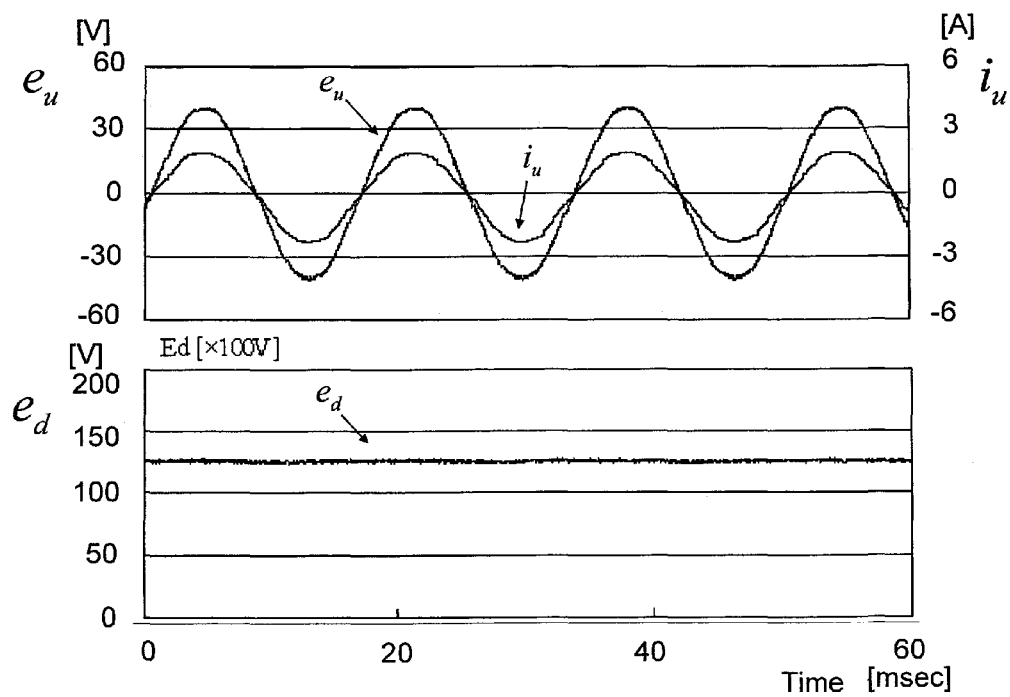
FIG. 50 is a diagram of experimental results of Example 7 when the AC power supply is connected to the AC circuit and a resistor is connected to the DC circuit as a DC load in the power conversion controlling apparatus of the present invention.

FIG. 50 depicts experimental results when a PWM rectification control system feeding the AC power supply in Example 7 (FIG. 48) to a DC load by means of PWM control of the inverter is operated with the DC load resistance set to 120Ω, DC voltage command value set to 125 V, and line-to-line effective value of the three-phase AC voltage set to 50V. The DC voltage $e_d$ operates at 125 V of the setting value and, by setting the command value Iγ* of the reactive component of current to zero, a sinusoidal current $i_u$ in phase with a sinusoidal power supply voltage $e_u$ flows into the inverter to realize an AC-DC converter operation with power factor 1. Though waveforms are not shown, an inverter operation when a DC power supply is connected to the DC circuit in Example 6 (FIG. 45) has been verified by an experiment to operate like simulation analysis results. It can be verified from these results that a power conversion control system in the present invention easily realizes a PWM rectification operation only by AC current detection without detecting the phase of the AC voltage.

Example 9

Figure 51:
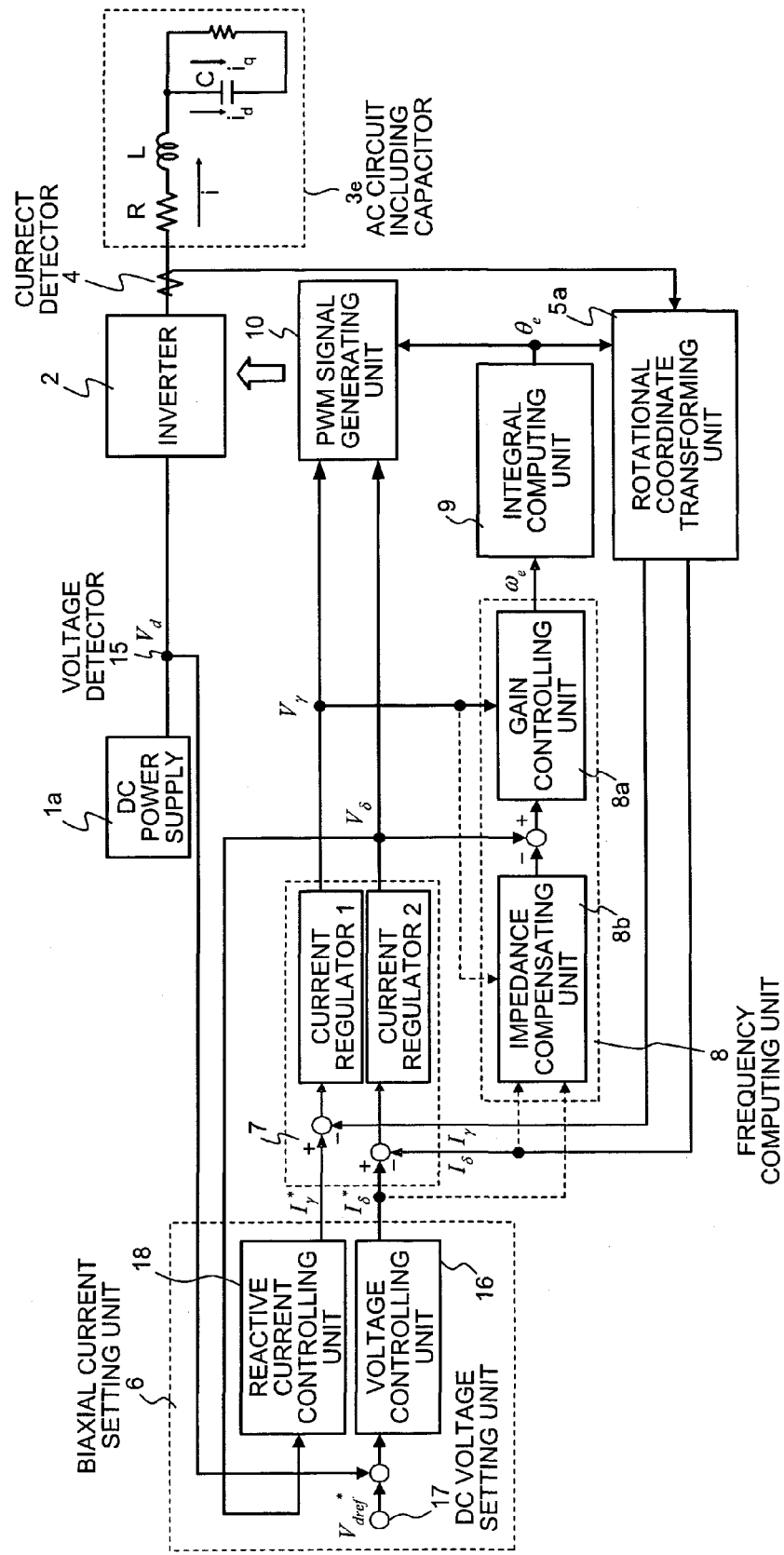
FIG. 51 is a block diagram of Example 9 when an AC load including a capacitor is connected to an AC circuit in a power conversion controlling apparatus of the present invention.

FIG. 51 is a diagram of the configuration of a power conversion control system according to Example 9. The power conversion control system according to Example 9 is a system, as shown in FIG. 51, after replacing the AC power supply of the AC circuit with an AC circuit 3e including a capacitor and adding a reactive current controlling unit 18 in the control system of Example 6 (FIG. 45). In this case, the power factor is determined by passive circuit constants including the capacitor and therefore, the amplitude command value Vγ can become zero if an appropriate value determined by circuit constants is determined as the reactive component of current command value Iγ*. The appropriate reactive component of current command value Iγ* can be determined by the formula (28) shown below through computation of the formula (25) from a vector diagram shown in the FIG. 21 when power factor 1 operation is performed at a load end connected to the capacitor.

[Formula 28]

$$I_\gamma = cV_\delta^2 / k_\Psi \quad (28)$$

Here, $k\Psi$ is a proportionality constant. Since the operation power factor in this case is determined by circuit constants, an appropriate value must be determined for the reactive component of current command value Iγ* or the proportionality constant $k\Psi$. With this control system, an AC voltage can also be generated at a capacitor terminal for an AC load including a capacitor.

[Experiment 16]

Figure 52:
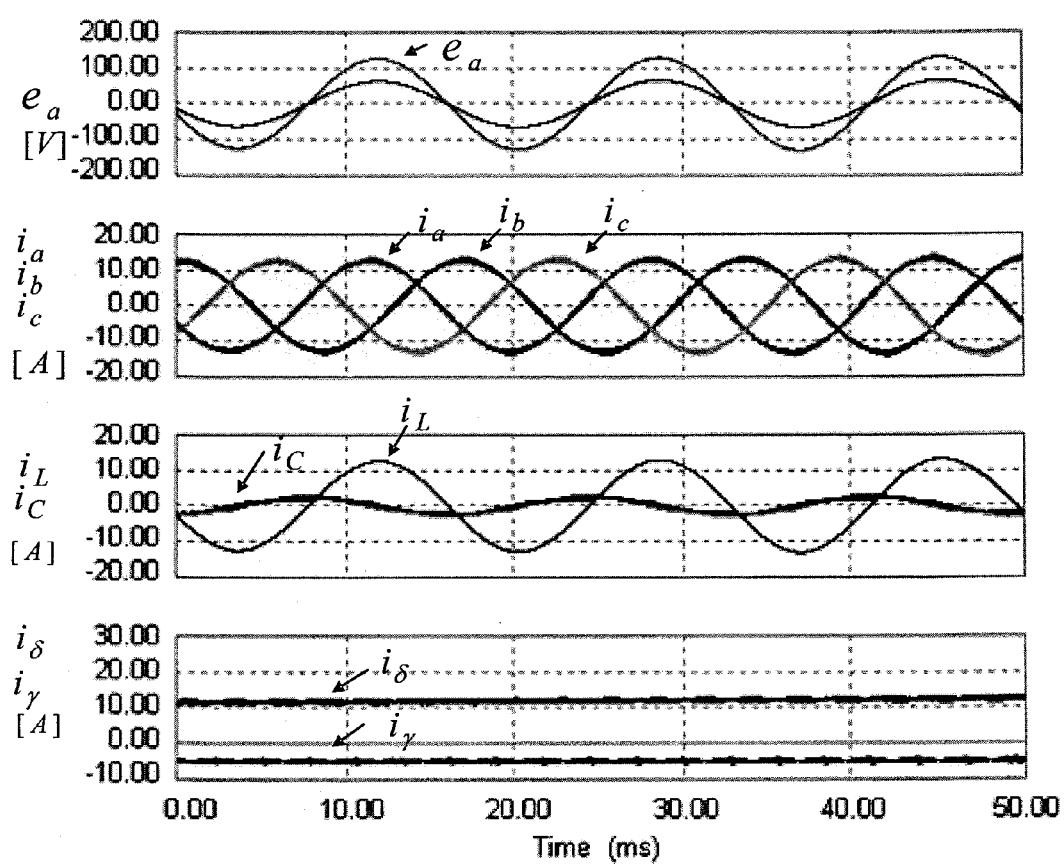
FIG. 52 is a diagram of simulation analysis results for the block diagram of Example 9 when the AC load including the capacitor is connected to the AC circuit in the power conversion controlling apparatus of the present invention.

FIG. 52 depicts simulation analysis results operated by setting an AC circuit inductance L to 2 mH, a capacitor C to 100 μF, and a parallel load resistance to 10Ω as an AC load including a capacitor for the DC voltage of Vd of 310 V and internal resistance of 1Ω, the reactive component of current setting value Iγ to 6 A (leading), and the DC operating voltage to 300 V in the power conversion control system in Example 9 (FIG. 51). As shown in FIG. 52, it can be verified that the control system also operates for the load including a capacitor as an AC electromotive force source to obtain AC power supply output.

As described above, a power conversion controlling apparatus according to the present invention can basically perform configuration control of control systems when drive control or power generation control is performed by connecting an AC machine including an AC motor such as a synchronous motor and an induction motor and an AC generator such as a synchronous generator and an induction generator to an inverter only by current detection of an AC current without a speed sensor or a rotation position sensor that has conventionally been necessary.

Thus, a power conversion controlling apparatus according to the present invention can widely be applied, as application examples, to various motor driven systems using an inverter for industrial, traffic, or home appliance uses. In addition to application to conventional power generation systems in which a generator and an inverter are combined, the scope of application can be widened to various power generation control systems of a wind turbine generator, a micro gas turbine generator and the like as a new energy source. Also, control systems can be configured without detecting the phase of an AC power supply as a rectification operation to obtain DC power from a commercial power supply and an inverter operation to transfer DC power to a commercial power supply and further as a reactive power compensating apparatus and an active filter operation. In addition to cases described above in which the AC circuit includes an electromotive force, a power conversion controlling apparatus according to the present invention can be used for failure detection of AC electromotive force sources. Moreover, application can be found in the configuration of independent source control systems for an AC load including a capacitor in an AC circuit.

As has been described above, a power conversion controlling apparatus according to the present invention can be applied to almost all power conversion control systems using an inverter and there is no need to detect phase information of an electromotive force source when configuring a control system and therefore, enormous effects such as simplification of the system configuration, improvement of reliability, lower costs, and new applications can be expected.

INDUSTRIAL APPLICABILITY

A power conversion controlling apparatus, a power conversion controlling method, and a power conversion controlling program according to the present invention are applicable to a wide range of control systems using an inverter.

The invention claimed is:

1. A power conversion controlling apparatus that controls a power converting unit connected between a DC circuit and an AC circuit including an AC electromotive force source to exchange power between DC and AC with a switching device based on a detection signal detected by a current detector of a current flowing through the AC circuit, comprising:

a frequency computing unit that determines an operating frequency of the power converting unit to output an operating frequency signal;

an integral computing unit that computes a phase angle signal by integration from the output of the frequency computing unit to output the phase angle signal;

an orthogonal biaxial transforming unit that computes a biaxial current of an active component and a reactive component by orthogonal biaxial transformation based on the detection signal of the current detector and the phase angle signal of the integral computing unit to output the biaxial current;

a biaxial current setting unit that determines a command value of the biaxial current to output the command value;

a biaxial current controlling unit that computes an amount of error from a difference between the output of the orthogonal biaxial transforming unit and that of the biaxial current setting unit to output an amplitude command value according to the amount of error for each biaxial component; and a PWM signal generating unit that generates a PWM signal controlling the power converting unit based on the output of the biaxial current controlling unit and the phase angle signal of the integral computing unit, wherein the frequency computing unit determines the operating frequency of the power converting unit so as to lead the amplitude command value corresponding to a reactive component of current among the amplitude command values output by the biaxial current controlling unit to zero.

2. The power conversion controlling apparatus according to claim 1, wherein the frequency computing unit selects among the amplitude command values output by the biaxial current controlling unit, a value obtained by multiplying the amplitude command value corresponding to the active component of current by a gain, a value obtained by multiplying a time variation reduced value of the amplitude command value corresponding to the active component of current by the gain, or a time variation reduced value of the gain multiplied value, as the operating frequency of the power converting unit.

3. The power conversion controlling apparatus according to claim 1, wherein the frequency computing unit includes:

an impedance compensating unit that outputs a compensation value for compensating for a stationary or transient voltage drop in a line impedance portion when the amplitude command value corresponding to the active component of current among the amplitude command values output by the biaxial current controlling unit changes, wherein a value obtained by multiplying an added value of the amplitude command value corresponding to the active component of current or a time variation reduced value of the amplitude command value and an output of the impedance compensating unit by a gain, or a time variation reduced value of the gain multiplied value is selected as the operating frequency of the power converting unit.

4. The power conversion controlling apparatus according to claim 3, wherein the impedance compensating unit computes the compensation value based on the active component of current or a command value of the active component of current.

5. The power conversion controlling apparatus according to claim 4, wherein the impedance compensating unit computes the compensation value by reducing time variations of the active component of current or the command value of the active component of current.

6. The power conversion controlling apparatus according to claim 3, wherein the impedance compensating unit computes the compensation value using, among the amplitude command values output by the biaxial current controlling unit, the amplitude command value corresponding to the reactive component of current.

7. The power conversion controlling apparatus according to claim 1, wherein the frequency computing unit selects a value obtained by multiplying a constant by a gain as the operating frequency of the power converting unit.

8. The power conversion controlling apparatus according to claim 1, comprising:
an output voltage orthogonal biaxial transforming unit that computes a biaxial voltage by orthogonal biaxial transformation from an output voltage of the power converting unit and the phase angle signal of the integral computing unit to output a signal corresponding to the amplitude command value output by the biaxial current controlling unit for each biaxial component, wherein
the frequency computing unit substitutes the amplitude command value with the signal value of the output voltage orthogonal biaxial transforming unit for each biaxial component.

9. The power conversion controlling apparatus according to claim 1, wherein the biaxial current setting unit computes the command value of the active component of current using the operating frequency of the power converting unit output by the frequency computing unit.

10. The power conversion controlling apparatus according to claim 1, wherein the biaxial current setting unit computes the command value of the active component of current using a DC side voltage value of the power converting unit.

11. The power conversion controlling apparatus according to claim 1, wherein a power factor is arbitrarily set by adjusting the command value of the reactive component of current of the biaxial current setting unit.

12. The power conversion controlling apparatus according to claim 11, wherein the biaxial current setting unit determines the command value of the reactive component of current as a value such that the power factor at an output end of the power converting unit becomes 1.

13. The power conversion controlling apparatus according to claim 11, wherein the biaxial current setting unit determines the command value of the reactive component of current as a value such that the power factor at an AC electromotive force source end of the AC circuit becomes 1.

14. The power conversion controlling apparatus according to claim 1, wherein the AC circuit is a circuit including one or a plurality of AC machines.

15. The power conversion controlling apparatus according to claim 14, wherein the AC machine is a synchronous machine, a reluctance machine, an induction machine, or an induction synchronous machine.

16. The power conversion controlling apparatus according to claim 14, wherein magnetization or demagnetization of a magnetic field is caused by adjusting the command value of the biaxial current of the biaxial current setting unit.

17. The power conversion controlling apparatus according to claim 1, wherein a commercial power supply, an AC side output of other power converting unit, or an AC load including a capacitor is connected as an AC electromotive force source of the AC circuit.

18. The power conversion controlling apparatus according to claim 1, wherein the DC circuit is a circuit including a capacitor, a DC power supply, or a DC load.

19. The power conversion controlling apparatus according to claim 1, wherein the power converting unit is an inverter that converts DC power into AC power or an AC-DC converter that converts AC power into DC power.

20. A computer program product having a computer readable medium including programmed instructions for controlling a power converting unit connected between a DC circuit and an AC circuit including an AC electromotive force source to exchange power between DC and AC with a switching device based on a detection signal detected by a current detector of a current flowing through the AC circuit, wherein the instructions, when executed by a computer, cause the computer to function as:
a frequency computing unit that determines an operating frequency of the power converting unit so as to lead a amplitude command value corresponding to a reactive component of current among the amplitude command values to zero;
an integral computing unit that computes a phase angle signal by integration from the output of the frequency computing unit to output the phase angle signal;
an orthogonal biaxial transforming unit that computes a biaxial current of an active component and a reactive component by orthogonal biaxial transformation based on the detection signal of the current detector and the phase angle signal of the integral computing unit to output the biaxial current;
a biaxial current setting unit that determines a command value of the biaxial current to output the command value;
a biaxial current controlling unit that computes an amount of error from a difference between the output of the orthogonal biaxial transforming unit and that of the biaxial current setting unit to output the amplitude command value according to the amount of error for each biaxial component; and
a PWM signal generating unit that generates a PWM signal controlling the power converting unit based on the output of the biaxial current controlling unit and the phase angle signal of the integral computing unit.

21. A power conversion controlling method for controlling a power converting unit connected between a DC circuit and an AC circuit including an AC electromotive force source to exchange power between DC and AC with a switching device based on a detection signal detected by a current detector of a current flowing through the AC circuit, comprising:
a frequency computing step of determining an operating frequency of the power converting unit so as to lead a amplitude command value corresponding to a reactive component of current among the amplitude command values to zero;

an integral computing step of computing a phase angle signal by integration from the output at the frequency computing step to output the phase angle signal;

an orthogonal biaxial transforming step of computing a biaxial current of an active component and a reactive component by orthogonal biaxial transformation based on the detection signal of the current detector and the phase angle signal at the integral computing step to output the biaxial current;

a biaxial current setting step of determining a command value of the biaxial current to output the command value;

a biaxial current controlling step of computing an amount of error from a difference between the output at the orthogonal biaxial transforming step and that at the biaxial current setting step to output the amplitude command value according to the amount of error for each biaxial component; and a PWM signal generating step of generating a PWM signal controlling the power converting unit based on the output at the biaxial current controlling step and the phase angle signal at the integral computing step.

* * * * *